United States Patent [19]

Seto et al.

[11] Patent Number: 5,627,651
[45] Date of Patent: May 6, 1997

[54] MODIFYING PRINT INFORMATION BASED ON FEATURE DETECTION

[75] Inventors: Kaoru Seto, Chigasaki; Kiyoshi Kanaiwa, Kawasaki; Michio Itoh, Hachioji; Hiroshi Mano, Tokyo; Hiromichi Yamada, Yokohama; Atsushi Kashihara, Hachioji; Takashi Kawana, Yokohama; Tetsuo Saito, Tokyo, all of Japan

[73] Assignee: Canon Kabushiki Kaisha, Tokyo, Japan

[21] Appl. No.: 504,148

[22] Filed: Jul. 19, 1995

Related U.S. Application Data

[62] Division of Ser. No. 838,871, Feb. 21, 1992, Pat. No. 5,465,157.

[30] Foreign Application Priority Data

Feb. 22, 1991 [JP] Japan ................................. 3-28615
May 17, 1991 [JP] Japan ................................. 3-113230

[51] Int. Cl.⁶ .............................. H04N 1/40; G06K 9/46
[52] U.S. Cl. ........................ 358/298; 358/448; 382/190; 382/203
[58] Field of Search ................................. 358/298, 448, 358/462; 347/129, 131, 224; 382/181, 190–195, 199, 203, 205, 209

[56] References Cited

U.S. PATENT DOCUMENTS

| | | | |
|---|---|---|---|
| 4,437,122 | 3/1984 | Walsh et al. | 356/166 |
| 4,468,808 | 8/1984 | Mori et al. | 382/25 X |
| 4,700,201 | 10/1987 | Sato | 346/108 |
| 4,847,641 | 7/1989 | Tung | 346/154 |
| 4,891,750 | 1/1990 | Pastor et al. | 382/25 X |
| 4,933,689 | 6/1990 | Yoknis | 346/154 |
| 5,005,139 | 4/1991 | Tung | 382/54 X |
| 5,050,222 | 9/1991 | Lee | 382/22 X |
| 5,060,276 | 10/1991 | Morris et al. | 382/48 X |
| 5,131,053 | 7/1992 | Bernzott et al. | 382/22 X |
| 5,222,159 | 6/1993 | Kawamura et al. | 382/48 |
| 5,253,307 | 10/1993 | Wayner et al. | 382/22 |
| 5,490,224 | 2/1996 | Ogawa | 382/205 |

FOREIGN PATENT DOCUMENTS

| | | |
|---|---|---|
| 163841 | 12/1985 | European Pat. Off. . |
| 385508 | 9/1990 | European Pat. Off. . |
| 61-214666 | 9/1986 | Japan . |
| 61-214661 | 9/1986 | Japan . |

*Primary Examiner*—Eric Frahm
*Attorney, Agent, or Firm*—Fitzpatrick, Cella, Harper & Scinto

[57] ABSTRACT

An information processing method includes inputting bit information, temporarily storing at least part of the input bit information, and detecting whether the stored bit information coincides with one predetermined feature of plural such predetermined features. Print information for an object pixel which corresponds to a stored bit is modified in a case where coincidence is detected. Modification may include, for example, contour retention in a case where a rectangular portion is detected, line width discrimination, or white line discrimination. In addition, second feature detection can determine that a right-angled portion is not involved, in which case print information is modified only if coincidence is detected with plural predetermined features and a right-angled portion is not detected.

5 Claims, 92 Drawing Sheets

MOVEMENT REFERENCE WINDOW

CHECK DOTS IN LEFT-ILLUSTRATED AREAS
ALL DOTS ARE THE SAME:
$X_n=0$ OR $Y_n=0$
AT LEAST ONE DOT IS DIFFERENT:
$X_n=1$ OR $Y_r=1$

FIG. 13A
FIG. 13B
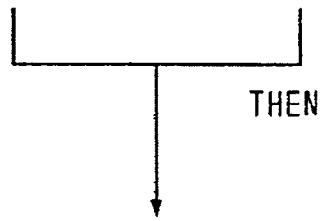
- X5 = X6
- AT LEAST ONE OF Y1 TO Y8, X7, X8, X4 IS "0"
THEN
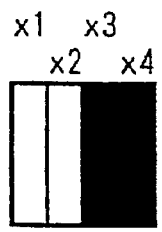
FIG. 13C

- X7 = X8 = X4
- AT LEAST ONE OF Y1 TO Y8, X5, X6 IS "0"

THEN

FIG. 15B
FIG. 15A
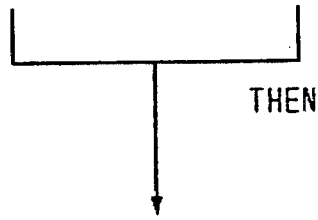
- X5 = X6
- AT LEAST ONE OF Y1 TO Y8, X7, X8 IS "0"
THEN
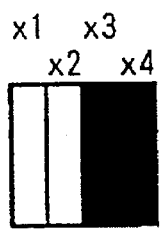
FIG. 15C  5f

FIG. 16A
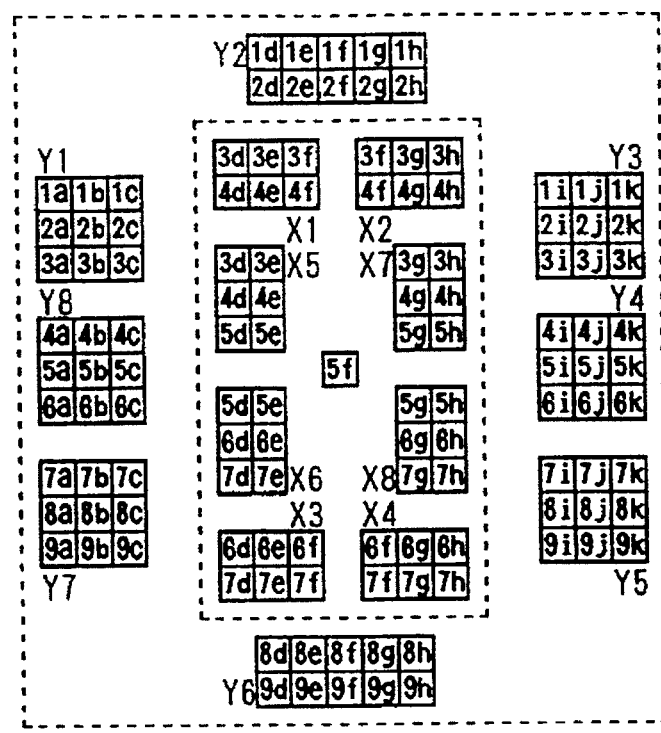
FIG. 16B
- X7 = X8
- AT LEAST ONE OF Y1 TO Y8, X5, X6 IS "0"
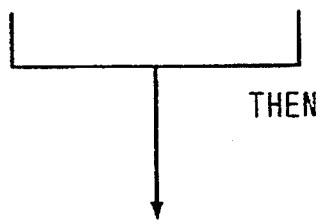
THEN
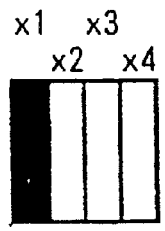
FIG. 16C FIG. 17A
FIG. 17B
- X7 = X8
- AT LEAST ONE OF Y1 TO Y8, X5, X6, X3 IS "0"
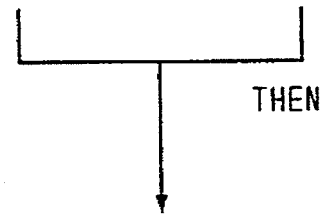
THEN
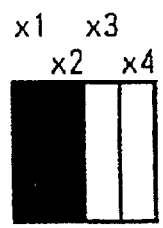
FIG. 17C FIG. 18A
FIG. 18B
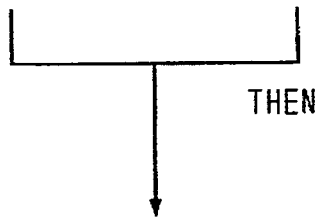
- X5 = X2
- AT LEAST ONE OF Y1 TO Y8, X3, X4 IS "0"
THEN
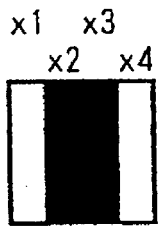
FIG. 18C FIG. 19A
FIG. 19B
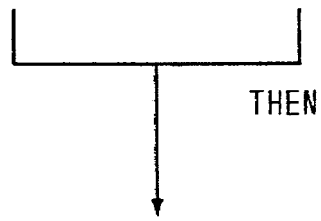
- X3 = X4
- AT LEAST ONE OF Y1 TO Y8, X1, X2 IS "0"
THEN
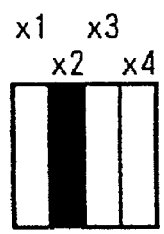
FIG. 19C FIG. 20A
FIG. 20B
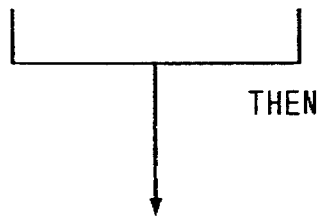
- X1 = X2
- AT LEAST ONE OF Y1 TO Y8, X3, X4 IS "0"
THEN
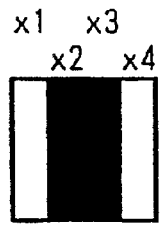
FIG. 20C  5f FIG. 21A
FIG. 21B
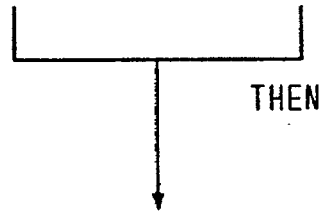
- X3 = X4
- AT LEAST ONE OF Y1 TO Y8, X1, X2 IS "0"
THEN
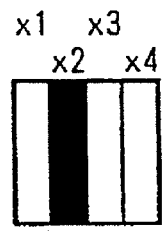
FIG. 21C FIG. 22A
FIG. 22B
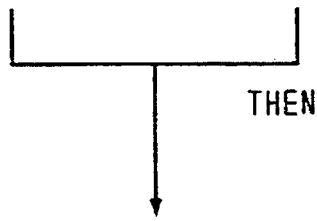
- X1 = X7
- AT LEAST ONE OF Y1 TO Y8, X3, X4 IS "0"
THEN
FIG. 22C
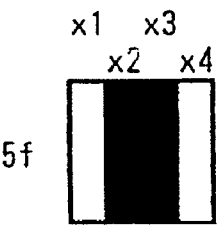

FIG. 23A
FIG. 23B
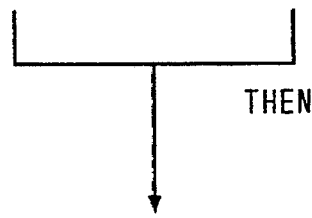
- X1 = X5
- AT LEAST ONE OF Y1 TO Y8, X7, X4 IS "0"
THEN
FIG. 23C
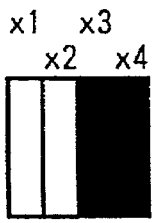

FIG. 24A
FIG. 24B
- X4 = X8 = 5f
- AT LEAST ONE OF Y1 TO Y8, X1, X5 IS "0"
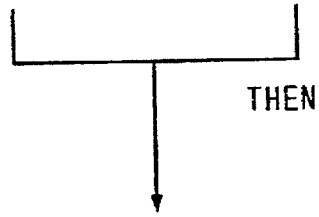
THEN
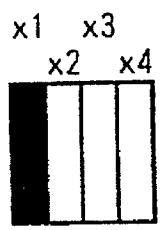
FIG. 24C FIG. 25A
FIG. 25B
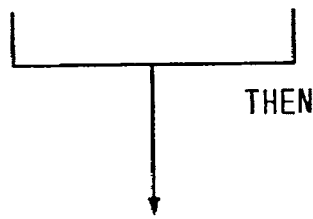
- X2 = X7
- AT LEAST ONE OF Y1 TO Y8, X5, X3 IS "0"
THEN
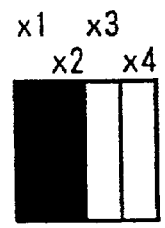
FIG. 25C FIG. 26A  FIG. 26B  FIG. 26C
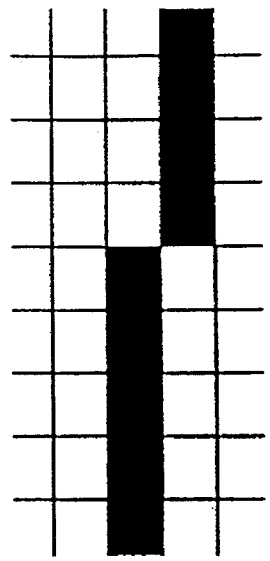 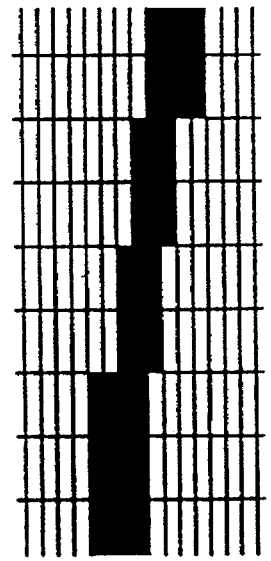 
FIG. 27A  FIG. 27B
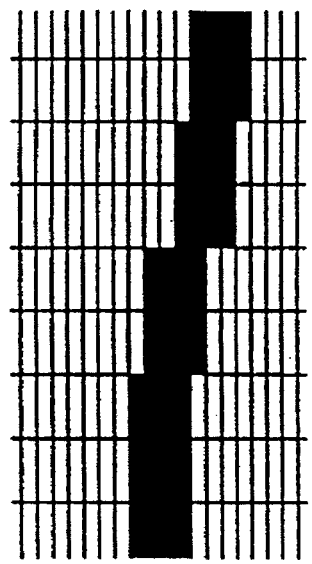 

FEATURE EXTRACTION CKT CORRESPONDING TO FIGS. 13A TO 13C

FEATURE EXTRACTION CKT CORRESPONDING
TO FIGS. 14A TO 14C

FEATURE EXTRACTION CKT CORRESPONDING TO FIGS. 15A TO 15C

FIG. 37A
FIG. 37B
- X5 = X6
- AT LEAST ONE OF Y1 TO Y8, X7, X8, X4 IS "0"
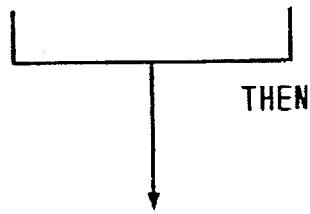
THEN
FIG. 37C
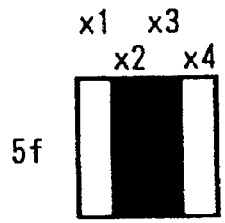

- X3 = X4
- AT LEAST ONE OF Y1 TO Y8, X1, X2 IS "0"

THEN

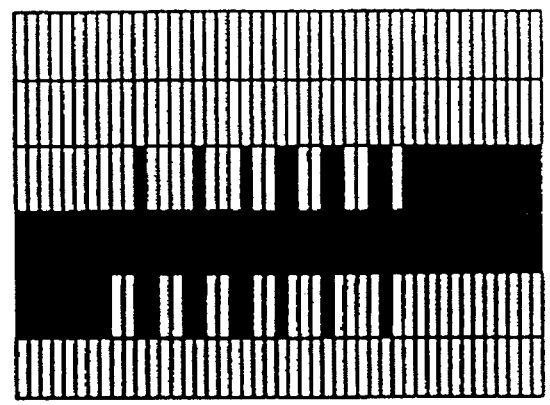
FIG. 39A
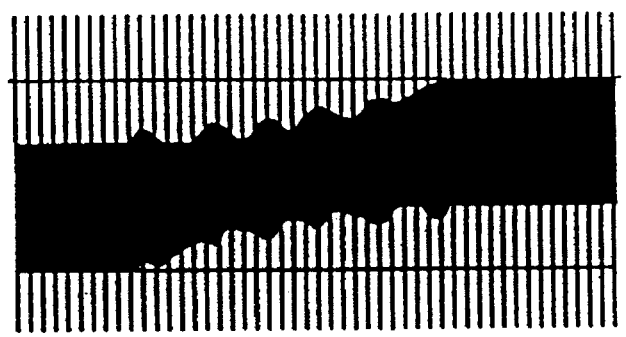
FIG. 39B
FIG. 44
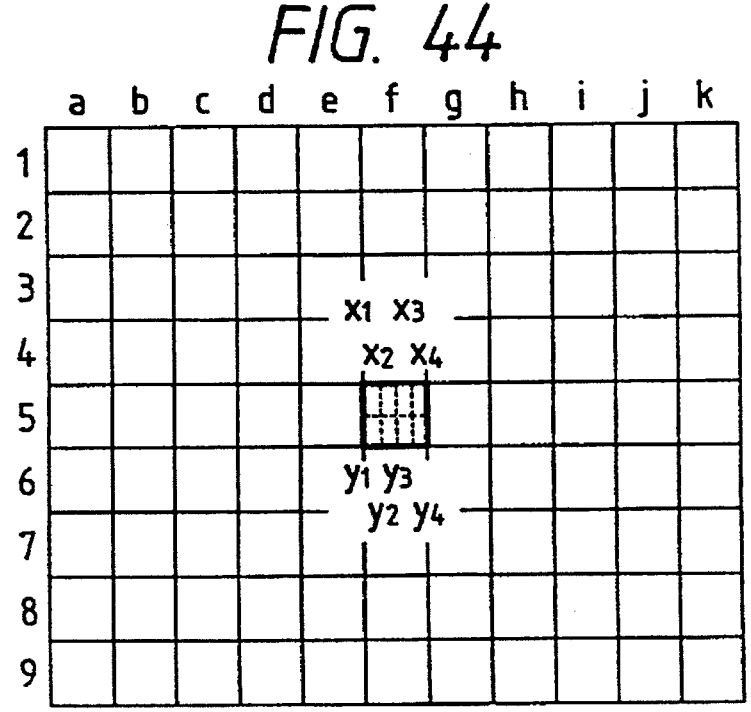

FIG. 50A
FIG. 50B
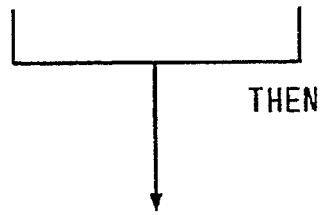
- X5 = X6
- AT LEAST ONE OF Y1 TO Y8, X7, X8, X4 IS "0"
THEN
FIG. 50C
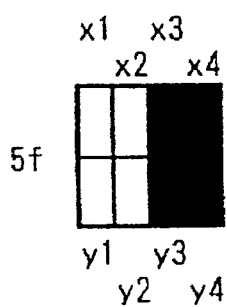

FIG. 51A
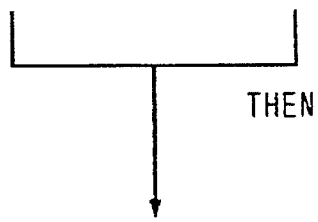
FIG. 51B
- X7 = X8 = X4
- AT LEAST ONE OF Y1 TO Y8, X5, X6 IS "0"
THEN
FIG. 51C
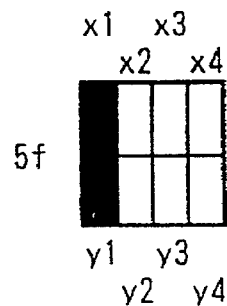

FIG. 52A
FIG. 52B
- X5 = X6
- AT LEAST ONE OF Y1 TO Y8, X7, X8 IS "0"
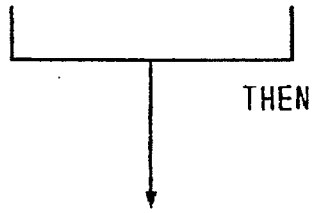
THEN
FIG. 52C
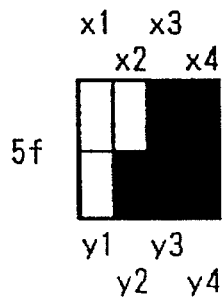

- X7 = X8
- AT LEAST ONE OF Y1 TO Y8, X5, X6 IS "0"

THEN

FIG. 53C

- X5 = X7
- AT LEAST ONE OF Y1 TO Y8, X3, X4 IS "0"

THEN

- X3 = X4
- AT LEAST ONE OF Y1 TO Y8, X1, X2 IS "0"

} THEN

FIG. 55C

FIG. 56A
FIG. 56B
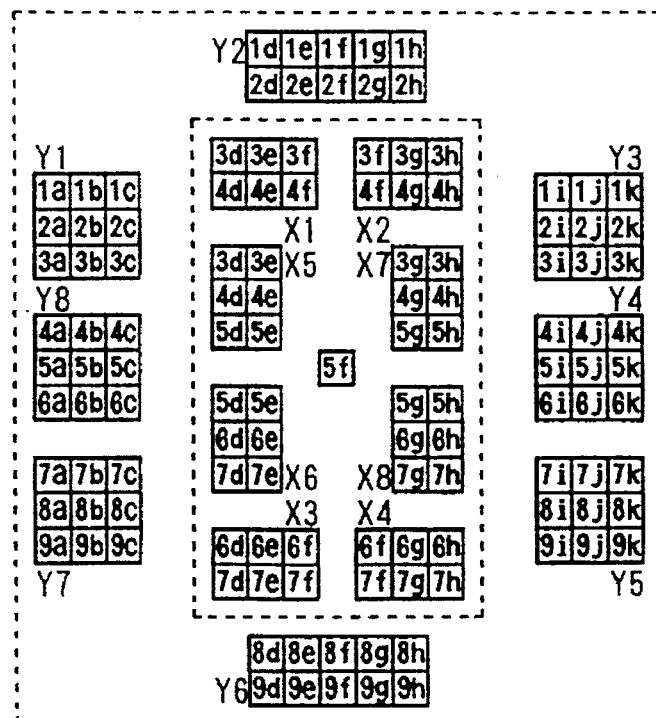
- X1 = X2
- AT LEAST ONE OF Y1 TO Y8, X3, X4 IS "0"
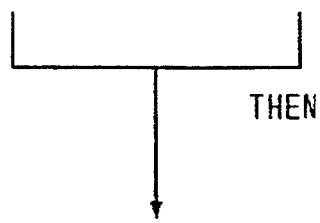
THEN
FIG. 56C
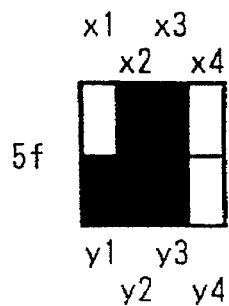

- X3 = X4
- AT LEAST ONE OF Y1 TO Y8, X1, X2 IS "0"

THEN

- X1 = X5
- AT LEAST ONE OF Y1 TO Y8, X7, X4 IS "0"

THEN

- X4 = X8 = 5f
- AT LEAST ONE OF Y1 TO Y8, X1, X5 IS "0"

THEN

FIG. 69A
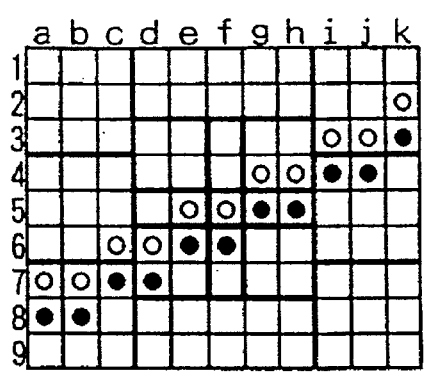
FIG. 69B
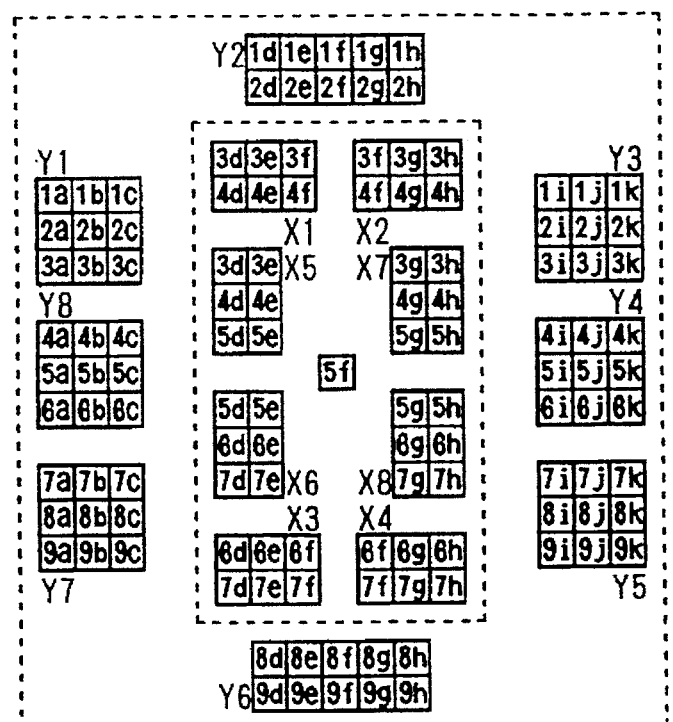
- X5 = X2 = 0
- AT LEAST ONE OF Y1 TO Y8, X3, X4 IS "0"
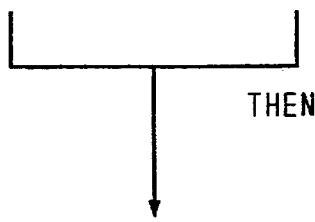
THEN
FIG. 69C
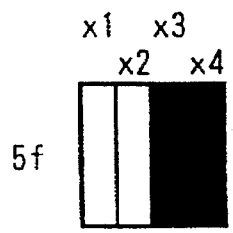

FIG. 70A
FIG. 70B
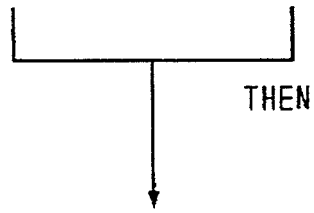
- X1=0
- AT LEAST ONE OF Y1 TO Y8, X7, X3, X4 IS "0"
THEN
FIG. 70C
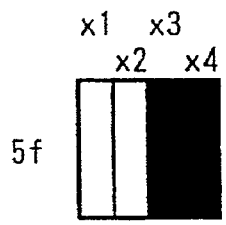

FIG. 71A
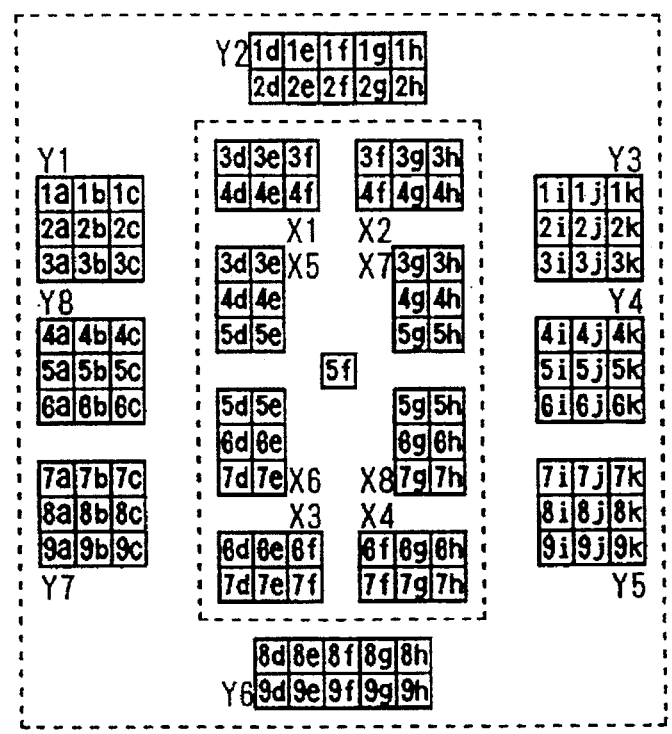
FIG. 71B
- X8 = X3 = 0
- AT LEAST ONE OF Y1 TO Y8, X1, X2 IS "0"
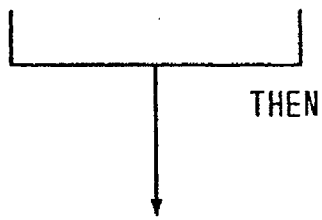
THEN
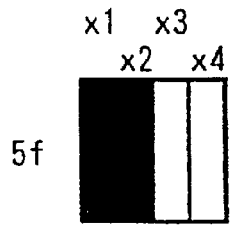
FIG. 71C

FIG. 72A
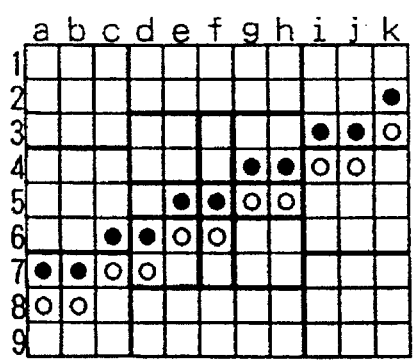
FIG. 72B
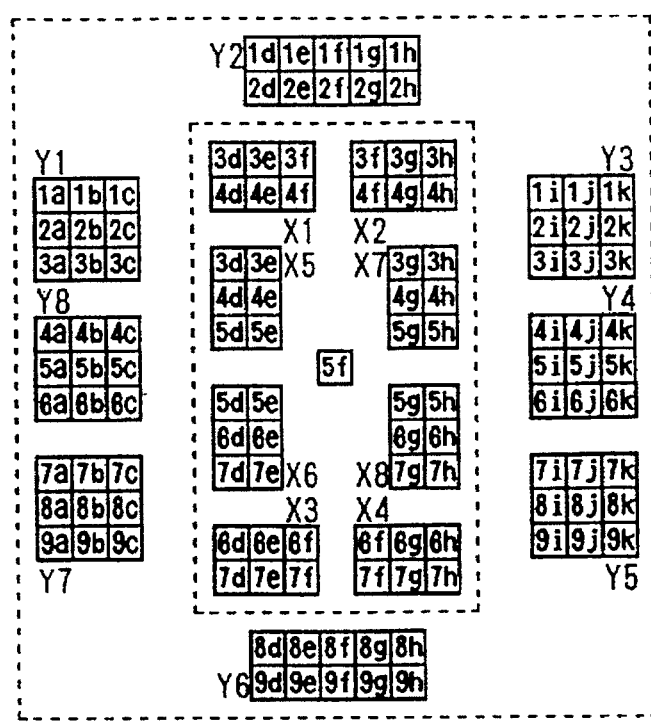
- X4 = X8 = 0
- AT LEAST ONE OF Y1 TO Y8, X1, X2, X6 IS "0"
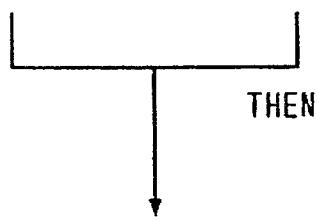
THEN
FIG. 72C
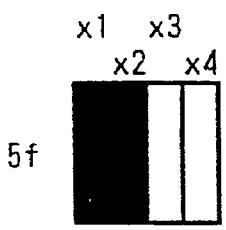

FIG. 79A
FIG. 79B
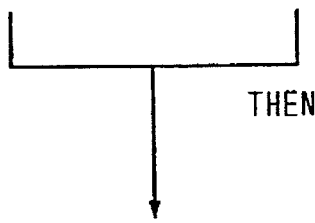
- $X1 = X6 = 0$
- AT LEAST ONE OF Y1 TO Y8, X4, X7 IS "0"
THEN
FIG. 79C
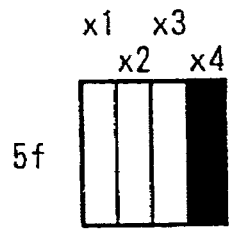

FIG. 80A
FIG. 80B
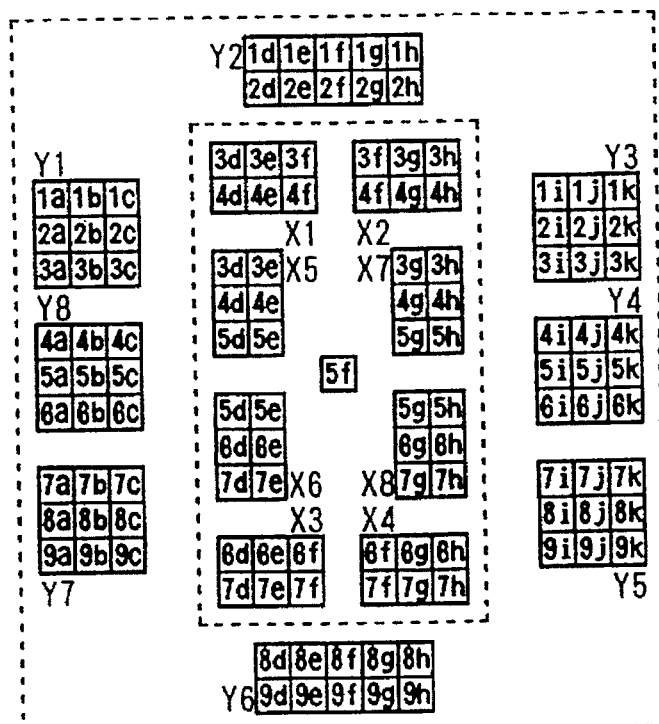
- X5=0
- AT LEAST ONE OF Y1 TO Y8, X3, X8, X7 IS "0"
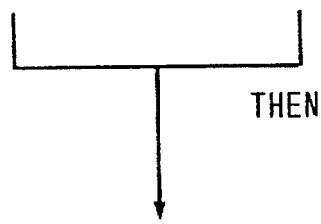
THEN
FIG. 80C
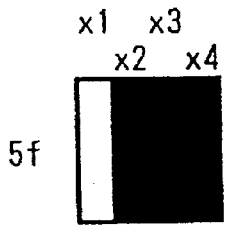

FIG. 81A
FIG. 81B
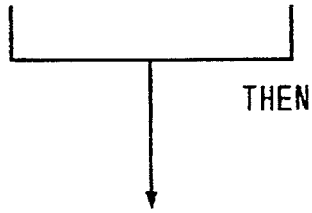
- X4 = X7 = 0
- AT LEAST ONE OF Y1 TO Y8, X1, X6 IS "0"
THEN
FIG. 81C
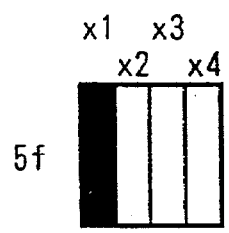

FIG. 82A
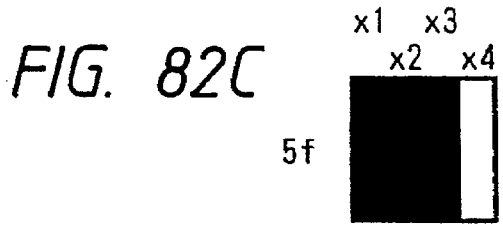
FIG. 82B
- X4 = X8 = 0
- AT LEAST ONE OF Y1 TO Y8, X1, X6 IS "0"
THEN
FIG. 82C
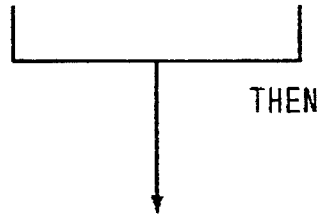

FIG. 87A
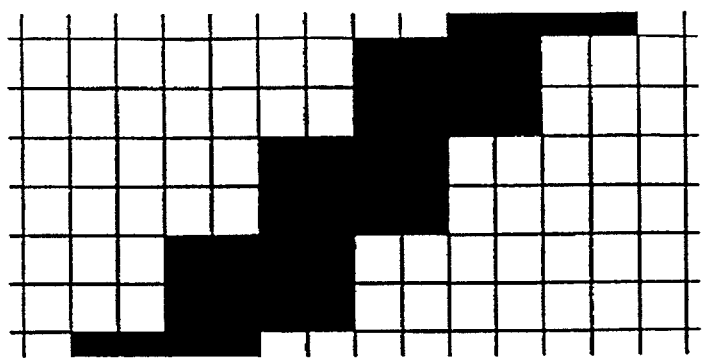
FIG. 87B
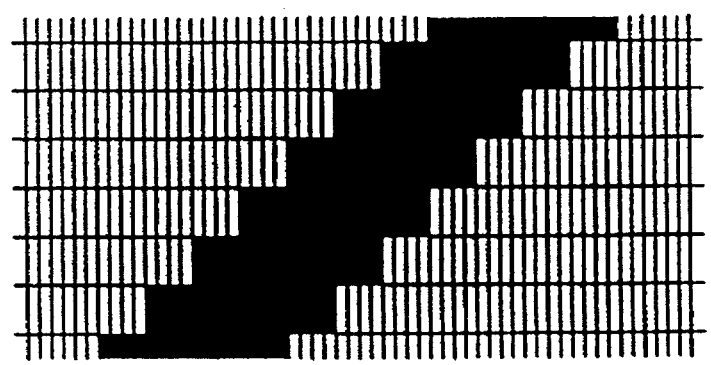
FIG. 88A
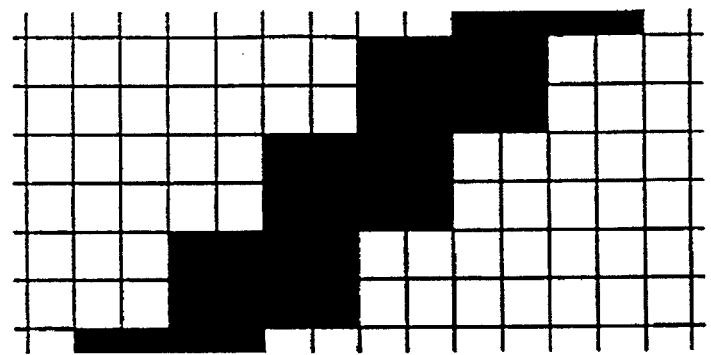
FIG. 88B
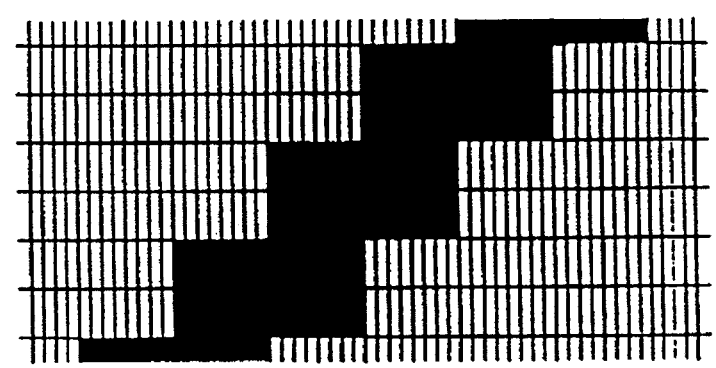

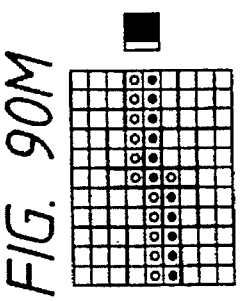 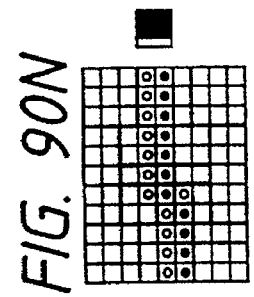 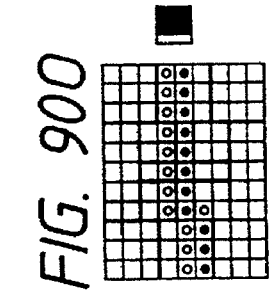 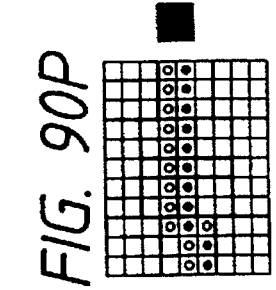
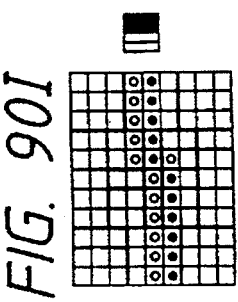 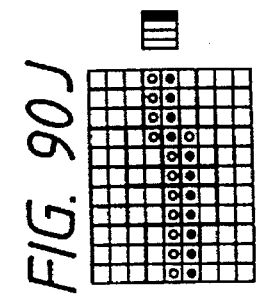 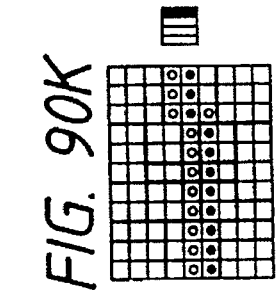 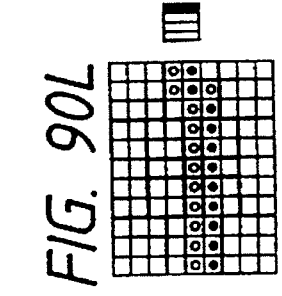
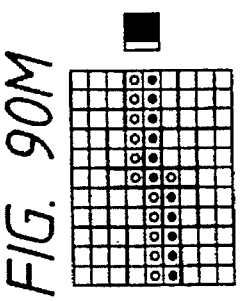 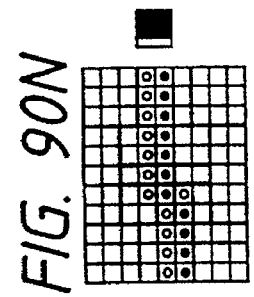 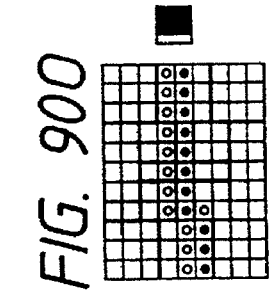 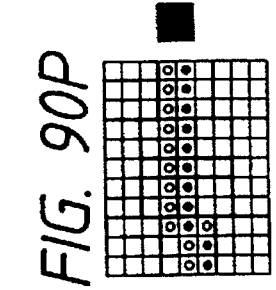

FIG. 93A
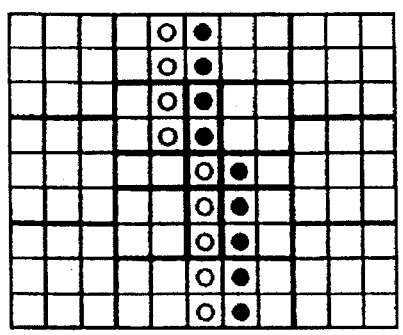
FIG. 93D
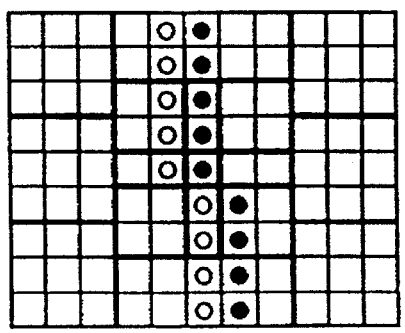
FIG. 93B
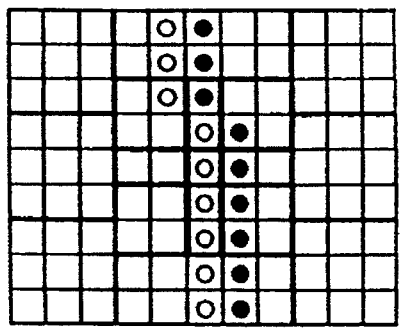
FIG. 93E
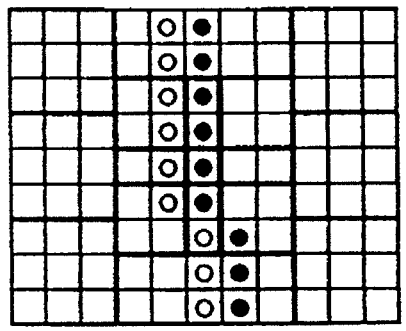
FIG. 93C
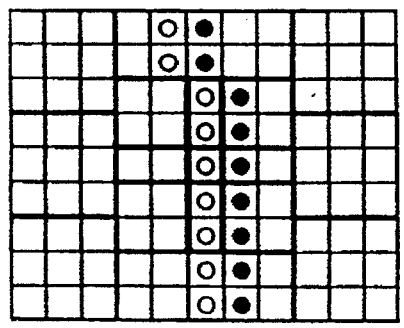
FIG. 93F
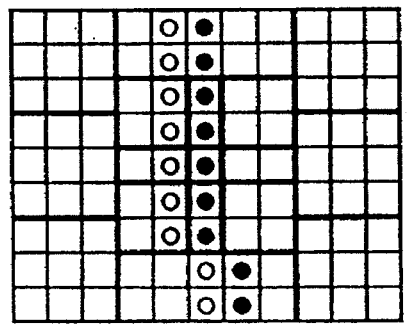

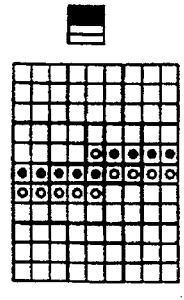
FIG. 94K
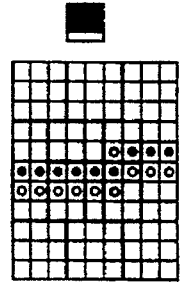
FIG. 94L
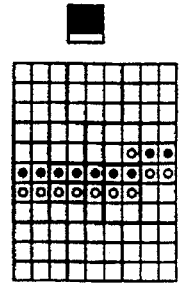
FIG. 94M
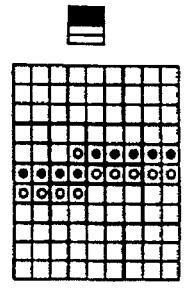
FIG. 94H
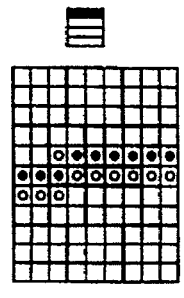
FIG. 94I
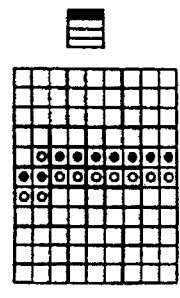
FIG. 94J
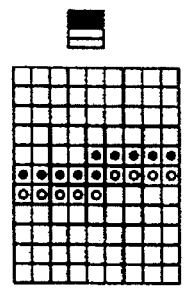
FIG. 94D
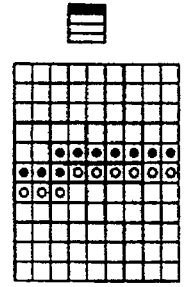
FIG. 94E
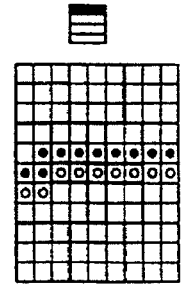
FIG. 94F
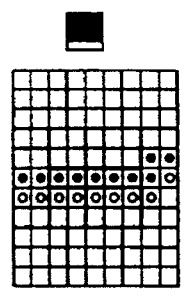
FIG. 94G
FIG. 94A
FIG. 94B
FIG. 94C

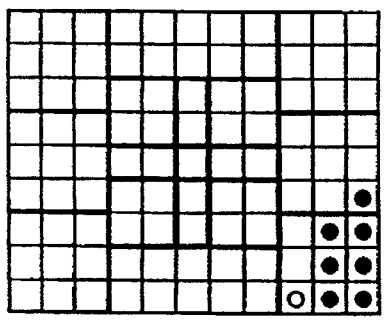
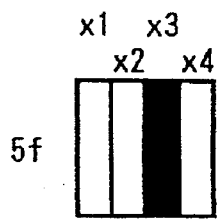
FIG. 101A
FIG. 101A'
FIG. 101B
FIG. 101C
IF ... AND ... IF NOT ... THEN
- X1 = X2 = 0
- AT LEAST ONE OF Y1 TO Y8, X3, X4 IS "0"

- X5 = X6 = 0
- AT LEAST ONE OF Y1 TO Y8, X7, X8 IS "0"

IF

AND

IF NOT

THEN

MODIFYING PRINT INFORMATION BASED ON FEATURE DETECTION

This application is a division of application Ser. No. 07/838,871 filed Feb. 21, 1992, U.S. Pat. No. 5,465,157.

BACKGROUND OF THE INVENTION

1. Field of the Invention

The present invention relates to an information recording apparatus such as a laser beam printer, and more particularly to an information recording apparatus capable of smoothing process on bit map data representing characters or patterns, thereby smoothing the contours of characters or patterns to be printed and thus improving the print quality.

2. Related Background Art

Laser beams printers employing electrophotographic process are recently employed, for example, in the output units of computers or facsimile apparatus, and in so-called digital copying machines for printing image data read from an image scanner.

Such laser beam printers are capable of printing an image for example with a resolving power of 300 dot/inch.

In such case, the character or pattern is represented, as shown in FIG. 4, by black (•) and white (○) dots to be printed corresponding to a grating of 300 dot/inch. FIG. 4 illustrates the dot pattern of character "a". The resolving power of 300 dot/inch corresponds to a dot pitch of about 85 microns. Since the human vision is generally said to resolve about 20 microns, the contour of character or pattern formed by the dots of the above-mentioned pitch (85 microns) appears staggered, so that the obtained print cannot therefore be considered as of high quality.

In order to over come such drawback, consideration has been given to the following approaches.

A first approach is to simply increase the resolving power (for example to 1200 dot/inch). This method however requires a bit map memory of a capacity of 4×4=16 times for representing a same area, so that the apparatus inevitably becomes very expensive.

A second approach is to increase the resolving power in equivalent manner in the main scanning direction or in the main and sub scanning directions by modifying the print data of an object pixel by referring to the data of surrounding pixels, such as through addition of a buffer memory of a limited capacity instead of expanding the capacity of the bit map memory. Processes of this sort are disclosed in the U.S. Pat. Nos. 4,437,122, 4,700,201 and 4,847,641.

Methods disclosed in the U.S. Pat. Nos. 4,437,122 and 4,700,201 are to correct the data of an object pixel to be printed, by referring to said object pixel and surrounding eight pixels. These methods, only having a limited reference area in the surrounding pixels, can identify that the object pixel is a part of a curved line, but are unable to identify the curvature of said curved line. In particular they are incapable of identifying an almost horizontal or vertical contour and are therefore unable to effect optimum correction according to the curvature, so that it is difficult to obtain optimum result from smoothing.

On the other hand, the method disclosed in the U.S. Pat. No. 4,847,641, utilizing reference in a wider area than in the above-mentioned two methods, can also identify the curvature of a curved line in which the object pixel constitutes a part. In this method, however, though the entire reference area is wider, each of the matching patterns is limited to a part of said reference area. For this reason said method is associated with following drawbacks.

Firstly, this method is incapable of identifying whether the object pixel is a part of a binarized halftone image obtained for example by dither method or error dispersion method. This method, therefore, though capable of effective smoothing for a character image, may erroneously effect smoothing on a part of dots constituting a halftone pixel obtained by the dither method or error dispersion method. For example, FIG. 9A is a part of a 4×4 dither image. If reference is made to a limited surrounding area for an object pixel 5f, said object pixel is recognized as a part of a character or a pattern and is changed from a white pixel to a pixel with a density. This results in a local variation of image density of a halftone image, eventually giving rise to deterioration of image quality, such as generation of a pseudo contour.

Secondly, this method is incapable of identifying whether the pixel belongs to a concentrated (or complex) image. FIG. 9B shows an example of image composed of a concentrated group of one dot wide lines. In this case, for smoothing each line, a change in dot density is required in pixels marked with(Δ) or (X) in FIG. 9C. As will be apparent from FIG. 9C, each pixel to be subjected to density change will be positioned adjacent or close to another pixel also subjected to density change because of neighboring pixels thereof, and this fact results in a deterioration of the resolving power. Such complex concentration of pixels may appear not only in a highly concentrated line image but also in alphabets and Chinese characters of small sizes. In such case, the object pixel subjected to a change for smoothing may be positioned close to another pixel to be changed for an adjacent image portion, whereby said object pixel (representing an image line or a line of a character) may become less distinguishable from the adjacent pixel. Such phenomenon results in a significant loss in the resolving power of the image around said object pixel, thus providing a blurred image or a moire pattern on the image, and deteriorating the image quality. Furthermore, if a halftone representation is conducted within a pixel for the purpose of smoothing in such concentrated portion of an image, the image density loses reproducibility due to interaction with the nearby pixels, and is easily affected by circumferential conditions such as temperature and humidity. Thus the smoothing effect varies according to such conditions, and the printed character may appear different.

Naturally such drawbacks can be avoided by adopting a sufficiently wide reference area in each matching pattern, so as to identify whether the object pixel belongs to a dither processed image or a concentrated portion of the image, but such method inevitably requires a large circuitry, thus increasing the cost of the apparatus.

Also methods have been disclosed for changing the object pixel depending on the feature of the boundary portion to which said object pixel belongs, for example in the U.S. Pat. No. 4,933,689 and Japanese Patent Unexamined Patent Publication (Kokai) Nos. 61-214661 and 61-214666, but these methods have been associated with a drawback that the dot size varies by the smoothing process.

SUMMARY OF THE INVENTION

In consideration of the foregoing, an object of the present invention is to provide an information recording apparatus capable of providing a smoothed image of high image quality.

Another object of the present invention is to provide an information recording apparatus capable of inhibiting the smoothing process on a dither processed image or a concentrated image with a simple structure, thereby preventing deterioration of a halftone image.

Still another object of the present invention is to provide an information recording apparatus capable of smoothing process without the influence of circumferential conditions, by effecting the density change in an object pixel for smoothing, only when predetermined white areas are present around said object pixel to be subjected to density change.

Still another object of the present invention is to provide an improvement in the smoothing algorithm.

Still another object of the present invention is to provide an information recording apparatus capable of maintaining a constant line width, by deleting (or adding) a signal width, equal to that added (or deleted) at the left edge of a vertical line, at the right edge of said vertical line.

Still another object of the present invention is to provide an information recording apparatus capable of maintaining a constant line width in a horizontal line, by deleting, from the original signal, a signal of a width equal to the pulse duration to be added to the line edge.

Still another object of the present invention is to provide an information recording apparatus capable of inhibiting unnecessary or detrimental smoothing, even for a line of some inclination, by judging whether or not to effect the smoothing process according to the dot configuration at the edges of said line.

Still another object of the present invention is to provide a smoothing method capable of identifying the type of one-dot line and accordingly varying the smoothing process therefor, thereby preventing deterioration in image quality of said one-dot line, resulting from a change in line width or from cyclic breakage of line, regardless of the type thereof.

According to this aspect of the invention, an information processing method includes inputting bit information, temporarily storing at least part of the input bit information, and detecting whether the stored bit information coincides with one predetermined feature of plural such predetermined features. Print information for an object pixel which corresponds to a stored bit is modified in a case where coincidence is detected. Modification may include, for example, contour retention in a case where a rectangular portion is detected, line width discrimination, or white line discrimination. In addition, second feature detection can determine that a right-angled portion is not involved, in which case print information is modified only if coincidence is detected with plural predetermined features and a right-angled portion is not detected.

Still another object of the present invention is to provide an information recording apparatus capable of identifying a one-dot white line and inhibiting the smoothing process therefor, thereby preventing the loss in line width of such one-dot white line and ensuring stability of image quality under variable circumferential conditions.

Still another object of the present invention is to provide an information recording apparatus capable of preventing defects of smoothing on Chinese characters, by inhibiting the smoothing process by incorporating an inhibition pattern for such characters.

The foregoing and still other objects of the present invention will become fully apparent from the following description, which is to be taken in conjunction with the attached drawings.

BRIEF DESCRIPTION OF THE DRAWINGS

FIGS. 9A to 9C are views showing drawbacks in the prior art;

FIGS. 13A to 25C are views showing examples of feature extracting algorithm of said embodiment;

FIGS. 26A to 29B are views showing the effect of smoothing of said embodiment;

FIGS. 37A to 38C are views showing examples of the feature extracting algorithm in said embodiment;

FIGS. 39A and 39B are views showing the effect of the algorithm shown in FIGS. 37A to 38B;

FIGS. 40A to 41B are views showing examples of the algorithm without smoothing;

FIGS. 43A to 43C are views showing another embodiment in which the area in FIG. 11 is partially modified;

FIG. 44 is a view showing another embodiment in which the object pixel is divided into 4 areas in the main scanning direction and into 2 areas in the sub scanning direction;

FIGS. 50A to 59C are views showing examples of feature extracting algorithm in another embodiment;

FIGS. 69A to 72C are views showing examples of the feature extracting algorithm in a 2nd embodiment;

FIGS. 79A to 82C are views showing examples of the feature extracting algorithm of the 2nd embodiment;

FIGS. 87A and 87B are views showing a conventional smoothing for a line having a step of 2 dots in the vertical and horizontal directions;

FIGS. 88A and 88B are views showing the smoothing of the 2nd embodiment for a line having a step of 2 dots in the vertical and horizontal directions;

FIGS. 90A to 90P are views showing the smoothing algorithm of the 2nd embodiment for a lateral line with almost horizontal edges;

FIGS. 93A to 94M are views showing the smoothing algorithm for a line with almost vertical edges;

FIGS. 101A to 101C and 101A' are views showing an example of the feature extracting algorithm for a Kanji character;

DETAILED DESCRIPTION OF THE PREFERRED EMBODIMENTS

Figure 1:
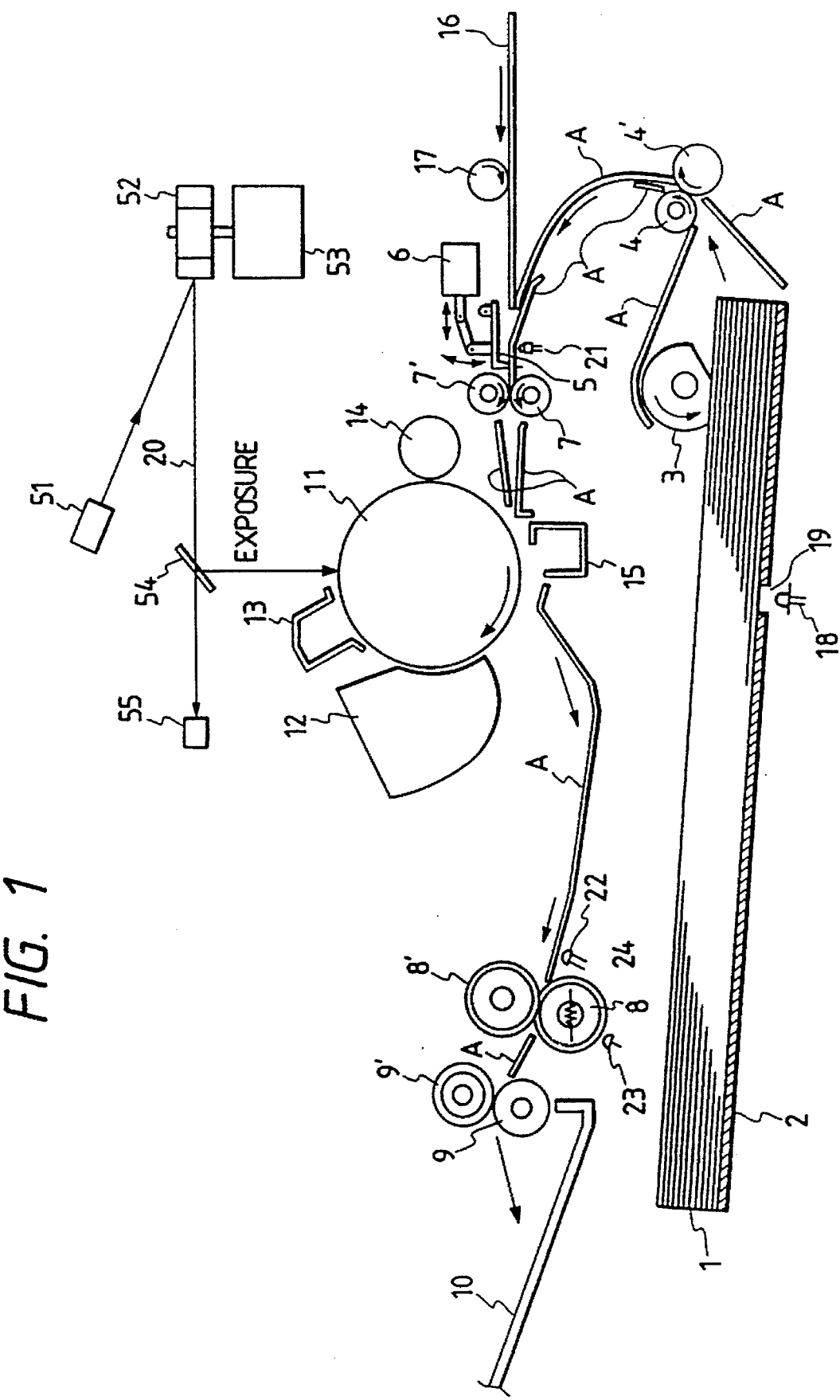
FIG. 1 is a schematic view of a principal engine unit of a laser beam printer, constituting an embodiment of the present invention.
Figure 2:
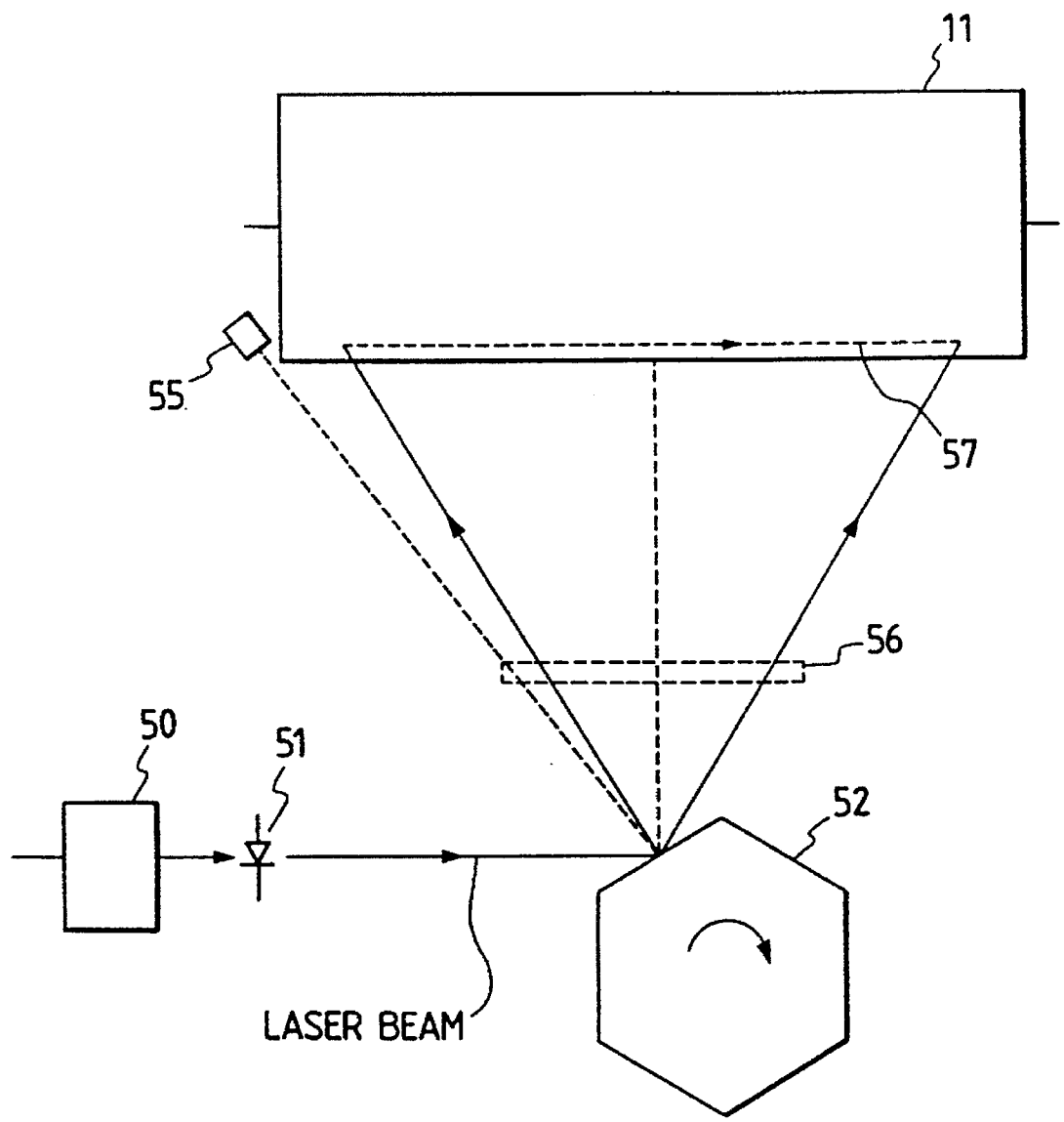
FIG. 2 is a detailed view of a part of said engine unit.

FIGS. 1 and 2 illustrate a principal engine unit of a laser beam printer, embodying the present invention.

There are shown recording sheets 1; a sheet cassette 2 for supporting said recording sheets 1; and a sheet feeding cam 3 to be intermittently rotated by a full turn for each sheet, thereby separating the uppermost sheet rom the stacked sheets 1 on the cassette 2 and advancing thus separated sheet to sheet feed rollers 4, 4'.

A reflective photosensor 18 detects the presence or absence of a sheet, by detecting the light reflected from said sheet through a hole 19 provided in the bottom of the cassette 2.

The sheet feed rollers 4, 4', when the sheet is transported thereto by the feed cam 3, transports the sheet 1 by rotation while lightly pinching said sheet 1. When the leading end of the sheet 1 reaches a registration shutter 5, said sheet 1 is stopped by said shutter while the sheet feed rollers 4, 4' continue to rotate, slipping on the sheet 1. When a registration solenoid 6 is energized in this state, the registration shutter 5 is lifted upward whereby the sheet 1 is advanced to transport rollers 7, 7' The registration shutter 5 is driven in synchronization with the timing of forwarding of an image formed by a laser beam 20 on a photosensitive drum 11. A photosensor 21 is provided for detecting the presence of the sheet 1 at the registration shutter 5.

A rotary polygon mirror 52 is driven by a motor 53. The laser beam 20, emitted from a semiconductor laser 51 driven by a laser driver 50, is deflected in the main scanning direction by the polygon mirror 52, then guided through an f-θ lens 56 and a mirror 54 to the photosensitive drum 11, and is focused thereon, thereby scanning said drum in the main scanning direction and forming a latent image along a main scanning line 57. For a printing speed of 8 sheets (A4 or letter size) per minute with a printing density of 300 dot/inch, the laser is turned on for ca. 540 nanoseconds for recording a dot (180 nanoseconds for a sub pixel in case each pixel is divided into three sub pixels). Also for a printing speed of 16 sheet/min. with a printing density of 300 dot/inch, the laser turn-on time is ca. 270 nanoseconds (90 nanoseconds for a sub pixel in case each pixel is divided into three sub pixels). Also for a printing speed of 8 sheet/min. with a printing density of 600 dot/inch, the laser turn-on time for a dot recording is ca. 135 nanoseconds (45 nanoseconds for a sub pixel), and, for a printing speed of 16 sheet/min. with a printing density of 600 dot/inch, the laser turn-on time for a dot recording is ca. 68 nanoseconds (23 nanoseconds for a sub pixel).

With the currently available laser driver for such laser beam printer, the shortest pulsed turn-on time is about 4 nanoseconds (including a start-up time of ca. 1 nanosecond and an extinguishing time of ca. nanosecond). A shorter lighting is either impossible or unstable in time or in intensity. Consequently, the pulse duration for laser activation, for achieving modulation for smoothing, should be about 4 nanoseconds at minimum. A beam detector 55, provided at the scanning start position of the laser beam 20, generates a synchronization signal BD for determining the timing of image recording in the main scanning direction, by detecting the laser beam 20.

Thereafter the sheet 1 is advanced by the transport rollers 7, 7', instead of the feed rollers 4, 4', toward the photosensitive drum 11. On the surface of said photosensitive drum 11, charged by a charger 13, there is formed an electrostatic latent image by the exposure to the laser beam 20. Said latent image is then rendered visible in the form of a toner image in a developing unit 14, and said toner image is transferred, by means of a transfer charger 15, onto said sheet 1. A cleaner 12 is provided for cleaning the drum surface after image transfer.

The sheet 1, having received the transferred image, is subjected to the fixation of said image by fixing rollers 8, 8', and is then discharged by discharge rollers 9, 9' onto a discharge tray 10.

A sheet feed tray 16 is provided for enabling manual sheet feeding, instead of sheet feeding from the cassette 2. A sheet manually fed onto the tray 16 is lightly pressed and advanced by a manual sheet feed roller 17 until the leading end of said sheet reaches the registration shutter 5, whereupon said roller 17 continues to rotate, slipping on the sheet. The subsequent sheet feeding sequence is identical with the case of sheet feeding from the cassette.

The fixing roller 8 incorporates a heater 24, which controls the surface temperature of said fixing roller 8 at a value required for thermal fixing of the toner image on the sheet 1, based on the temperature detected by a thermistor 23 maintained in slip contact with said surface. A photosensor 22 is provided for detecting whether a sheet is present at the fixing rollers 8, 8'.

The above-explained printer is connected through an interface to a controller and effects a printing sequence in response to print commands and image signal received from said controller.

Figure 3:
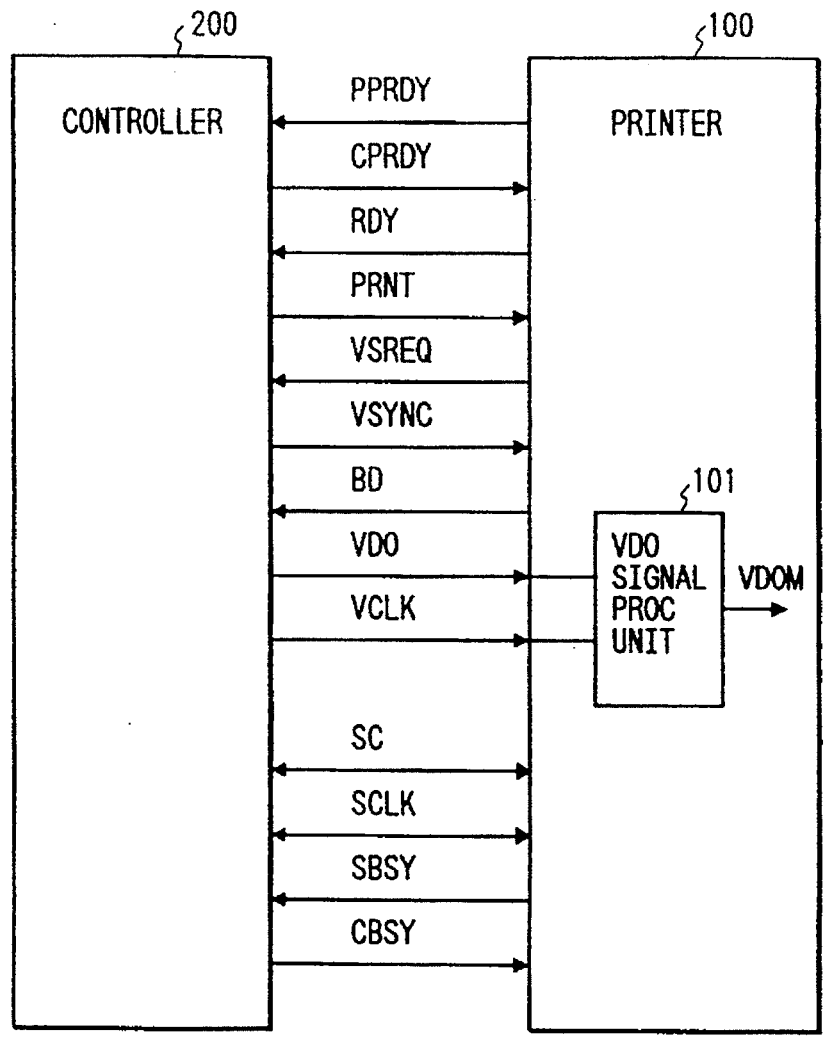
FIG. 3 is a view showing interface signals between the printer engine unit and a controller.

FIG. 3 shows interface signals, between the principal engine unit of the printer and the controller generating the image data, and each of said interface signals will be explained in the following:

PPRDY: a signal from the printer to the controller, indicating that the printer is powered and is ready for operation;

CPRDY: a signal from the controller to the printer, indicating that the controller is powered and is ready for operation;

RDY: a signal from the printer to the controller, indicating that the printer is ready for starting or continuing the printing operation, upon reception of a PRNT signal to be explained later. This signal becomes "false" when the printing operation cannot be executed for example by the absence of sheet in the cassette 2;

PRNT: a signal from the controller to the printer, instructing the start or continuation of the printing operation. Upon reception of this signal, the printer starts the printing operation;

VSREQ: a signal to be sent from the printer to the controller, while the RDY signal from the printer is in the "true" state and after the PRNT signal from the controller is shifted to the "true" state for instructing the start of printing operation, for indicating that the printer is in a state capable of receiving image data. In said state the printer can receive VSYNC signal to be explained later;

VSYNC: a signal from the controller to the printer, for synchronizing the image data transmission in the sub scanning direction. This signal synchronizes the toner image on the photosensitive drum with the sheet in the sub scanning direction;

BD: a signal from the printer to the controller, for synchronizing the timing of transmission of image data in the main scanning direction. This signal indicates that the laser beam is at the start point of main scanning;

VDO: a signal from the controller to the printer, for transmitting image data to be printed. This signal is transmitted in synchronization with a VCLK signal to be explained later. The controller receives code data such as PCL codes transmitted from a host equipment and generates character bit signals by a character generator corresponding to said code data, or receives vector codes such as postscript codes from a host equipment and generates pattern bit data corresponding to said codes, or generates bit image data corresponding data from an image scanner, and transmits thus generated data as the VDO signal to the printer. The printer prints a black or white image respectively when said VDO signal is "true" or "false";

VCLK: a synchronization signal for transmission and reception of said VDO signal, sent from the controller to the printer;

SC: a bidirectional serial signal representing "command" signals from the controller to the printer and "status" signals from the printer to the controller. A synchronization signal SCLK is used for the synchronization of transmission or reception of said SC signal. Also the direction of transmission is controlled by SBSY and CBSY signals to be explained later. Said "command" signal is an 8-bit serial signal, representing an instruction from the controller to the printer, such as a cassette sheet feed mode or a manual sheet feed mode. Said "status" signal is also an 8-bit serial signal, representing information from the printer to the controller, such as a waiting state in which the fixing unit of the printer has not reached the temperature required for printing operation, a sheet jammed state, or a sheetless state in the cassette;

SCLK: a synchronization pulse signal to be used by the printer for fetching the "command" signal, or by the controller for fetching the "status" signal;

CBSY: a signal to be used by the controller for occupying the SC and SCLK signals prior to the transmission of a "command" signal;

SBSY: a signal to be used by the printer for occupying the SC and SCLK signals prior to the transmission of a "status" signal.

The VDO signal, after being received by the printer together with the VCLK signal, is supplied to a VDO signal processing unit 101, which is provided in the printer engine unit for effecting the signal processing of the present invention. In said processing unit, the VDO signal is processed as will be explained later and converted into a VDOM signal, which is supplied to an unrepresented laser driver for on-off control of the aforementioned semiconductor laser.

The function of the above-explained interface will be explained in the following.

When the power supplies to the printer and to the controller are turned on, the printer effects initialization thereof and shifts the PPRDY signal to the controller to the "true" state. Also the controller effects initialization thereof and shifts the CPRDY signal to the printer to the "true" state. Thus the printer and the controller confirm mutually that the power supply of the other unit is turned on.

Then the printer energizes the heater 24 in the fixing rollers 8, 8', and sets the RDY signal at the "true" state when the surface of the fixing roller has reached the required fixing temperature. After confirming the "true" state of the RDY signal, the controller sets the PRNT signal at the "true" state if there are data to be printed. Upon confirming the "true" state of the PRNT signal, the printer rotates the photosensitive drum 11, initializes the surface thereof to a uniform potential, and, in the cassette sheet feed mode, activates the sheet feed cam 3 thereby transporting the sheet until the leading end reaches the registration shutter 5. In the manual sheet feed mode, the sheet fed from the feed tray 16 is transported to the registration shutter 15 by the feed roller 17. Then, upon becoming capable of receiving the VDO signal, the printer sets the VSREQ signal at the "true" state. After confirming said state, the controller sets the VSYNC signal at the "true" state and transmits the VDO signal in succession, in synchronization with the BD signal. Upon confirming the "true" state of the VSYNC signal, the printer energizes the registration solenoid 6, thereby lifting the registration shutter 5, whereby the sheet 1 is transported to the photosensitive drum 11. In response to the VDO signal, the printer turns on or off the laser beam respectively where black or white image is to be printed. Thus a latent image is formed on the photosensitive drum 11, and is developed into a toner image by toner deposition in the developing unit 14. Said toner image is transferred, by the transfer charger 15, onto the sheet 1, which is subjected to image fixation by the fixing rollers 8, 8' and is discharged onto the discharge tray.

Figure 8:
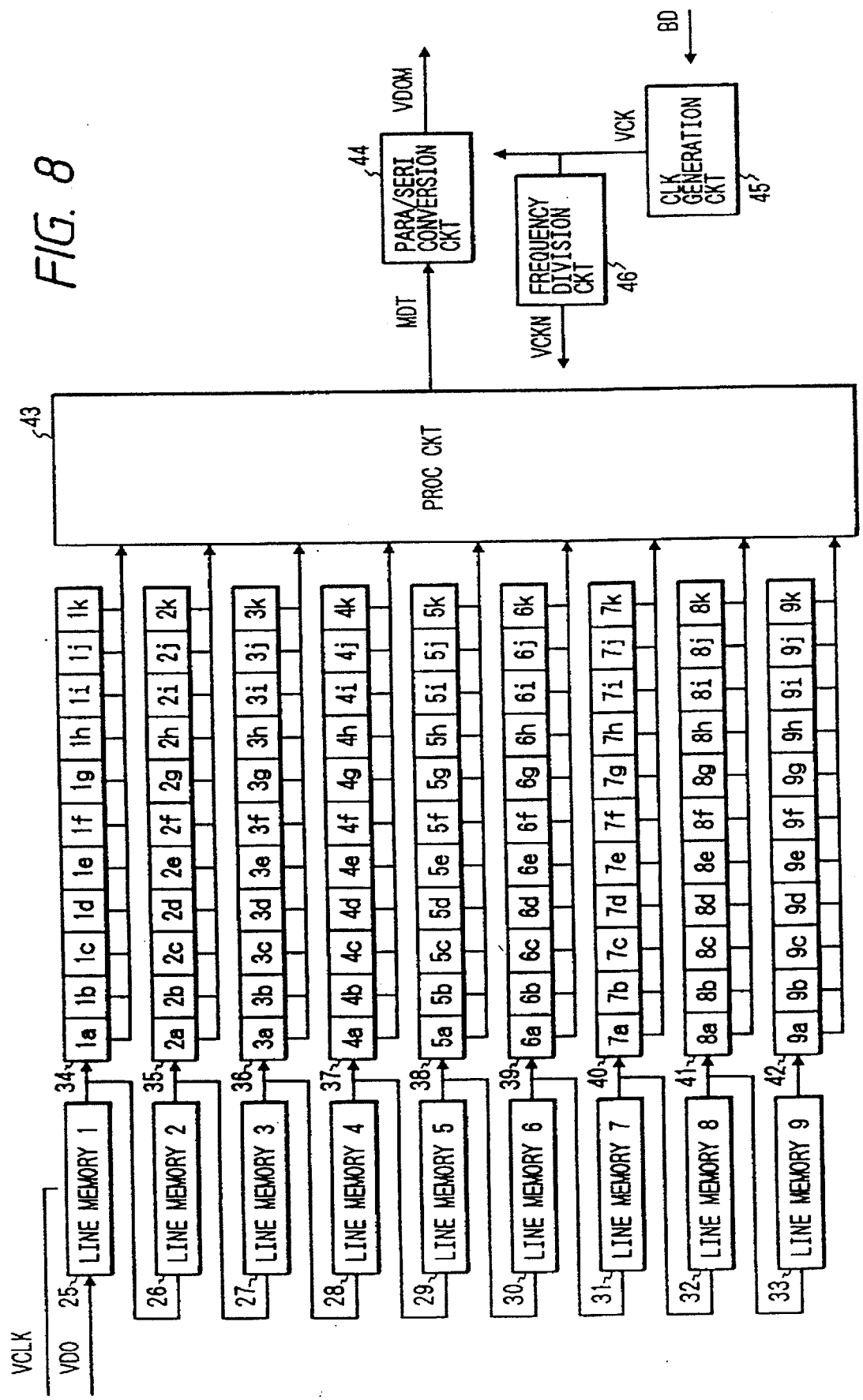
FIG. 8 is a block diagram of a first embodiment of the present invention.

FIG. 8 is a block diagram of the VDO signal processing unit 101 for effecting a smoothing process, in a first embodiment of the present invention applied to a laser beam printer with a print density of 300 dot/inch.

Figure 5:
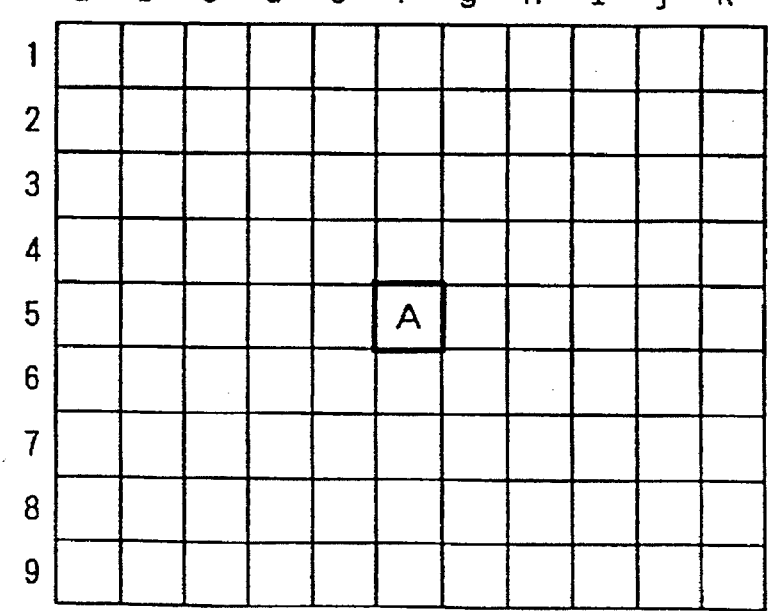
FIG. 5 is a view of a matrix memory.

Said first embodiment is to modify a pixel A to be printed, shown in FIG. 5 (hereinafter called the object pixel), according to the feature of pixel data in a surrounding area (consisting of 11 pixels in the main scanning direction by 9 pixels in the sub scanning direction). More specifically, referring to FIG. 6 and in case of printing an object pixel A among the dot data representing a character "a" with a resolving power of 300 dot/inch, the dot data of an area S surrounding said object pixel A (said area S containing 11 pixels in the main scanning direction by 9 pixels in the sub scanning direction, or 99 pixels in total) are temporarily stored in memory means. Then the data of the object pixel A to be printed are modified according to the feature of the dot data in said area S. Said data modification is conducted in such a manner that the contour of the pattern formed by said dot data appears more smoothly. In this 1st embodiment, the object pixel A is composed, as shown in FIG. 10, of four sub pixels (x1, x2, x3, x4) divided in the main scanning direction. Therefore, the density of the obtained print is equivalent to 1200 dot/inch in the main scanning direction and 300 dot/inch in the sub scanning direction. For attaining the expected smoothing effect, the object pixel A has to be divided into at least three sub pixels.

Referring to FIG. 8, line memories 25–33 store the entered image data VDO by successive shiftings in synchronization with the clock signal VCLK, and each of said line memories has a capacity for storing dot data corresponding to the main scanning length of the page to be printed. Said line memories are serially connected and are capable of storing dot information of 9 lines in the sub scanning direction. Shift registers 34–42 are provided respectively corresponding to said line memories and receive the output signals therefrom. Said shift registers, each composed of 11 bits, constitute a dot matrix memory of 1a–1k, 2a–2k, 3a–3k, ... 9a–9k, having 11 dots in the main scanning direction and 9 dots in the sub scanning direction. In said matrix memory, a central dot 5f is defined as the object dot. A processing circuit 43, for detecting the feature of the data memorized in said dot matrix memory and accordingly modifying said object pixel 5f for the purpose of smothing, receives the data of the bits of said shift registers (99 bits in total from 1a to 9k) and releases a parallel signal MDT after modification. A parallel-serial conversion circuit 44 converts the entered parallel signal MDT into a serial signal VDOM, thereby driving the laser 55 through an unrepresented laser driver. In this 1st embodiment, the parallel signal is composed of 4 bits (X1, X2, X3, X4).

A main scanning line is processed in succession in a similar manner.

A clock generation circuit 45 receives the main scanning synchronization signal BD and generates a clock signal VCK synchronized therewith and having a frequency of 4 times of the clock frequency f0 required for recording of 300 dot/inch in the main scanning direction. Said serial signal VDOM is released in succession, in synchronization with said clock signal VCK. A frequency dividing circuit 46 divides the frequency of said clock signal VCK to ¼, thereby generating a clock signal VCKN of the frequency f0, which is utilized as the synchronization clock signal for fetching the dot data from said dot matrix memory into the processing circuit 43.

Referring to FIG. 8, when the image signal VDO of a resolving power of 300 dot/inch is transmitted from the controller to the printer in synchronization with the image clock signal VCLK, the image dot data are stored in succession in the line memories, and at the same time dot matrix information of 11 dots in the main scanning direction by 9 dots in the sub scanning direction are taken out from the line memories into the shift registers. Subsequently the processing circuit 43 detects the feature of said dot matrix information, and generates modified data X1–X4 representing four areas divided in the main scanning direction in the object pixel, according to thus detected feature.

Figures 11A, 11B, 12:
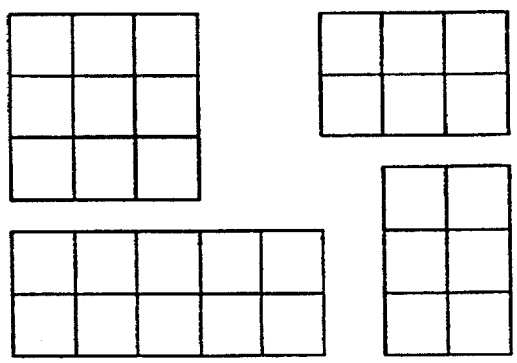
FIGS. 11A, 11B and 12 are views showing the algorithm for extracting the feature of data, employed in said embodiment.

FIGS. 11A, 11B and 12 illustrate an algorithm for extracting the feature of the dot pattern from the entire matrix area of 11 dots in the main scanning direction by 9 dots in the sub scanning direction, and discriminating whether the dot pattern requires smoothing.

FIG. 11A illustrates the reference area of 99 pixels in total, consisting of 11 pixels a, b, c, d, e, f, g, h, i, j, k in the main scanning direction by 9 pixels 1, 2, 3, 4, 5, 6, 7, 8, 9 in the sub scanning direction, in which a central pixel 5f constitutes the optical pixel for modification for smoothing. FIG. 11B shows the reference area, shown in FIG. 11A, divided into 17 areas X1–X8, Y1–Y8 and 5f. The area X1 consists of dots 3d, 3e, 3f, 4d, 4e, 4f,; X2 of 3f, 3g, 3h, 4f, 4g, 4h; X3 of 6d, 6e, 6f, 7d, 7e, 7f; X4 of 6f, 6g, 6h, 7f, 7g, 7h; X5 of 3d, 3e, 4d, 4e, 5d, 5e; X6 of 5d, 5e, 6d, 6e, 7d, 7e; X7 of 3h, 4g, 4h, 5g, 5h; and X8 of 5g, 5h, 6g, 6h, 7g, 7h, each consisting of 6 dots. Also the area Y1 consists of 1a, 1b, 1c, 2a, 2b, 2c, 3a, 3b, 3c; Y3 of 1i, 1j, 1k, 2i, 2j, 2k, 3i, 3j, 3k; Y4 of 4i, 4j, 4k, 5i, 5j, 5k, 6i, 6j, 6k; Y5 of 7i, 7j, 7k, 8i, 8j, 8k, 9i, 9j, 9k; Y7 of 7a, 7b, 7c, 8a, 8b, 8c, 9a, 9b, 9c; and Y8 of 4a, 4b, 4c, 5a, 5b, 5c, 6a, 6b, 6c, each consisting of 9 dots. Also the area Y2 consists of 1d, 1e, 1f, 1g, 1h, 2d, 2e, 2f, 2g, 2h; and Y6 of 8d, 8e, 8f, 8g, 8h, 9d, 9e, 9f, 9g, 9h, each consisting of 10 dots. Thus the above-mentioned reference area is divided into eight 6-dot areas (X1–X8), six 9-dot areas (Y1, Y3, Y4, Y5, Y7, Y8), two 10-dot areas (Y2, Y6) and the central pixel 5f.

The feature of each area is represented by Xn or Yn. If all the pixels in an area are same (all white or all black pixels), the feature Xn or Yn of said area is defined as "0". If all the pixels in an area are not same (white (o) and black (•) pixels being mixed), the feature Xn or Yn of said area is defined as "1". As an example, if the area X1 consists of all white dots, the feature of said area X1 is defined as X1="0". If the area consists of all black dots, the feature is defined as X1="0". If the area consists of black and white dots, the feature is defined as X1="1". The features of the above-mentioned areas are detected by circuits shown in FIG. 30, in which exclusive OR gates A1–A16 respectively apply exclusive logic (output "0" if all the input signals are same; output "1" if any of the input signals is different) to the above-mentioned areas X1–X8, Y1–Y8, thereby obtaining features X1–X8, Y1–Y8. A circuit shown in FIG. 31, consisting of inverters B1–B8 and an OR gate C1, detects that at least one of the feature Yn in the areas Y1–Y8 is "0". The feature signals Y1–Y8 of said areas are respectively inverted by the inverters B1–B8 and supplied to the OR gate C1, whereby the output 21 thereof assumes a value "1" in case at least one of said signals Y1–Y8 is "0".

FIGS. 13A–13C, 14A–14C, 15A–15C and 16A–16C illustrate certain examples in which smoothing is to be applied to a pattern having a nearly vertical boundary, utilizing the features of the above-mentioned areas.

In the smoothing of a nearly vertical boundary, for an image formed by continuous same data, the modified data have to be so prepared that at least one black sub pixel is generated in continuation to said image. Also the smoothing of an image with a nearly horizontal boundary, inclined by at least 45° from the vertical line can be made more effective by this method.

FIGS. 13A to 13C show a case in which the image boundary around the object pixel 5f assumes a dot pattern as shown in FIG. 13A (3f, 4e, 4f, 5e and 6e are white dots, while 3g, 4g, 5f and 6f are black dots), the areas X5=X6 in their features, and at least one of the features of the areas Y1–Y8, X7, X8 and X4 is "0". In such case the object pixel 5f is modified to x1=0 (white), x2=0 (white), x3=1 (black) and x4=1 (black).

In case at least one of the features of the areas Y1–Y8, X7, X8 and X4 is "0", the image is identified not a halftone image and the smoothing process is executed. In case the features of all the areas Y1–Y8, X7, X8 and X4 are "1", the image may be a halftone image, so that the smoothing process is inhibited. In the following, the discrimination that at least one of the features of the areas Y1–Y8 and Xn is "0" is conducted for identifying whether the image is a halftone image.

Figures 14A, 14B, 14C:
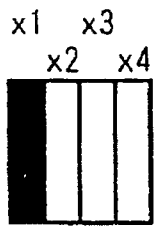

FIGS. 14A to 14C show a case in which the image boundary around the object pixel 5f assumes a dot pattern as shown in FIG. 14A (3f, 4f, 5e and 6e being black dots, while 3g, 4g, 5g, 5f and 6f being white dots), the areas X7 and X8 are same in feature, and at least one of the features of the areas Y1–Y8, X5 and X6 is "0". In such case the object pixel 5f is modified to x1=1 (black), x2=0 (white), x3=0 (white) x4=0 (white).

FIGS. 15A to 15C show a case in which the image boundary around the object pixel 5f assumes a dot pattern as shown in FIG. 15A (2f, 3e, 3f, 4e, 5e, 6e and 7e being white dots, while 2g, 3g, 4f, 5f, 6f and 7f being black dots), the areas X5 and X6 are same in feature, and at least one of the features of the areas Y1–Y8, X7 and X8 is "0". In such case, the object pixel 5f is modified to x1=0 (white), x2=0 (white), x3=1 (black) and x4=1 (black).

FIGS. 16A to 16C illustrate a case in which the image boundary around the object pixel 5f assumes a dot pattern shown in FIG. 16A (2f, 3f, 4e, 5e, 6e and 7e being black dots while 2g, 3g, 4f, 5f, 6f and 7f being white dots), the areas X7 and X8 are same in feature, and at least one of the features of the areas Y1–Y8, X5 and X6 is "0". In such case the object pixel 5f is modified to x1=1 (black), x2=0 (white), x3=0 (white) and x4=0 (white).

In practice, each of the patterns shown in FIGS. 13A–13C, 14A–14C, 15A–15C and 16A–16C has a laterally symmetrical pattern with respect to the object pixel. For example, a pattern laterally symmetrical to the pattern shown in FIGS. 13A–13C is represented in FIGS. 17A–17C. Thus, when $3e=4e=5f=6f=1$ (black) while $3f=4f=4g=5g=6h=0$ (white), the areas X7 and X8 are equal in feature and at least one of the features of the areas Y1–Y8, X5, X6 and X3 is "0", the object pixel 5f is modified to x1=1, x2=1, x3=0 and x4=0.

Laterally symmetrical algorithms are similarly set for the patterns shown in FIGS. 14A–16C.

Such laterally symmetrical feature extracting algorithms allow to conduct the smoothing on the characters "O", "U", "V", "W" etc. in symmetrical manner, thereby causing these characters to appear in natural manner.

FIGS. 26A to 26C illustrate the result of smoothing algorithms explained in FIGS. 13A to 16C. When a line signal of a dot width shown in FIG. 26A is smoothed with said algorithms, there are obtained print signals as shown in FIG. 26B, and an actual print as shown in FIG. 26C. As shown in these drawings, in the algorithms of the present embodiment, the signal in the diagonal portion subject to the smoothing process is made narrower by 25% in comparison with the original signal width. As a result, in the toner image actually obtained on the recording sheet, the line width in the smoothed portion is substantially same as that of the unsmoothed portion, as shown in FIG. 26C.

This is based on an electrophotographic phenomenon that the toner deposition takes place in a larger amount in the corner portion of the latent image. Although the smoothing effect can be obtained by employing an algorithm giving a same signal width in the smoothed portion as in the unsmoothed portion, as shown in FIGS. 27A and 27B, the actually printed toner image becomes wider in the smoothed portion than in the unsmoothed portion, as shown in FIG. 27B, because of the above-mentioned phenomenon. This will result in a local broadening of a line, particularly conspicuous in a fine line, so that the algorithms explained in FIGS. 26A to 26C are preferable.

In general, in the laser beam printer of so-called image exposure process, in which the toner is deposited in the area exposed to the laser beam, said line broadening can be prevented by reducing the signal width by 5 to 35% in the smoothed portion. The amount of said reduction is determined according to the particle size of toner and the electrophotographic conditions.

On the other hand, in the laser beam printer of so-called inverted exposure process (also called background exposure process) in which the toner is deposited in the area not exposed to the laser beam, the printed line width becomes narrower in the smoothed portion. Such line thinning can be prevented by increasing the signal width by 5 to 35% in the smoothed portion, in comparison with the original signal width.

Figure 30:
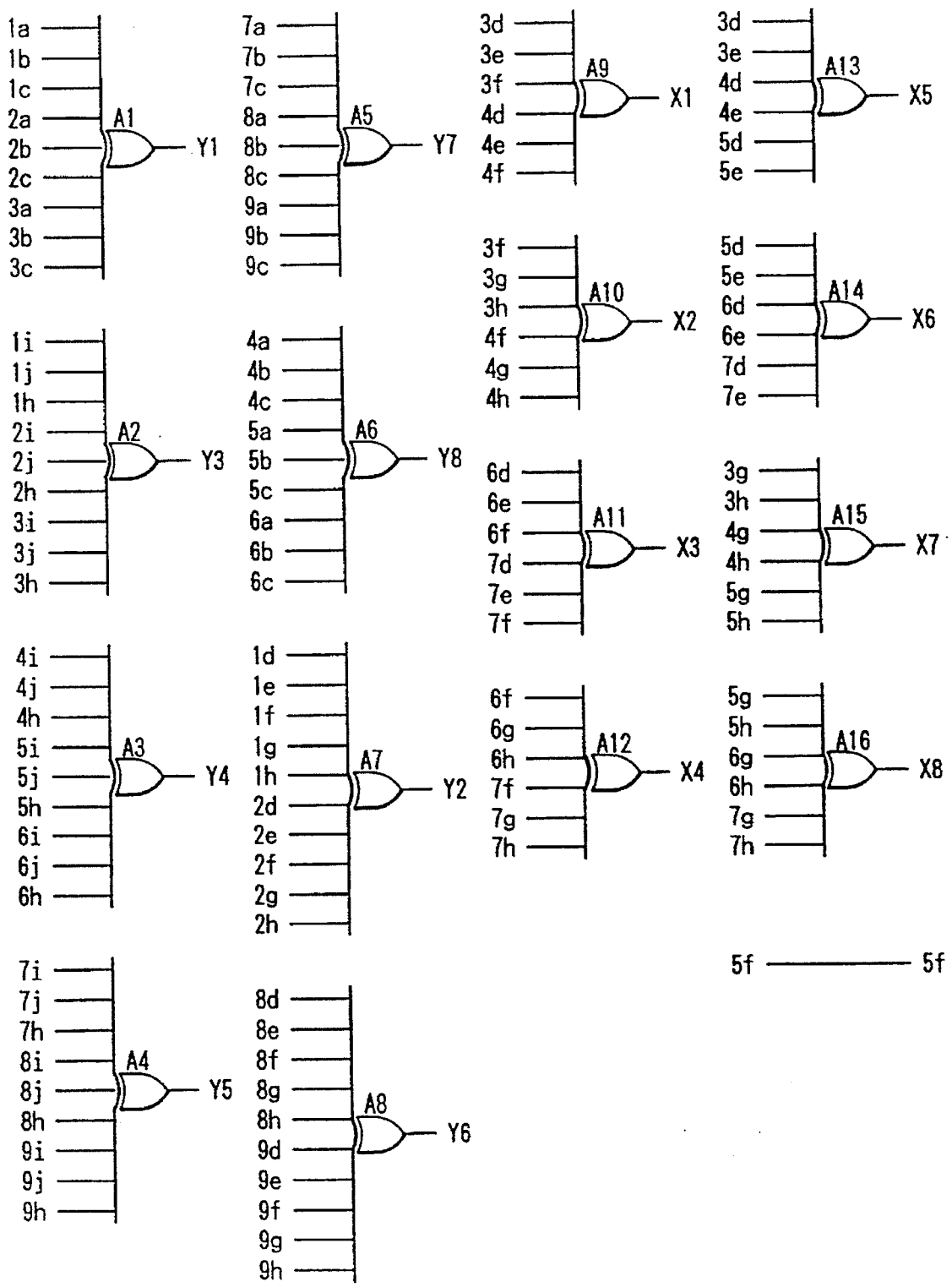
FIGS. 30 to 35 are views showing examples of the feature extracting circuit in said embodiment.

FIGS. 32 to 35 illustrate circuits for effecting the feature extraction corresponding to FIGS. 13A to 16C. In FIGS. 32 to 35, there are shown inverters B1–B10, an OR gate C1, an exclusive OR gate D1, and AND gates E1, E2. As the circuits shown in these drawings are similar, the following description will be concentrated on the circuit shown in FIG. 32. With respect to the dot pattern defining the image boundary around the object pixel, the data of the pixels 3f, 4e, 4f, 5e and 6e are inverted by the inverters B1–B5 and supplied, together with those of the pixels 3g, 4g, 5f and 6f, to the AND gate E1, of which output is supplied to the AND gate E2. Signals X5 and X6 are supplied to the exclusive OR gate D1, of which output is supplied, after inversion by the inverter B9, to the AND gate E2. Also the signals X4, X7, X8 shown in FIG. 30 are respectively inverted by the inverters B6–B8 and supplied, together with the signal Z1, to the OR gate C1, of which output is supplied to the AND gate E2. The output PN1 of the AND gate E2 assumes the value "1" when all the AND gate E1, the inverter B9 and the OR gate C1 provide output signals "1", and is supplied to an OR gate Q13 in a circuit shown in FIG. 36.

Figure 33:
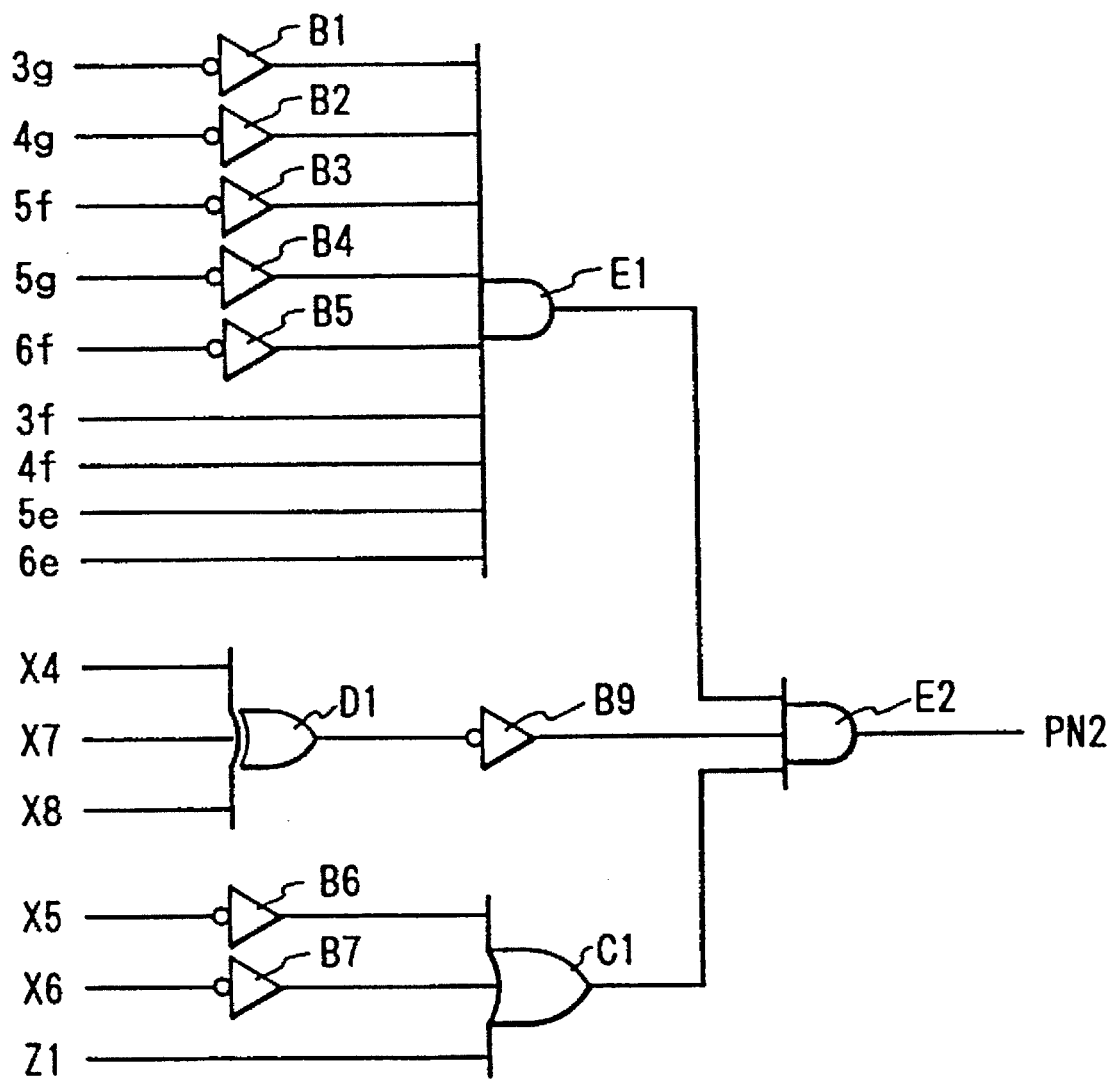
Figure 36:
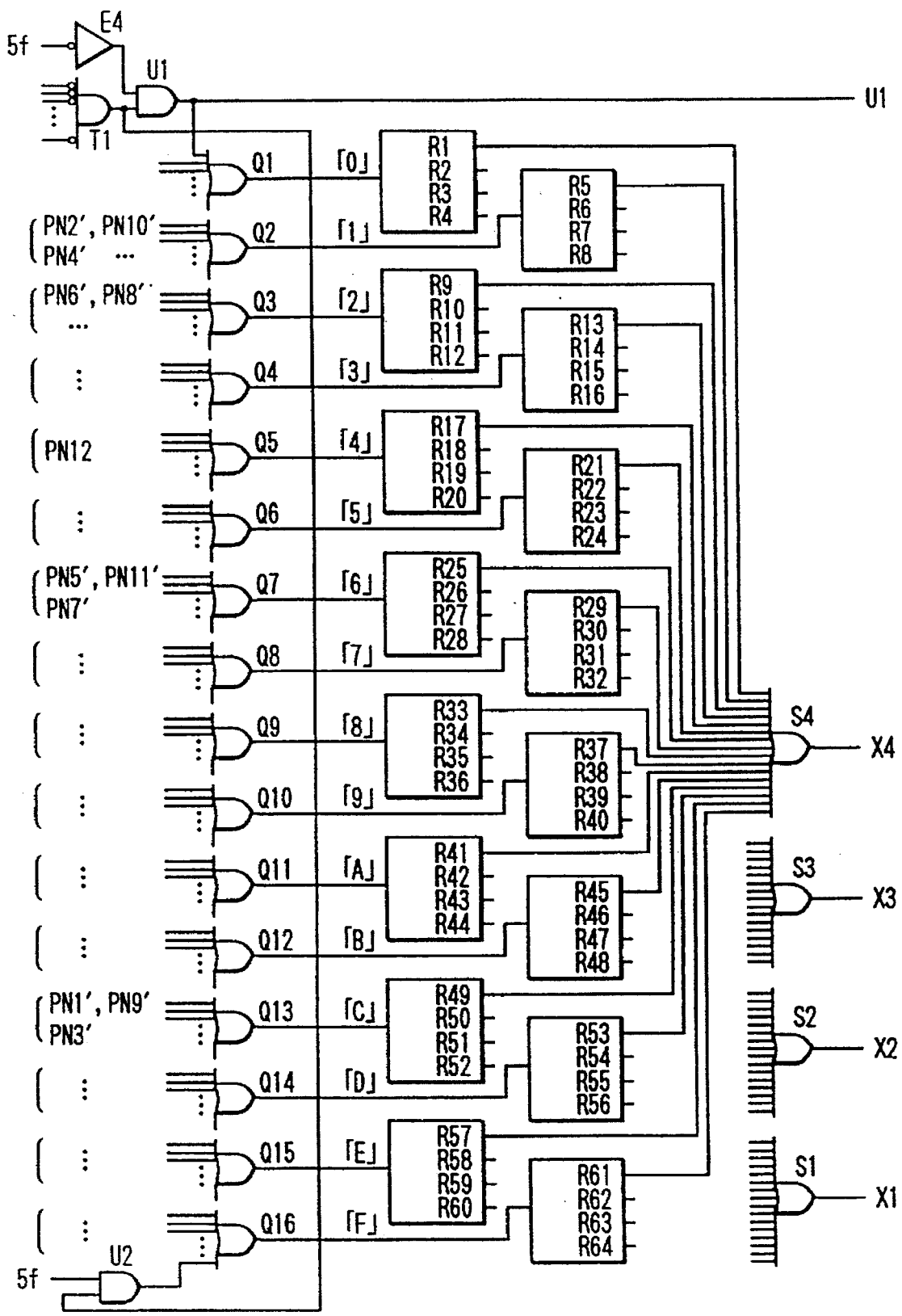
FIG. 36 is a circuit diagram showing an example of the variation signal generating unit of said embodiment.

Similarly an output signal PN2 of the circuit shown in FIG. 33 is supplied to an OR gate Q2 in the circuit shown in FIG. 36.

Figure 34:
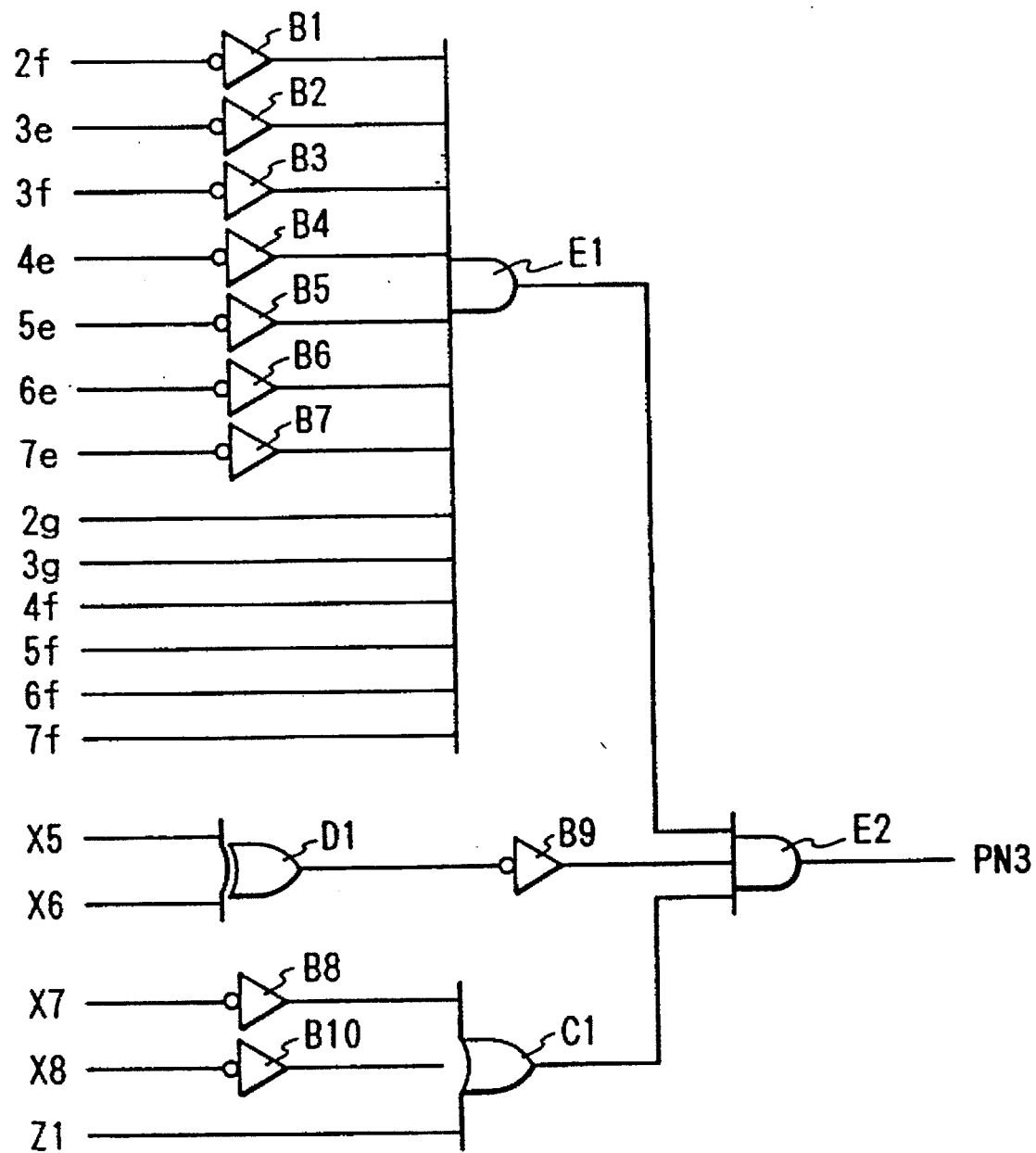

Similarly an output signal PN3 of the circuit shown in FIG. 34 is supplied to an OR gate Q13 of the circuit shown in FIG. 36.

Figure 35:
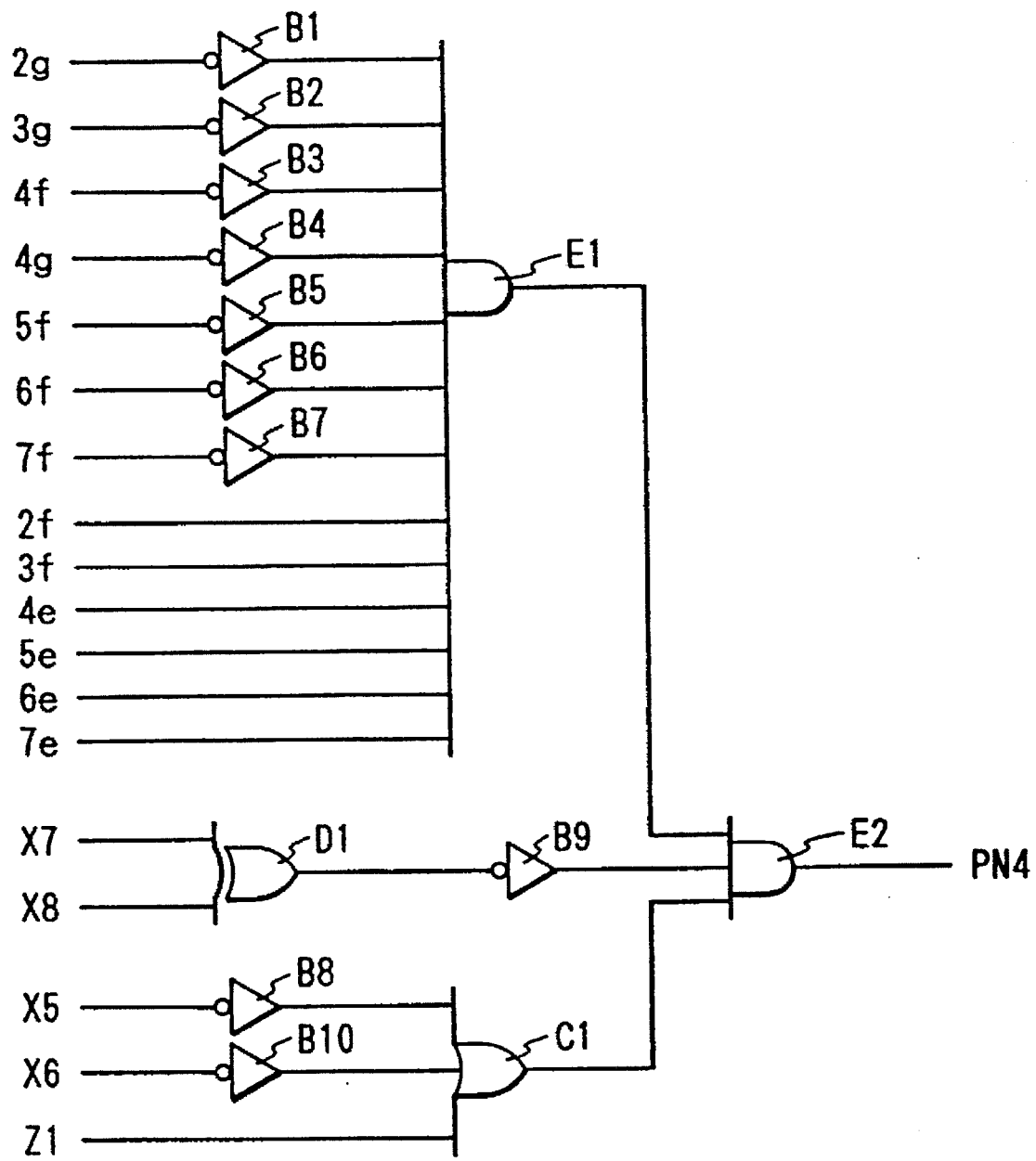

Similarly an output signal PN4 of the circuit shown in FIG. 35 is supplied to the OR gate Q2 of the circuit shown in FIG. 36.

FIGS. 18A–18C, 19A–19C, 20A–20C and 21A–21C illustrate certain examples in which smoothing is to be applied to a pattern having a nearly horizontal boundary, utilizing the features of the above-mentioned areas.

FIGS. 18A to 18C show a case in which the image boundary around the object pixel 5f assumes a dot pattern as shown in FIG. 18A (5d, 5e, 4e, 4f, 4g and 4h being white dots, while 6d, 6e, 5f, 5g and 5h being black dots), the areas X5 and X2 are same in feature, and at least one of the features of the areas Y1–Y8, X3 and X4 is "0". In such case the object pixel 5f is modified to x1=0 (white), x2=1 (black), x3=1 (black) and x4=0 (white).

FIGS. 19A to 19C show a case in which the image boundary around the object pixel 5f assumes a dot pattern as shown in FIG. 19A (5d, 5e, 4f, 4g and 4h being black dots, while 6d, 6e, 6f, 5f, 5g and 5h being white dots), the areas X3 and X4 are same in feature, and at least one of the features of the areas Y1–Y8, X1 and X2 is "0". In such case the object pixel 5f is modified to x1=0 (white), x2=1 (black), x3=0 (white) and x4=0 (white).

FIGS. 20A to 20C show a case in which the image boundary around the object pixel 5f assumes a dot pattern as shown in FIG. 20A (5c, 5d, 4e, 4f, 4h and 4i being white dots, while 6c, 6d, 5e, 5f, 5g, 5h and 5i being black dots), the areas X1 and X2 are equal in feature, and at least one of the features of the areas Y1–Y8, X3 and X4 is "0". In such case the object pixel 5f is modified to x1=0 (white), x2=1 (black), x3=1 (black) and x4=0 (white).

FIGS. 21A to 21C show a case in which the image boundary around the object pixel 5f assumes a dot pattern as shown in FIG. 21A (5c, 5d, 4e, 4f, 4g, 4h and 4i being black dots while 6c, 6d, 6e, 5f, 5g, 5h and 5i being white dots), the areas X3 and X4 are same in feature, and at least one of the features of the areas Y1–Y8, X1 and X2 is "0". In such case, the object pixel 5f is modified to x1=0 (white), x2=1 (black), x3=0 (white) and x4=0 (white).

In the smoothing of a nearly horizontal boundary of an image formed by continuous same data, the modified data have to be so prepared that white data of at least a sub pixel is sandwiched between black data whereby a variation in density is printed in the modified pixel. Such modification cannot be achieved in a pixel divided into two sub pixels, and the pixel should therefore be divided into at least three sub pixels. The smoothing of an image with a nearly horizontal boundary, inclined by less than 45° from the horizontal line, can be made effectively by the above-explained method.

Figure 28A:
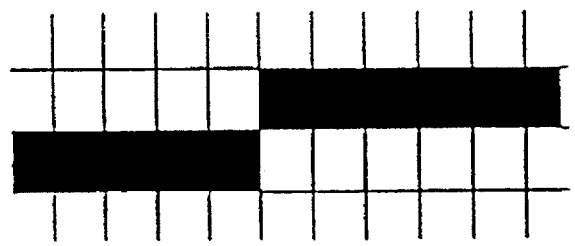
Figure 28B:
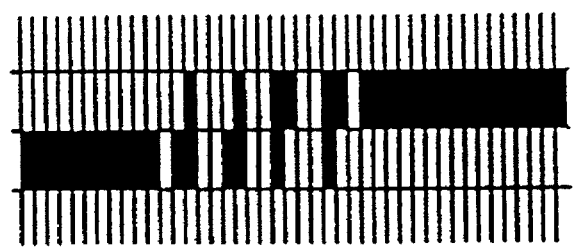

FIGS. 28A and 28B illustrate the result of smoothing algorithms explained in FIGS. 18A–18C, 19A–19C, 20A–20C and 21A–21C. When a nearly horizontal line signal of a dot width shown in FIG. 28A is smoothed with, said algorithm, there are obtained image signals shown in FIG. 28B.

Figure 29A:
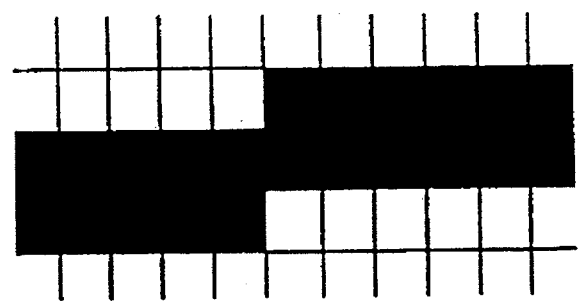
Figure 29B:
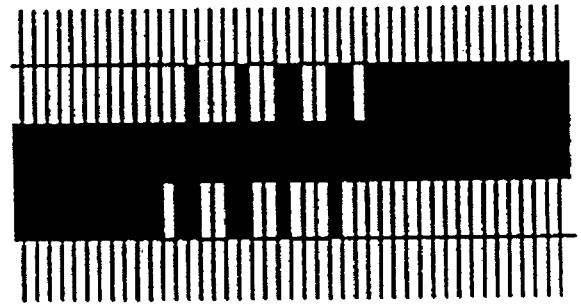

Also when a nearly horizontal line signal of two dot-width shown in FIG. 29A is smoothed with said algorithm, there are obtained image signals shown in FIG. 29B.

In the algorithm of the present embodiment, as will be apparent from these drawings, modification is made in 8 pixels around 2 pixels positioned on the inflection point. In this case, each modified pixel is modified into pulse signals each shorter than a pixel and involving white spaces. The smoothing effect is therefore represented over 4 pixels in the lateral direction.

The smoothing effect on a nearly horizontal image boundary can be further improved by the addition of the following algorithm.

FIGS. 37A–37C and 38A–38C illustrate said added algorithm.

FIGS. 37A to 37C show a case in which the image boundary around the object pixel 5f assumes a dot pattern as shown in FIG. 37A (5b, 5c, 4c, 4d, 4e, 4f, 4g, 4h, 4i and 4j being white dots, while 6b, 6c, 5d, 5e, 5f, 5g, 5h, 5i and 5j being black dots), the areas X1 and X2 are equal in feature, and at least one of the features of the areas Y1–Y8, X3 and X4 is "0". In such case the object pixel is modified to x1=0 (white), x2=1 (black), x3=1 (black) and x4=0 (white).

Figures 38A, 38B, 38C:
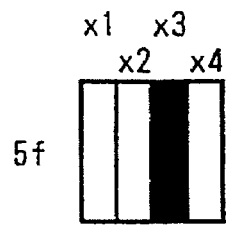

FIGS. 38A to 38C show a case in which the image boundary around the object pixel 5f assumes a dot pattern as shown in FIG. 38A (5b, 5c, 4d, 4e, 4f, 4g, 4h, 4i and 4j being black dots, while 6b, 6c, 6d, 5d, 5e, 5f, 5g, 5h, 5i and 5j being white dots), the areas X3 and X4 are equal in feature, and at least one of the features of the areas Y1–Y8, X1 and X2 is "0". In such case the object pixel 5f is modified to x1=0 (white), X2=0 (white), x3=1 (black) and x4=0 (white).

The result of smoothing, on the nearly horizontal line of two-dot width shown in FIG. 29A, with the addition of the above-explained algorithm is shown in FIG. 39A. The second algorithm of the present embodiment, including the additional algorithm, modifies 12 pixels around 3 pixels centered at the inflection point, as shown in FIG. 39A. Also in this case, each modified pixel is modified into shorter pulse signals involving white spaces. Consequently, the smoothing effect is represented over 6 pixels in the lateral direction. The toner image actually printed on paper in this case is shown in FIG. 39B. Because of the effect of electrophotographic process, an area subjected to pulse width modulation for smoothing appears as a diagonal image. It is also possible to add an algorithm for extending the modified portion in the lateral direction, thereby further enhancing the smoothing effect. As explained in the foregoing, the smoothing effect on a nearly horizontal image boundary can be improved by a modification over three or more pixels which are centered at the inflection point.

Circuits for detecting the above-explained features can be constructed in a similar manner as those shown in FIGS. 32 to 35. Output singals PN5, PN6, PN7, PN8 of the feature detecting circuits respectively corresponding to FIGS. 18A–18C, 19A–19C, 20A–20C and 21A–21C are respectively supplied to OR gates Q7, Q3, Q7, Q3 of the circuit shown in FIG. 36.

Also output signals PN11, PN12 of the feature detecting circuits respectively corresponding to FIGS. 37A–37C, 38A–38C are supplied respectively to OR gates Q7, Q5, of the circuit shown in FIG. 36.

In practice, each of the patterns shown in FIGS. 18A–18C, 19A–19C, 20A–20C and 21A–21C has a laterally symmetrical pattern with respect to the object pixel. For example, a pattern laterally symmetrical to the pattern shown in FIGS. 18A–18C is represented in FIGS. 22A–22C. Thus, when $5d=5e=5f=6g=6h=1$ (black) while $4d=4e=4f=4g=5g=6h=0$ (white), the areas X1 and X7 are same in feature and at least one of the features of the areas Y1–Y8, X3 and X4 is "0", the object pixel $5f$ is modified to x1=0, x2=1, x3=1 and x4=0.

Laterally symmetrical algorithms are similarly set for the patterns shown in FIGS. 19A to 21C.

Such laterally symmetrical feature extracting algorithms allow to conduct the smoothing on the characters "O", "U", "V", "W", etc. in symmetrical manner whereby these characters appear in natural manner.

FIGS. 23A–23C and 24A–24C illustrate circuit examples in which smoothing is applied to a pattern having a diagonal boundary directed to upper right, utilizing the features of the above-mentioned areas.

FIGS. 23A–23C show a case in which the image boundary around the object pixel $5f$ assumes a dot pattern as shown in FIG. 23A ($7d$, $6d$, $5e$, $4f$ and $3g$ being white dots, while $7e$, $6e$, $5f$, $4g$ and $3h$ being black dots), the areas X1 and X5 are same in feature, and at least one of the features of the areas Y1–Y8, X7 and X4 is "0". In such case, the object pixel $5f$ is modified to x1=0 (white), x2=0 (white), x3=1 (black) and x4=1 (black).

FIGS. 24A–24C shows a case in which the image boundary around the object pixel $5f$ assumes a dot pattern as shown in FIG. 24A ($7d$, $6d$, $5e$, $4f$ and $3g$ being black dots, while $7e$, $6e$, $5f$, $4g$ and $3h$ being white dots), the areas X4, X8 and $5f$ are same in feature, and at least one of the features of the areas Y1–Y8, X1 and X5 is "0". In such case, the object pixel is modified to x1=1 (black), x2=0 (white), x3=0 (white) and x4=0 (white).

Circuits for detecting the above-explained features can De constructed in a similar manner as those shown in FIGS. 32 to 35. Output signals PN9, PN10 of the feature detecting circuits respectively corresponding to FIGS. 23A–23C and 24A–24C are supplied to OR gates Q9, Q2 of the circuit shown in FIG. 36.

In practice, each of the patterns shown in FIGS. 23A–23C and 24A–24C has a laterally symmetrical pattern with respect to the object pixel. For example, a pattern laterally symmetrical to the pattern shown in FIG. 23A–23C is represented in FIGS. 25A–25C. Thus, when $3d=4e=5f=6g=7g=1$ (black) while $3e=4f=5g=6h=7h=0$ (white), the areas X2 and X7 are same in feature, and at least one of the features of the areas Y1–Y8, X5 and X3 is "0", the object pixel is modified to x1=1, x2=1, x3=0 and x4=0.

A laterally symmetrical algorithm is similarly set for the pattern shown in FIGS. 24A–24C.

Such laterally symmetrical feature extracting algorithms allow to conduct the smoothing on the characters "O", "U", "V", "W", etc. in symmetrical manner, whereby these characters appear in natural manner.

In addition to the feature detecting circuits of the above-mentioned algorithms, there may be added plural feature detecting circuits for further improving the smoothing effect.

Figure 48:
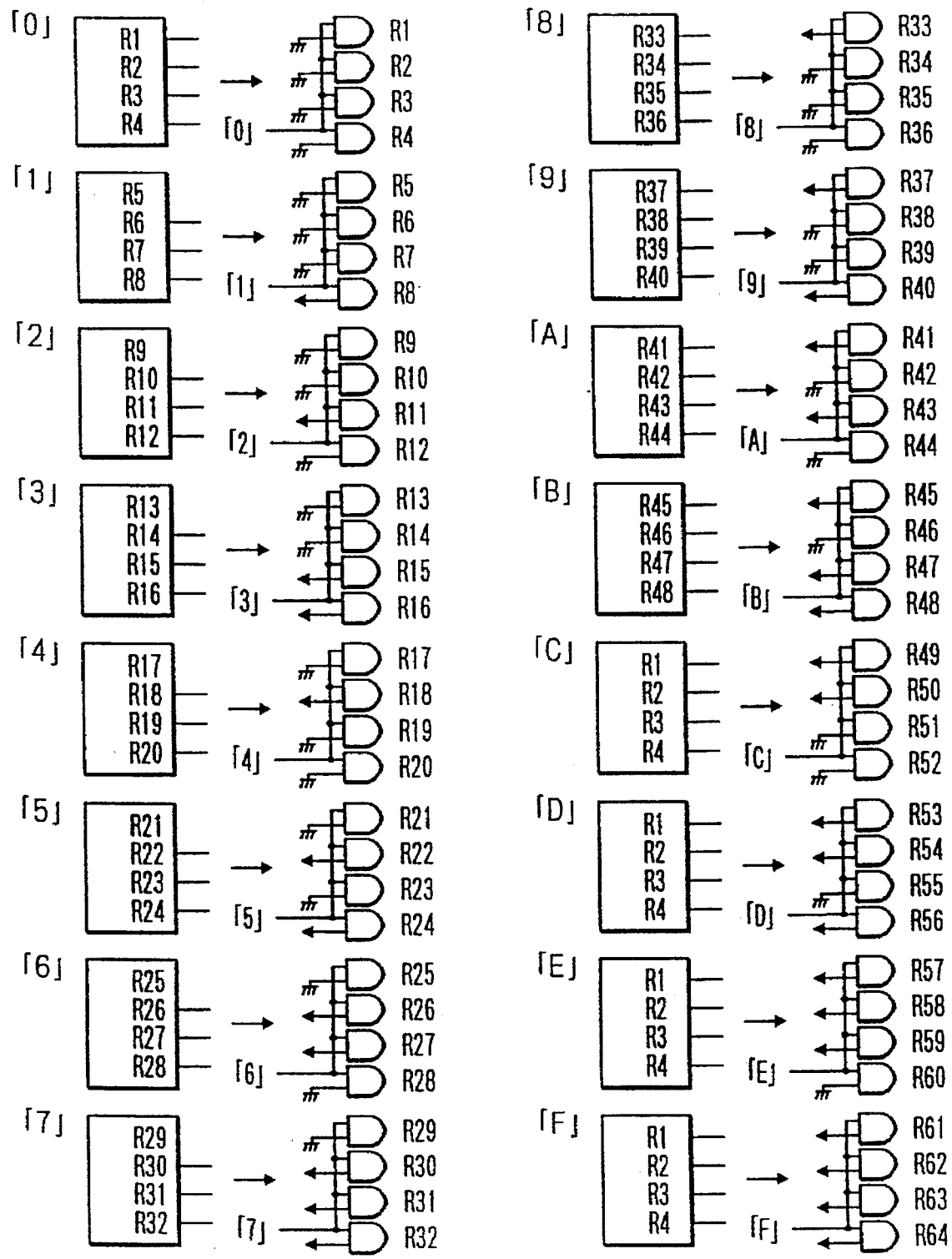
FIG. 48 is a detailed circuit diagram of a part of the circuit shown in FIG. 47.

FIG. 36 shows a data generation circuit, for generating data of the object pixel $5f$, based on the output signals received from plural feature detecting circuits, including those explained above, wherein provided are OR gates Q1–Q16, 2-input AND gates R1–R64, 16-input OR gates S1–S4, an inverter E4, and a NOR gate T1. Each of the output signals from the above-explained plural feature extracting circuits is supplied to one of the OR gates Q1–Q16. AND gates R1–R64 are connected as shown in FIG. 48. Among the outputs of the feature extracting circuits PN2, PN4 and PN10 are supplied to the OR gate Q2; PN6 and PN8 to Q3; PN12 to Q5; PN5, PN7, PN11 to Q7; PN1, PN3 and PN9 to Q13 etc.

Also the output signals from all the feature extracting circuits, including PN1–PN12 mentioned above, are supplied to the NOR gate T1. The AND gates R1–R64 constitute code generating circuits, each of which is composed of four AND gates and which generate 4-bit codes "0"–"F", said 4 bits being represented by 20 (for example from R4), 21 (for example from R3), 22 (for example from R2) and 23 (for example from R1). The digits 20 of said codes are supplied to the OR gate S1 which releases an output signal x1. Also the digits 21 of said codes are supplied to the OR gate S2 which releases an output x2. Similarly the digits 22 are supplied to the OR gate S3 releasing an output x3, and the digits 23 are supplied to the OR gate S4 releasing an output x4.

Therefore, in response to the output of the OR gates Q1–Q16, of which only one can be selected at a time, there is generated one of the codes "0"–"F", providing a corresponding set of signals x1–x4 from the OR gates S1–S4.

For example a code "3" provides a set of signals x1=1, x2=1, x3=0 and x4=0, and a code "9" provides a set of signals x1=1, x2=0, x3=0 and x4=1.

The NOR gate T1, receiving all the feature extraction signals, generates an output signal "1" in case none of said feature extraction signals is (case of no coincidence with any of the feature patterns). In such situation, if the object pixel $5f$ is a white dot, the 2-input AND gate U1 provides an output signal "1" to release an output signal "1" (code "0") from the OR gate Q1, thus providing x1=0, x2=0, x3=0 and x4=0. Also if the object pixel is a black dot, the 2-input AND gate U2 provides an output signal "1" to release a signal "1" (code "F") from the OR gate Q16, thus providing x1=1, x2=1, x3=3 and x4=4. In this manner the data of the object pixel $5f$ are conserved and printed without modification in case the input image does not coincide with any of the predetermined features.

The output signals x1–x4 of the above-explained data generation circuit are converted, by a known parallel-serial conversion circuit 44, into the signal VDOM consisting of serial signals x1, x2, x3, x4 released in synchronization with the clock signal VCK and used for driving the laser through the laser driver.

Figures 43A, 43B, 43C:
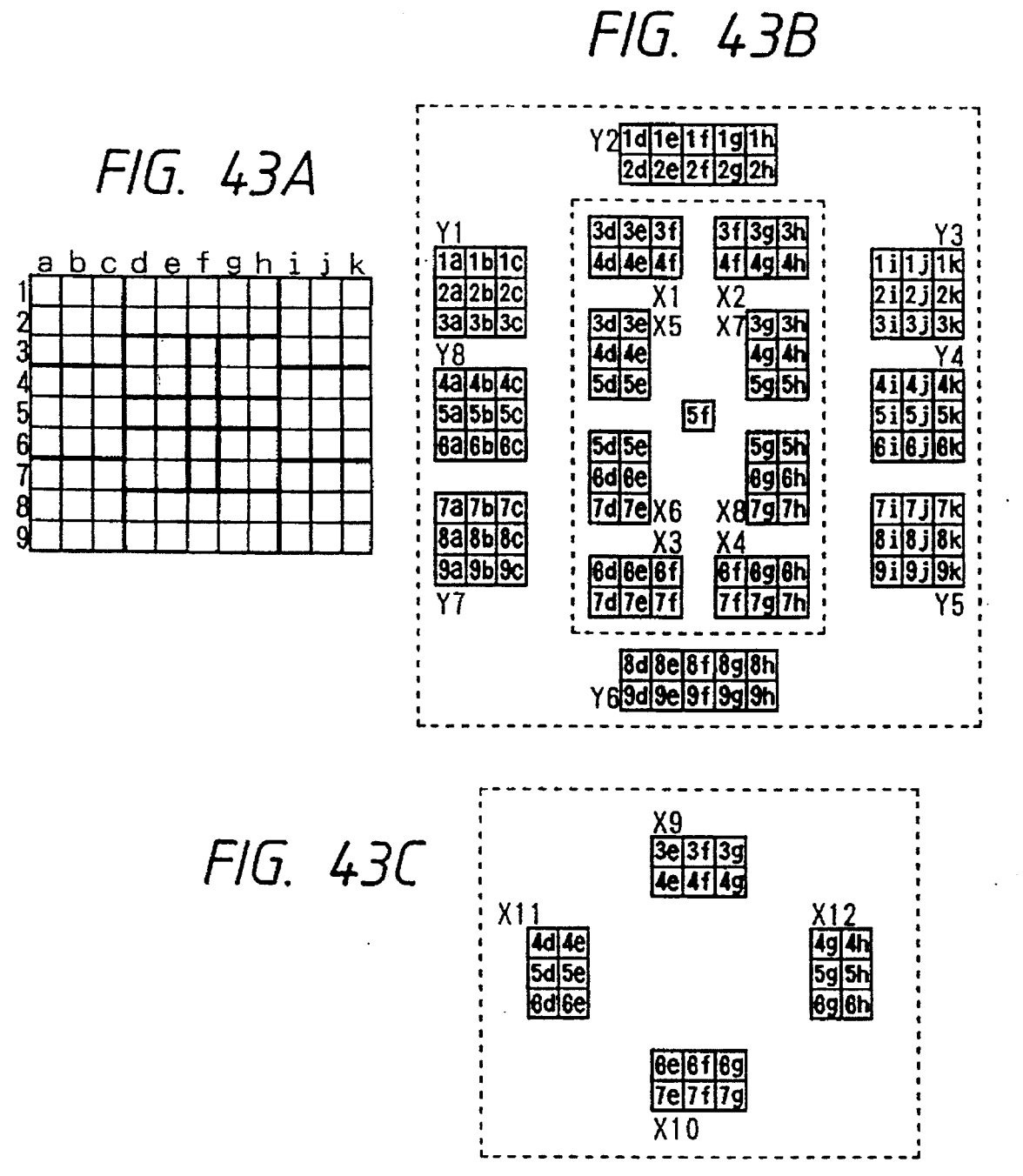

In the above-explained embodiment, the feature extraction is conducted in each of 17 areas (X1–X8, Y1–Y8, $5f$) divided in the reference area, but a more detailed reference can be achieved by adding, as shown in FIGS. 43A–43C, areas X9 (3e, 3f, 3g, 4e, 4f and 4g), X10 (6e, 6f, 6g, 7e, 7f and 7g), X11 (4d, 4e, 5d, 5e, 6d and 6e) and X12 (4g, 4h, 5g, 5h, 6g and 6h).

Also the method of division of the reference area is not limited to the explained above, but may be arbitrarily conducted so as to provide plural predetermined areas each containing at least two pixels.

Figures 9A, 9B, 9C:
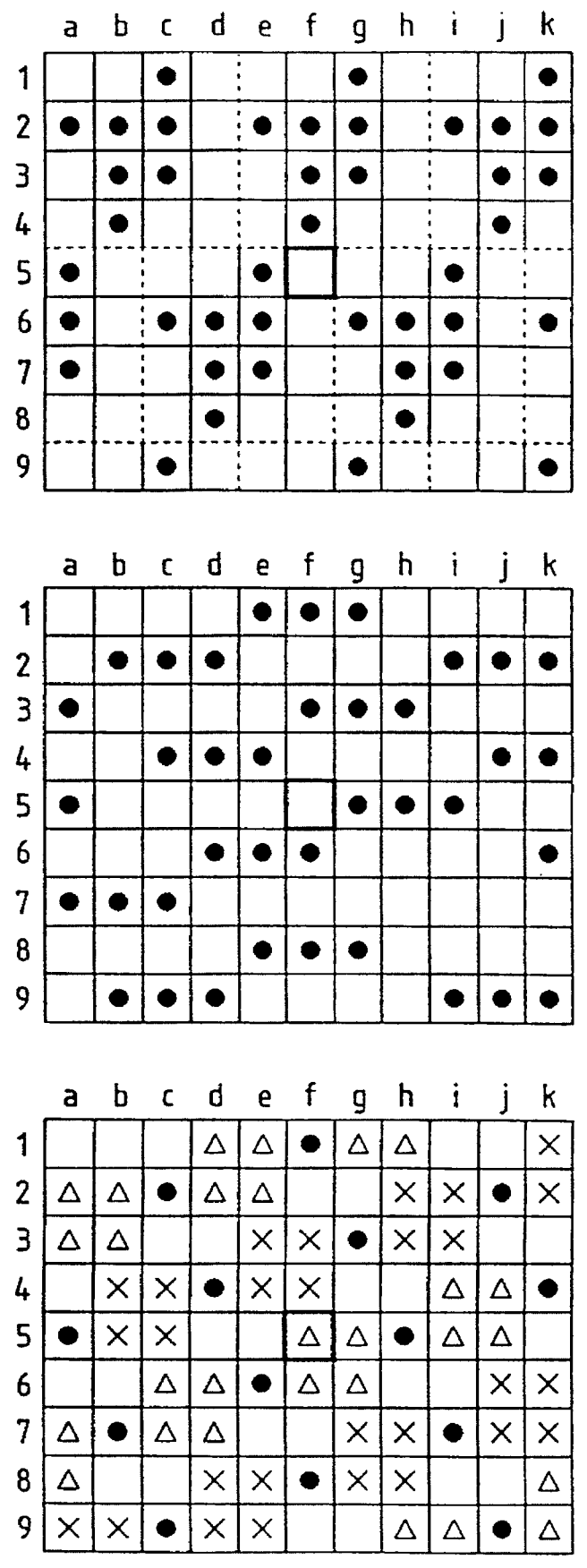

In the process explained above, the smoothing may be inhibited for an image as shown in FIGS. 9A and 9B, quoted before as an example of drawbacks in the conventional art. Such inhibition of smoothing will be explained in the following, with reference to FIGS. 40A, 40B, 41A and 41B.

Figures 40A, 40B:
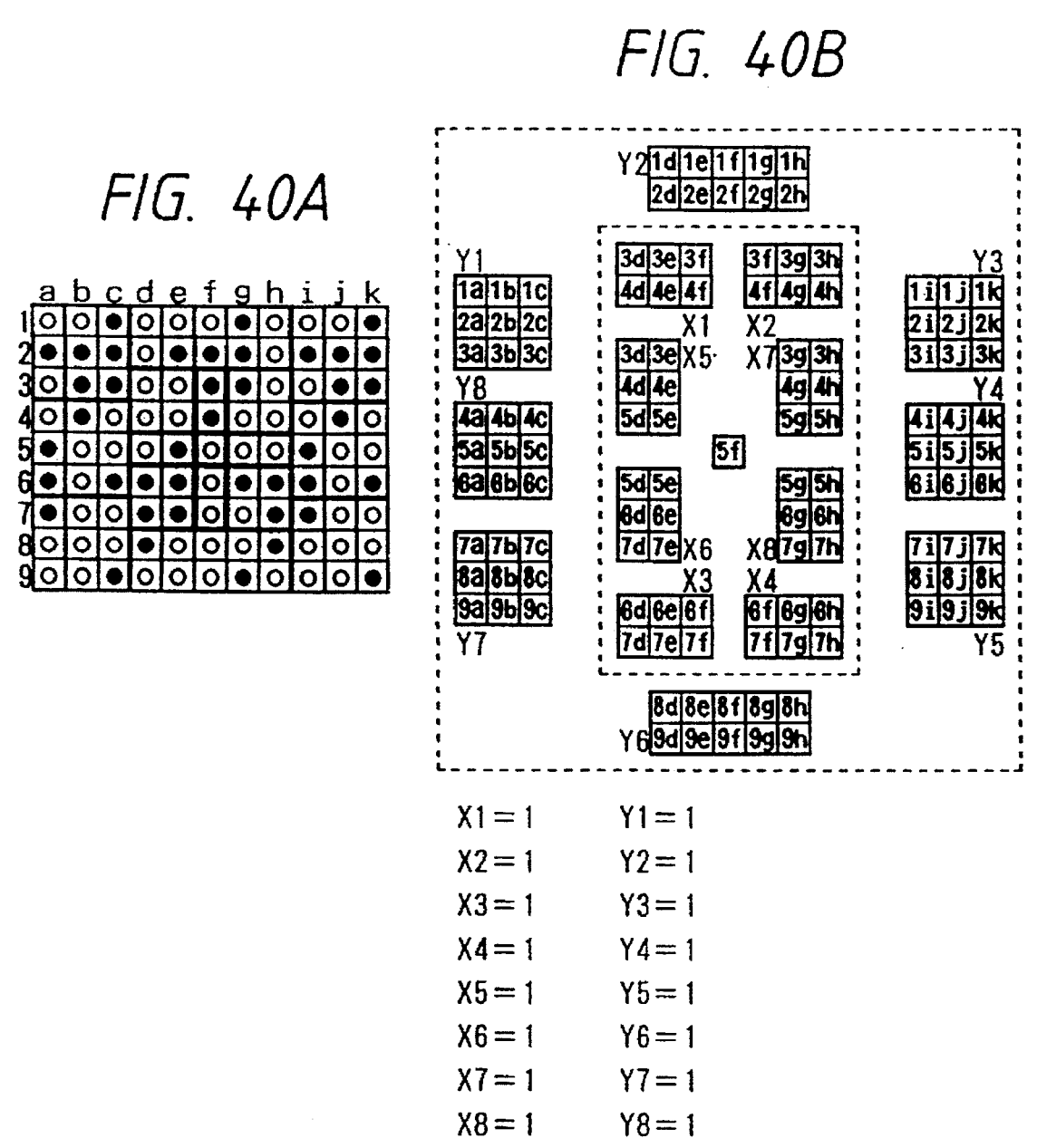

FIGS. 40A and 40B show the result of feature detection of the image shown in FIG. 9A by the feature extracting circuit of the present embodiment. As shown in these drawings, the signals X1–X8 and Y1–Y8 from said circuit are all "1", indicating that the image does not coincide with any of the above-explained feature patterns.

Also FIGS. 41A and 41B show the result of feature detection of the image shown in FIG. 9B by the feature extracting circuit of the present embodiment. The signals X1–X8 and Y1–Y8 from said circuit are all "1", indicating that the image does not coincide with any of the above-explained feature patterns.

It is thus rendered possible to inhibit erroneous smoothing for a dither processed image, and to inhibit smoothing for a concentrated image, thereby preventing the deterioration of image quality.

Figure 4:
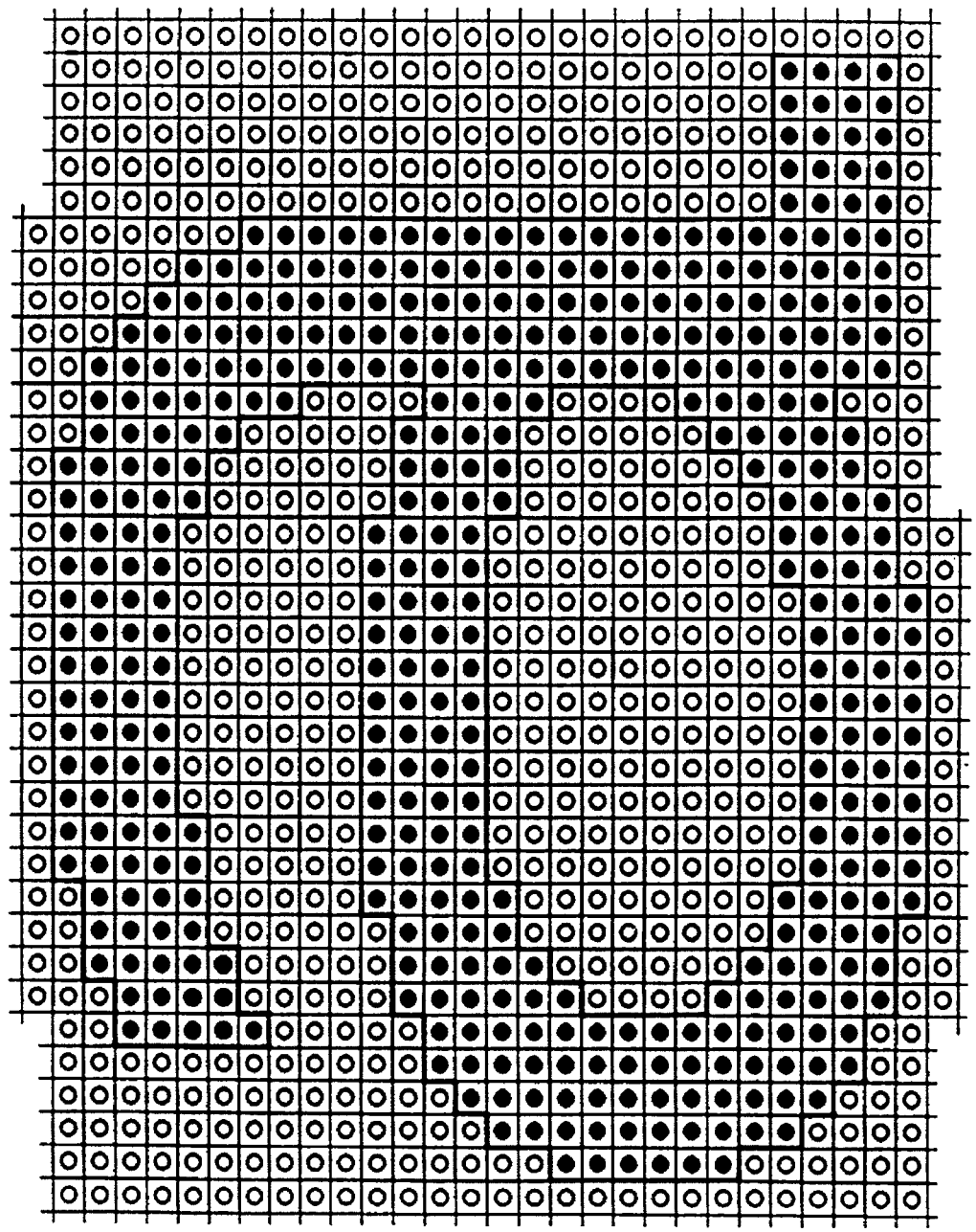
FIG. 4 is a view showing an example of pattern represented by dot data.
Figure 42A:
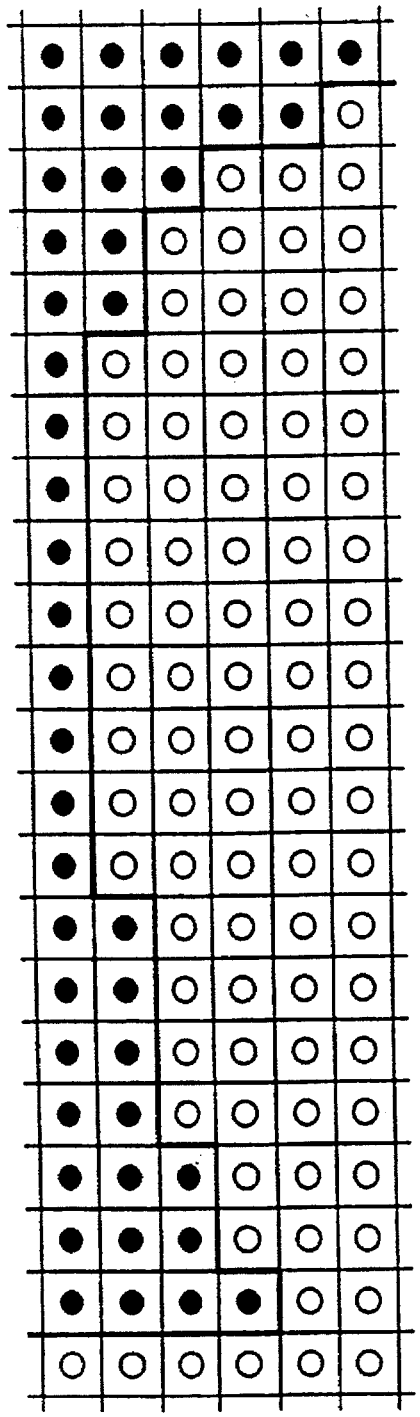
FIGS. 42A and 42B are views showing the effect of processing of said embodiment.
Figure 42B:
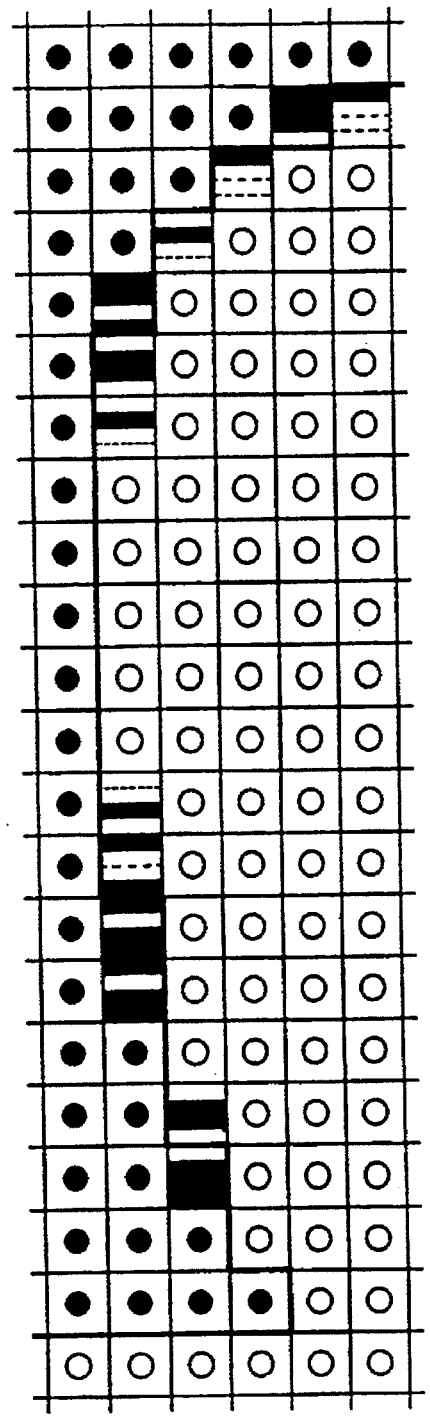

In the above-explained embodiment, an image shown in FIG. 42A, constituting a part of the character "a" shown in FIG. 4, is printed by the laser with modification of a part of the contour by sub pixel units. Because of the electrophotographic process, such modified sub pixels provide an effect of varying the local image density of said contour or displacing the print position of the dot, whereby said contour is reproduced as a smoothed image on the paper.

In the foregoing embodiment there has explained a case of sending image data of a resolution of 300 dot/inch in the main and sub scanning directions from the controller to the printer engine unit having a printing capability of 300 dot/inch in the sub scanning direction and effecting the printing with a resolution of 300 dot/inch in the sub scanning direction and an equivalent resolution in the main scanning direction corresponding to 4 times (1200 dot/inch) of the resolution in the sub scanning direction. However said equivalent resolution in the main scanning direction need not necessarily be 4 times of the resolution in the sub scanning direction, but may be selected, for example, as 2, 3, 5, 6, 7, 8 times etc. For example, in case of smoothing with a resolution of 8 times (2400 dot/inch) in the main scanning direction, the pattern generation circuit shown in FIG. 36 may be so constructed that a pixel is composed of 8-bit sub signals (x1–x8) instead of 4-bit signals (x1–x4).

In the following there will be explained another embodiment, in which image data of 300 dot/inch in the main and sub scanning directions are transmitted from the controller to a printer engine unit having a printing capability of 600 dot/inch in the sub scanning direction and the printing is conducted with an equivalent print density of 1200 dot/inch in the main scanning direction and an equivalent print density of 600 dot/inch in the sub scanning direction.

FIG. 44 illustrates the sub pixels employed for printing the object pixel in the present embodiment. More specifically, in the present embodiment, the object pixel 5f, positioned at the center of a dot matrix memory composed of 11 dots in the main scanning direction by 9 dots in the sub scanning direction, both with a resolution of 300 dot/inch, is modified into image data of sub pixels (x1, x2, x3, x4, y1, y2, y3, y4), having a print density of 4 times in the main scanning direction and a density of 2 times in the sub scanning direction.

The present embodiment is to modify said object pixel according to the feature of a surrounding area (11 pixels in the main scanning direction by 9 pixels in the sub scanning direction) in the image data transmitted from the controller.

Figure 6:
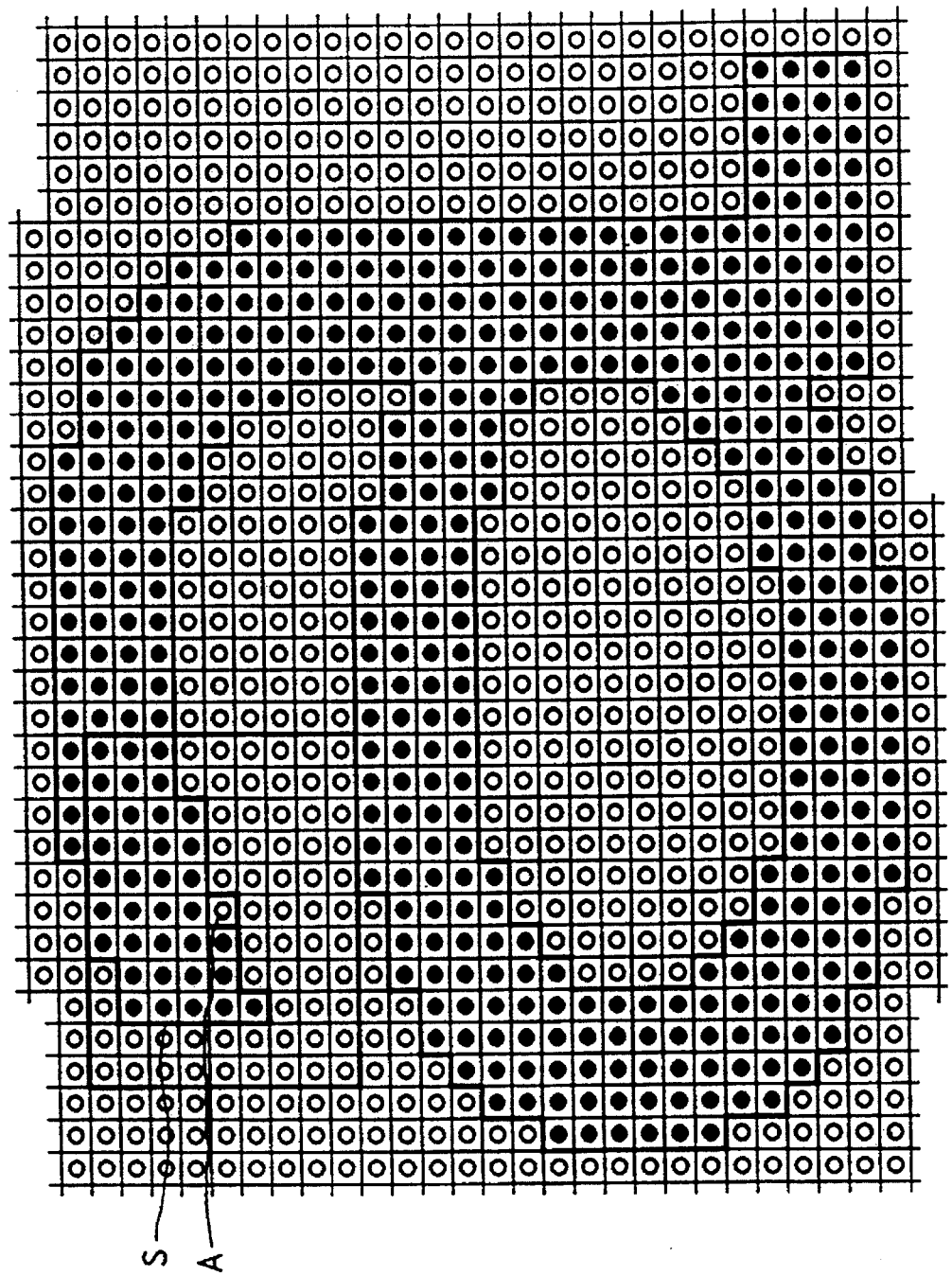
FIGS. 6 and 7 are schematic views showing the mode of image data storage into the matrix memory, from the dot pattern shown in FIG. 4.
Figures 7, 10:
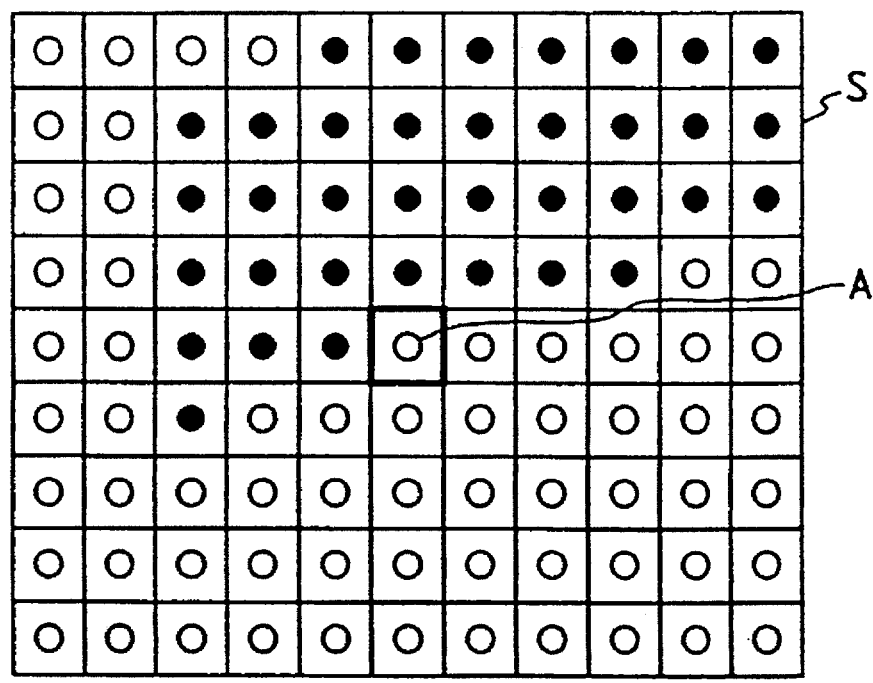
FIG. 10 is a view showing an area of variation of the object pixel, employed in the first embodiment of the present invention.

More specifically, referring to FIG. 6 and in case printing the object pixel among the dot data representing a character "a" with a resolving power of 300 dot/inch, the dot data of the surrounding area (11 pixels in the main scanning direction by 9 pixels in the sub scanning direction) around the object pixel are temporarily stored in memory means. Then the data of the object pixel to be printed are modified according to the feature of the dot data of said surrounding area. Said data modification is conducted in such a manner that the contour of the pattern formed by said dot data appears more smoothly. In this embodiment, the object pixel is divided into sub pixels (x1, x2, x3, x4, y1, y2, y3, y4) formed, as shown in FIG. 44, by division into four in the main scanning direction and into two in the sub scanning direction. At the printing, therefore, there are obtained equivalent print densities of 1200 dot/inch in the main scanning direction and 600 dot/inch in the sub scanning direction.

Figure 45:
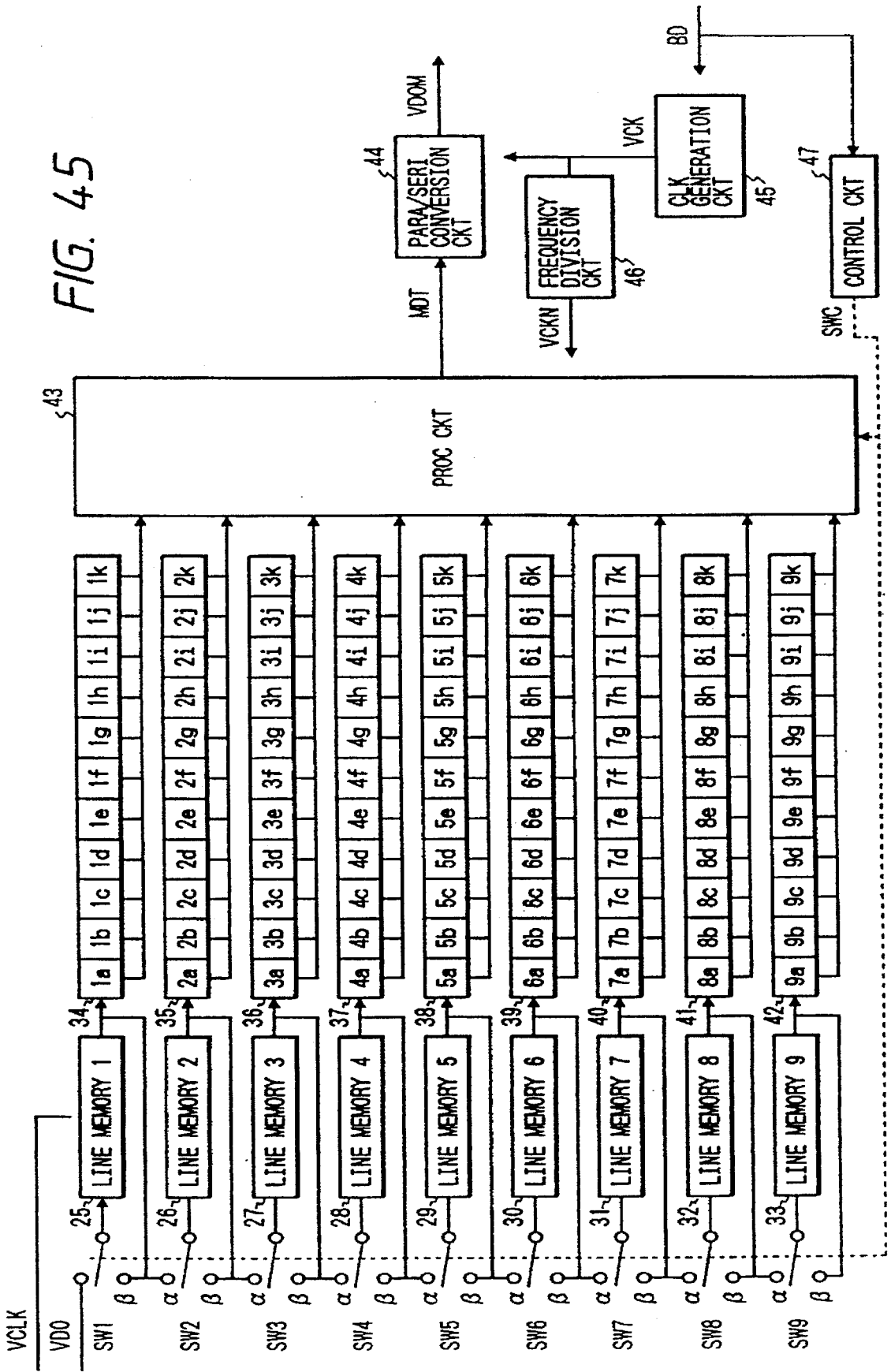
FIG. 45 is a block diagram of a circuit for effecting smoothing process by dividing the object pixel in the main and sub scanning directions.
Figure 46:
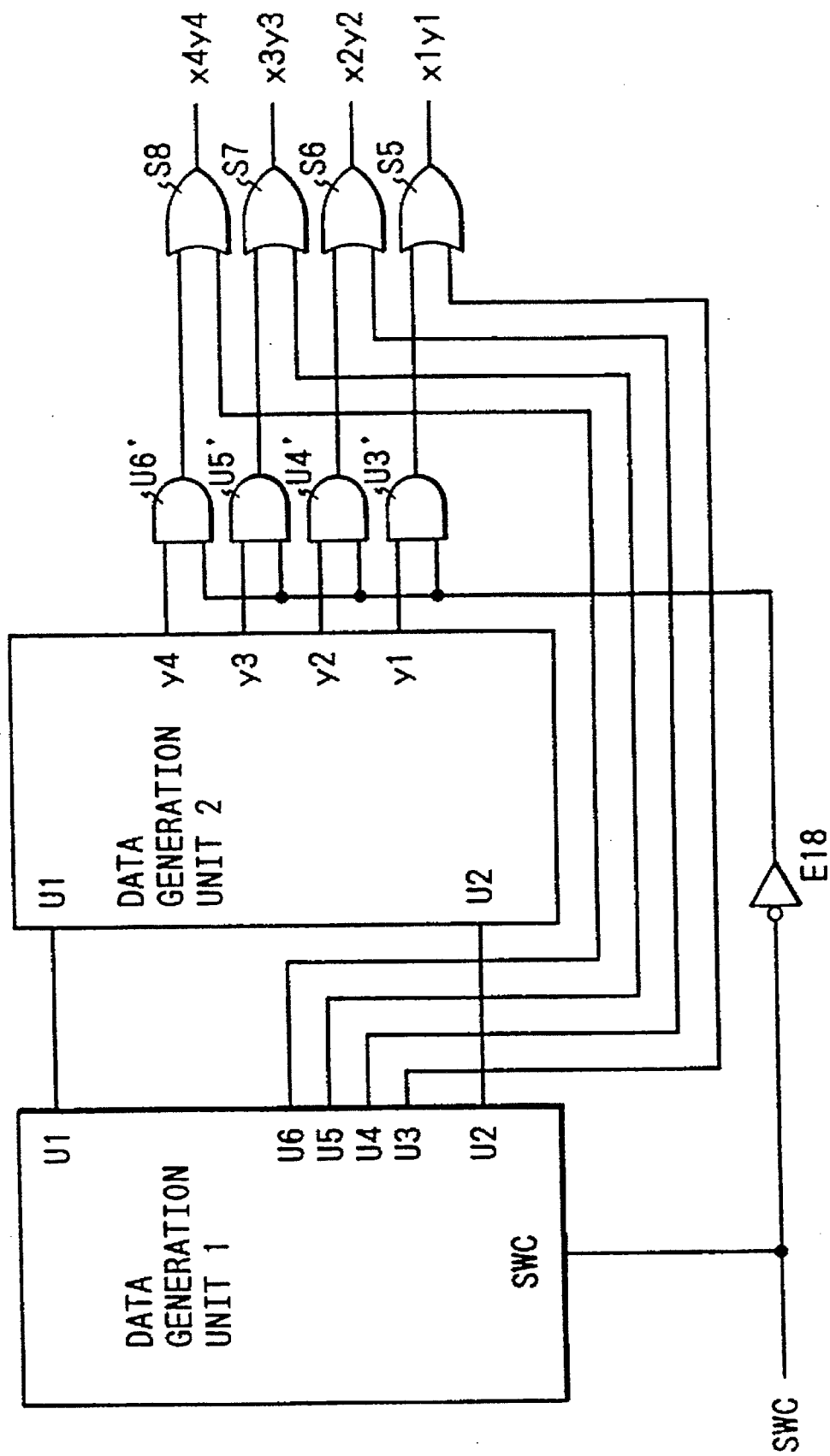
FIG. 46 is a circuit diagram showing the feature extracting circuit in another embodiment.
Figure 47:
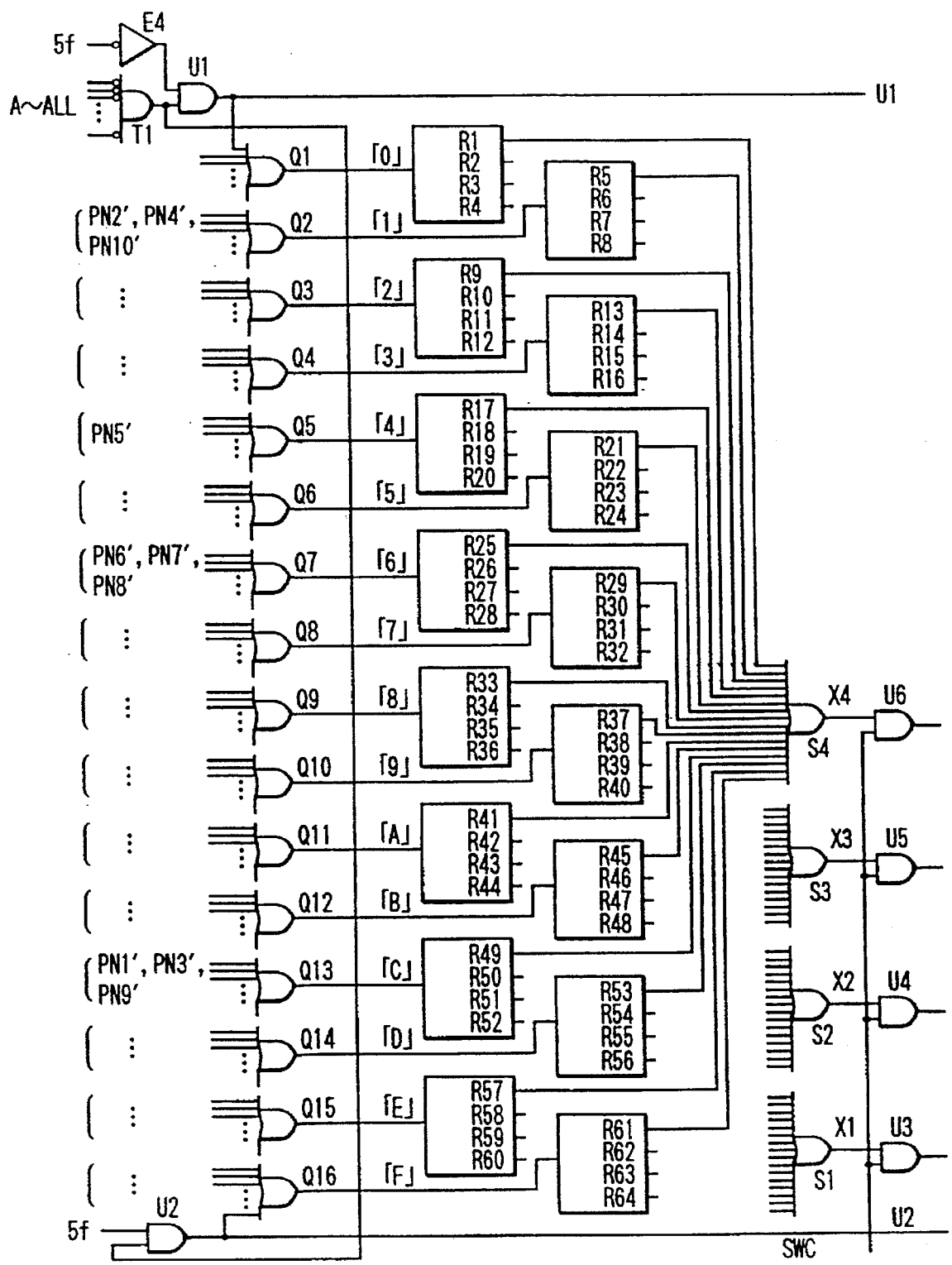
FIG. 47 is a circuit diagram showing details of a data generation unit 1 in FIG. 46.

FIG. 45 is a block diagram of the VDO signal processing unit 101 for smoothing process, provided in the input unit of the aforementioned printer engine unit with a print density of 600 dot/inch. This diagram corresponds to FIG. 8 in the foregoing first embodiment, wherein devices equivalent in function to those in FIG. 8 are represented by same numbers or symbols.

Referring to FIG. 45, switch means SW1–SW9 are shifted between positions α and β, in order to switch the input signals to the line memories 25–33 (also referred to line memories 1–9), under the control by a control signal SWC generated by a control circuit 47 to be explained later. Said control circuit 47 receives a synchronization signal BD' corresponding to the sub scanning of 600 dot/inch, and generates the control signal SWC, which is inverted in synchronization with said signal BD'. The aforementioned synchronization signal BD, used for interfacing with the controller and corresponding to the sub scanning of 300 dot/inch, is generated by skipping said synchronization signal BD' by every other line.

At first the switch means SW1–SW9 are placed at the positions "α", and the controller transmits the image data VDO of 300 dot/inch in synchronization with the BD signal. The line memories 1–9 store said image signal VDO of 300 dot/inch, under successive shifts in synchronization with the clock signal VCLK. Each of said line memories has a capacity corresponding to the dot data of a main scanning length of the page to be printed. Said line memories are serially connected and are capable of storing dot data of 9 lines in the sub scanning direction.

Then the switch means SW1–SW9 are shifted to the position β by the control signal SWC from the control circuit 47. Shift registers 34–42 (shift registers 1–9) respectively receive the output signals of the line memories 1–9, in synchronization with the clock signal VCKN. At the same time, the output signals of the line memories are re-entered thereto through the switch means SW1–SW9. Said shift registers, each having a capacity of 11 bits, constitute a dot matrix memory 1a–1k, 2a–2k, 3a–3k . . . 9a–9k composed of 11 dots in the main scanning direction by 9 dots in the sub scanning direction. In said dot matrix memory, a central 5f is defined as the object dot. A processing circuit 43, provided for detecting the feature of the data stored in said dot matrix memory and modifying the object pixel 5f when necessary, receives all the bits (total 99 bits 1a–9k) of said shift registers, and releases a parallel signal MDT (x1, x2, x3, x4) after modification. Said parallel signal MDT is converted in a parallel-serial conversion circuit 44 into a serial signal VDOM which is utilized for driving the semiconductor laser 55 through the laser driver 50. The processing of a main scanning line is conducted in succession in the above-explained manner.

Thereafter the switch means SW1–SW9 are shifted to the position α. Then the data are read from the line memories 1–9, respectively shifted to the next line memories and are also supplied to the shift registers 1–9, in synchronization with the synchronization signal BD' entered at a next timing. The processing circuit 43 detects the feature of the data stored in said dot matrix memory, composed of 11 dots in the main scanning direction by 9 dots in the sub scanning direction and modifies the object pixel when required, thus releasing a parallel signal MDT (y1, y2, y3, y4). A parallel-serial conversion circuit 44 converts the entered parallel signal MDT (y1, y2, y3, y4) into a serial signal VDOM and drives the semiconductor laser 55 with said signal through the laser driver 50. The data of a main scanning line are processed in succession in a similar manner.

Then the switch means SW1–SW9 are shifted to the position α, and the image signal VDO of a next line is entered from the controller.

In the present embodiment, the parallel signal MDT is composed of 4 bits as explained above, and a first MDT signal (x1, x2, x3, x4) and a second MDT signal (y1, y2, y3, y4) alternate in synchronization with the signal BD'. A clock generation circuit 45 receives the main scanning synchronization signal BD' and generates a clock signal VCK synchronized therewith. The frequency of said clock signal VCK is twice of a clock frequency f0 required for recording with the resolution of 600 dot/inch in the main scanning direction.

Said serial signal VDOM (x1, x2, x3, x4 or y1, y2, y3, y4) is transmitted serially in synchronization with said clock signal VCK. A frequency division circuit 46 receives said clock signal VCK and divides the frequency thereof to ½, thereby generating clock signal VCK of the frequency f0, used as the synchronization signal for fetching the dot data from the aforementioned dot matrix memory into the processing circuit 43.

Figure 49:
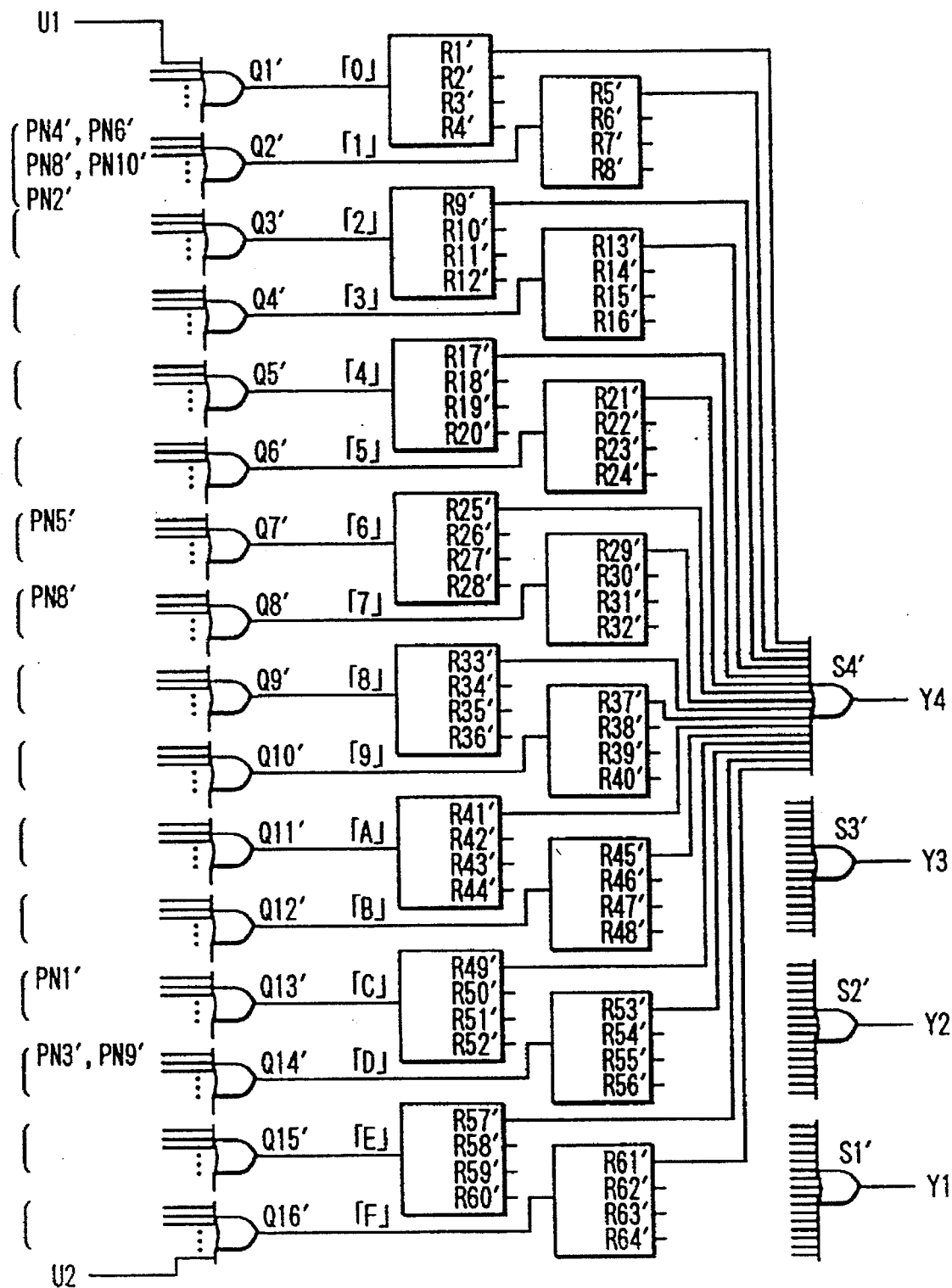
FIG. 49 is a circuit diagram showing details of a data generation unit 1 in FIG. 46.
Figures 54A, 54B, 54C:
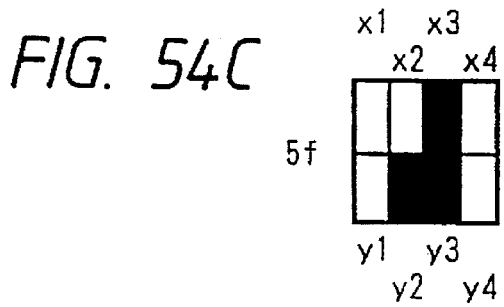
Figures 57A, 57B, 57C:
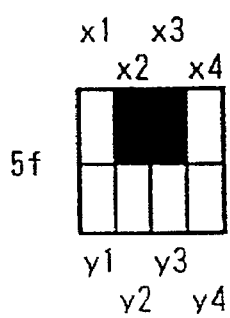
Figures 58A, 58B, 58C:
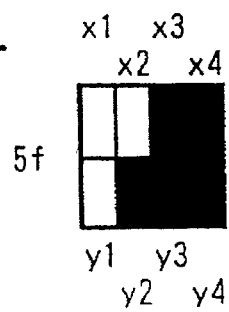
Figures 59A, 59B, 59C:
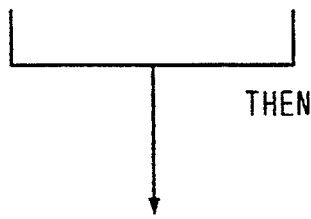

In said processing circuit 43, the feature extracting circuit portion is same as that of the first embodiment, shown in FIGS. 30, 31, 32 and 35. The data generation circuit employed in the present embodiment is shown in FIGS. 46, 47, 48 and 49, wherein FIGS. 47 and 49 respectively show the details of data generation units 1, 2 shown in FIG. 46, while FIG. 48 shows the structure of gates R1–R64. In FIG. 49 gates R1'–R64' are constructed in the same manner as the gates R1–R64. In FIGS. 46 to 49, components equivalent in function to those in FIG. 36 are represented by same symbols.

FIGS. 46–49 show the data generation circuit for generating the data of the object pixel 5f according to the detected feature of the image data, wherein shown are OR gates Q1–Q6, Q1'–Q6'; 2-input AND gates R1–R64, R1'–R64', U1, U2; 16-input OR gates S1–S4, S1'–S4', S5–S8; inverters E4, E18; and a NOR gate T1. In case of generating the first MDT signal shown in FIG. 45, the control signal SWC from the control circuit 47 assumes the level "1". In this state the data generation unit 1 is selected by the 2-input AND gates U3–U6, U3'–U6' and the 2-input OR gates S5–S8 and the parallel signals x1, x2, x3, x4 are generated. In case of generating the second MDT signal shown in FIG. 45, the control signal SWC assumes the level "0". In this state the data generation unit 2 is selected by the 2-input AND gates U3–U6, U3'–U6' and the 2-input OR gates S5–S8 and the parallel signals y1, y2, y3, y4 are generated.

Each of the output singals from the feature extracting circuits corresponding to plural patterns is supplied to one of the OR gates Q1–Q16 in order to select the output data x1–x4, and also to one of the OR gates Q1'–Q16',in order to select the output data y1–y4.

Examples of the modified signals (x1, x2, x3, x4, y1, y2, y3, y4) are shown in FIGS. 50A–53C (hexadecimal value), 53A–57C, 58A–59C.

The image features shown in FIGS. 50A–53C have the same feature extracting algorithms as those of the foregoing first embodiment, for detecting a nearly vertical image boundary, shown in FIGS. 13A–16C, but the resulting modified pixel data alone are different.

Also the image features shown in FIGS. 54A–57C have the same feature extracting algorithms as those of the foregoing first embodiment, for detecting a nearly horizontal image boundary, shown in FIGS. 18A–21C, but the resulting modified pixel data alone are different.

Also the image features shown in FIGS. 58A–59C have the same feature extracting algorithms as those of the foregoing first embodiment, for detecting a diagonal image boundary, shown in FIGS. 23A–24C, but the resulting modified pixel data alone are different.

The algorithm shown in FIGS. 50A–50C provides a feature detection singal PN1'. Similarly the algerithms shown in FIGS. 51A–51C, 52A–52C, 53A–53C, 54A–54C, 55A–55C, 56A–56C, 57A–57C, 58A–58C and 59A–59C respectively provide feature detection singals PN2', PN3', PN4', PN5', PN6', PN7', PN8', PN9' and PN10'.

When the image feature shown in FIGS. 50A–50C is detected, the object pixel is modified to the data x1–x4 and y1–y4 shown in FIG. 50C. In this case, the feature detection signal PN1' from the feature extraction circuit is supplied to the OR gates Q13, Q13' thereby generating an x-code "C", corresponding to x1=0, x2=0, x3=1 and x4=1, and a y-code "C" corresponding to y1=0, y2=0, y3=1 and y4=1.

Also when the image feature shown in FIGS. 51A–51C is detected, the object pixel is modified to the data x1–x4 and y1–y4 shown in FIG. 51C. In this case the feature detection signal PN2' from the feature extraction circuit is supplied to the OR gates Q2, Q2' thereby generating an x-code "1" corresponding to x1=1, x2=0, x3=0 and x4=0, and a y-code "1" corresponding to y1=1, y2=0, y3=0 and y4=0.

Also when the image feature shown in FIGS. 52A–52C is detected, the object pixel is modified to the data x1–x4 and y1–y4 shown in FIG. 52C. In this case the feature detection signal PN3' from the feature extraction circuit is supplied to the OR gates Q13, Q14' thereby generating an x-code "C" corresponding to x1=0, x2=0, x3=1 and x4=1, and a y-code "D" corresponding to y1=0, y2=1, y3=1 and y4=1.

Also when the image feature shown in FIGS. 53A–53C is detected, the object pixel is modified to the data x1–x4 and y1–y4 shown in FIG. 53C. In this case the feature detection signal PN4' from the feature extraction circuit is supplied to the OR gates Q2, Q1', thereby generating an x-code corresponding to x1=1, x2=0, x3=0 and x4=0, and a y-code "0" corresponding to y1=0, y2=0, y3=0 and y4=0.

Similarly the detection signal PN5' is supplied to the OR gates Q5 and Q7', thereby generating an x-code "4" and a y-code "6".

The detection signal PN6' is supplied to the OR gates Q7 and Q1', thereby generating an x-code "6" and a y-code "0".

The detection signal PN7' is supplied to the OR gates Q7 and Q8', thereby generating an x-code "6" and a y-code "7".

The detection signal PN8' is supplied to the OR gates Q7 and Q1', thereby generating an x-code and a y-code The detection signal PN9' is supplied to the OR gates Q13 and Q14', thereby generating an x-code "C" and a y-code "D".

The detection PN10' is supplied to the OR gates Q2 and Q1', thereby generating an x-code "1" and a y-code "0".

In addition to the feature extraction circuits mentioned above, there may be employed unrepresented plural feature extraction circuits, and each of the feature detection signals therefrom is supplied to one of the OR gates Q1–Q16 and one of the OR gates Q1'–Q16'.

Also, all the feature detection signals, including PN1'–PN10', are supplied to the NOR gate T1.

Corresponding to the outputs of the OR gates Q1–Q16 and Q1'–Q16', the AND gates R1–R64 and R1'–R64' constitute code generating circuits, each of which is composed of four AND gates and which generate 4-bit x and y-code "0"–"F", said 4 bits being represented by 20 (for example from R4 or R4'), 21 (for example from R3 or R3'), 22 (for example from R2 or R2') and 23 (for example from R1 or R1'). The digits 20 of said codes are supplied to the OR gate S1 or S1' which respectively releases an output signal x1 or y1. The digits 21 of said codes are supplied to the OR gate S2 or S2' which respectively releases an output signal x2 or y2. The digits 22 of said codes are supplied to the OR gate S3 or S3' which respectively releases an output signal x3 or y3. The digits 23 of said codes are supplied to the OR gate S4 or S4' which respectively releases an output signal x4 or y4.

Therefore, in response to the output of the OR gates Q1–Q16, of which only one can be selected at a time, there is generated one of the codes "0"–"F", providing a corresponding set of signals x1–x4 from the OR gates S1–S4.

Also in response to the output of the OR gates Q1'–Q16', of which only one can be selected at a time, there is generated one of the codes "0"–"F", providing a corresponding set of signals y1–y4 from the OR gates S1'–S4'.

For example, an x-code "3" provides a set of signals x1=1, x2=1, x3=0 and x4=0. Also a y-code provides a set of signals y1=1, y2=0, y3=0 and y4=1.

The NOR gate T1, receiving all the feature detection signals, generates an output signal "1" in case none of said feature extraction signals is "1" (case of no coincidence with any of the feature patterns). In such situation, if the object pixel 5$f$ is a white dot, the 2-input AND gate U1 provides an output signal "1" to release output signals "1" from the OR gates Q1, Q1', corresponding to an x-code "0" and a y-code "0" (x1=0, x2=0, x3=0, x4=0; y1=0, y2=0, y3=0, y4=0). Also if the object pixel is a black dot, the 2-input AND gate U2 provides an output signal "1" to release output signals "1" from the OR gates Q16, Q16', corresponding to an x-code "F" and a y-code "F" (x1=1, x2=1, x3=1, x4=1; y1=1, y2=1, y3=1, y4=1). In this manner the data of the object pixel 5$f$ are conserved and printed without modification in case the input image does not coincide with any of the predetermined features.

The output signals x1–x4 of the above-explained data generation circuit are converted, by a known parallel-serial conversion circuit 44, into the signal VDOM consisting of serial signals x1, x2, x3, x4 released in synchronization with the clock signal VCK. Also the output signals y1–y4 of said data generation circuit are converted by said conversion circuit 44 into the signal VDOM consisting of serial signals y1, y2, y3, y4 released in synchronization with the clock signal VCK. Said VDOM signals are used for driving the semiconductor laser through the laser driver.

Figure 60A:
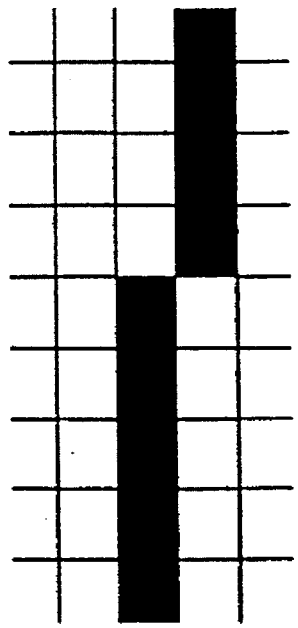
FIGS. 60A to 62B are views showing the effect of smoothing in another embodiment.
Figure 60B:
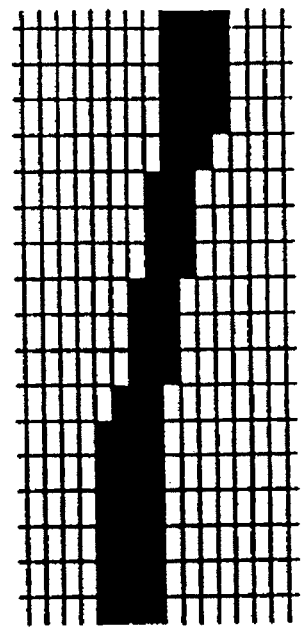
Figure 61A:
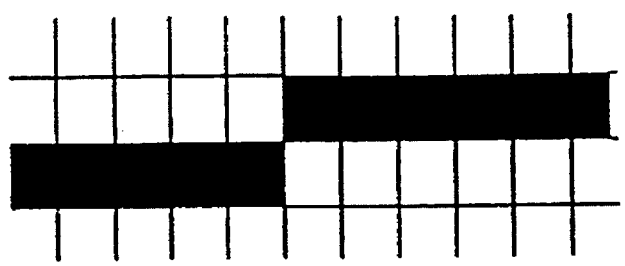
Figure 61B:
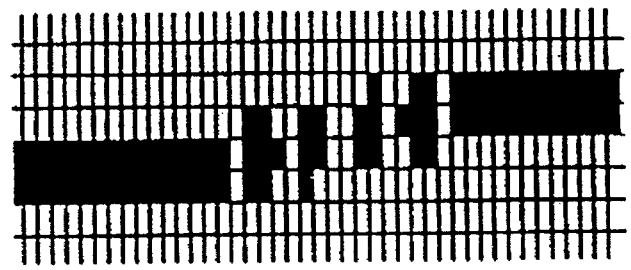

As a result, a nearly vertical one-dot line shown in FIG. 60A is modified into a signal shown in FIG. 60B, with smoothing effect in the diagonal line portion. Also a nearly horizontal line shown in FIG. 61A is modified into a signal shown in FIG. 61B, with smoothing effect in the diagonal line portion.

Figure 62A:
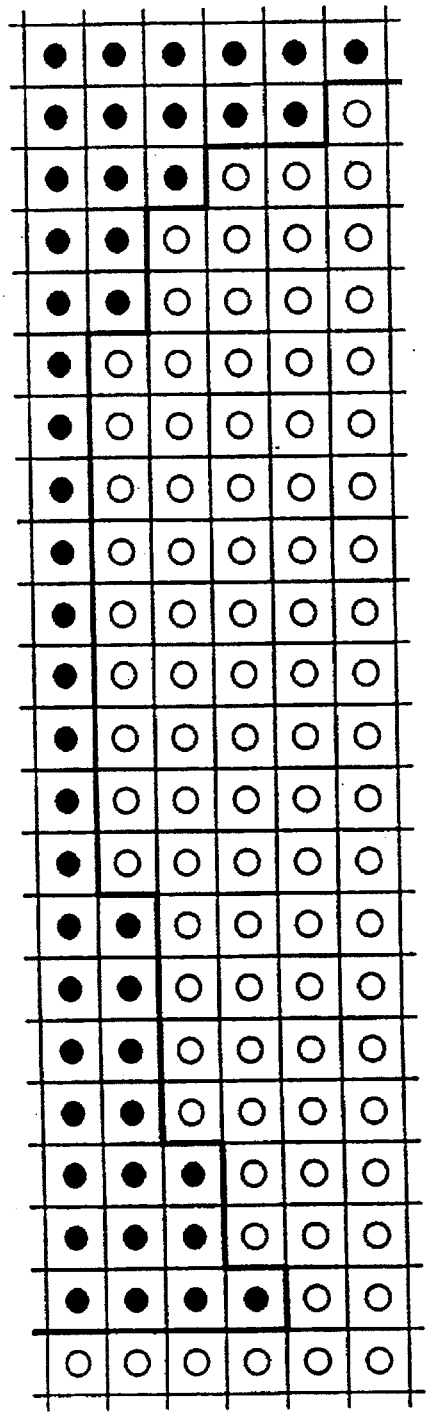
Figure 62B:
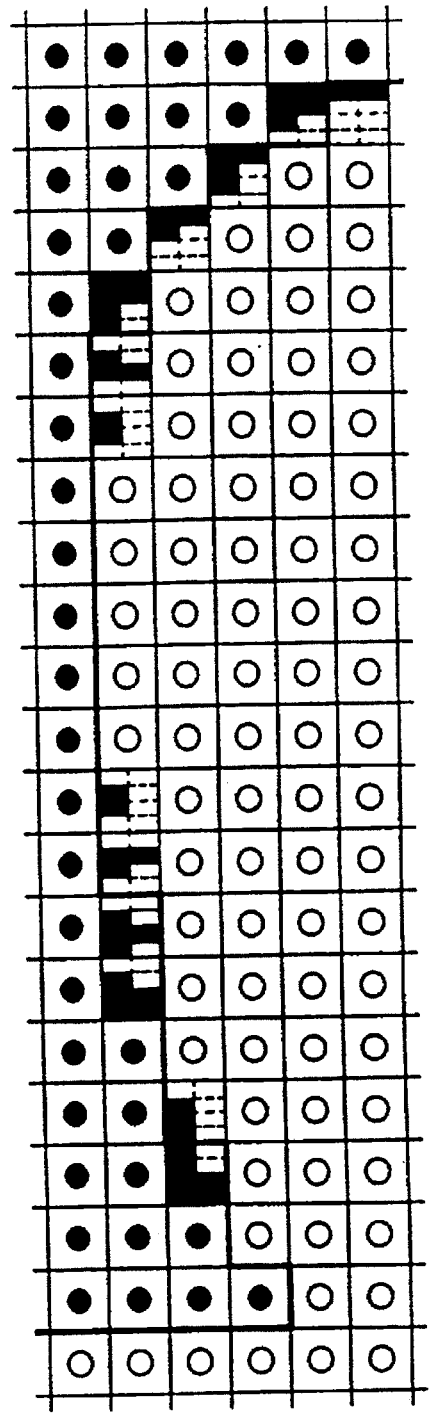

Also an image shown in FIG. 62A, constituting a part of the character "a" shown in FIG. 4, is printed by the semiconductor laser with modification of a part of the contour by sub pixel units. Because of the electrophotographic process, such modified sub pixels provides an effect of varying the local image density of said contour or displacing the print position of the dot, whereby said contour is reproduced as a smoothed image on the paper.

In the foregoing there has been explained a case of sending image data of a resolution of 300 dot/inch in the main and sub scanning directions from the controller to the printer engine unit having a printing capability of 600 dot/inch in the sub scanning direction, and effecting the printing with an equivalent resolution in the main scanning direction of 1200 dot/inch corresponding to 4 times of the resolution in the sub scanning direction, and with a resolution of 600 dot/inch in the sub scanning direction. However said equivalent resolution in the main scanning direction need not necessarily be 4 times of the resolution in the sub scanning direction, but may be selected, as 2, 3, 5, 6, 7, 8 times etc. For example, in case of smoothing with a resolution of 8 times (2400 dot/inch) in the main scanning direction, the pattern generation circuit shown in FIG. 46 may be so constructed that a pixel is composed of 8-bit sub signals (x1–x8, y1–y8) instead of 4-bit sub signals (x1–x4, y1–y4).

As explained in the foregoing, the first embodiment of the present invention is to prevent the drawbacks of the prior art by extracting the feature of dot pattern from a wide area surrounding the object pixel and modifying the object pixel according to thus extracted feature, and is capable of detecting a nearly horizontal or vertical contour with a simplified logic circuit and effecting optimum smoothing according to the curvature of the contour. It is also capable of inhibiting erroneous smoothing on an image subjected to a halftone process, such as a dither processed image, and also inhibiting the smoothing in case the images are concentrated, thereby preventing undesirable influences of the smoothing on the image.

[Second embodiment]

In the following there will be explained a second embodiment constituting a further improvement on the first embodiment explained above.

Said first embodiment is associated with a drawback that the width of the printed line after smoothing process may be different from that without smoothing. This is due to the lack of consideration, in the modification of the object pixel for smoothing, on the correlation between the added and deleted areas in the vicinity of the object pixel, or the correlation between the added and deleted areas at the left and right edges of a line.

Also the smoothing may be conducted on a line where the smoothing is not desired. For example, the smoothing may be applied to a pattern for which a jagged contour is intended by the host controller.

Also there are drawbacks associated with the smoothing on a line of the width of a dot.

FIGS. 63A to 63F illustrate the smoothing process of the foregoing first embodiment, applied to a line of one-dot width, with an inclination not exceeding 45°. The line of so-called one-dot width exists in two types: one being shown in FIG. 63A, in which one-dot width is secured anywhere on the line, while the other being shown in FIG. 63D in which one-dot width is locally not secured where the dot position in the sub scanning direction is varied. When a line is drawn according to a printer control language such as the postscript language, the line may be obtained in either type, depending on the interpreter employed. When the smoothing process, utilizing the feature detection on pattern boundary, is applied to the one-dot lines of the above-mentioned two types, the smoothed image obtained from the line shown in FIG. 63D will have a smaller print area, corresponding to the area of a dot in the processed portion, in comparison with that obtained from the line shown in FIG. 63A. As a result, as will be apparent from FIGS. 63C and 63F, the processed portion on the line shown in FIG. 63D may become narrower or locally broken, and may appear differently from the line obtained from FIG. 63A, thus resulting in deterioration of the image quality. On the other hand, if the algorithm is so modified as to eliminate the narrowing for the line shown in FIG. 63D, there will result a broadening of the line processed from FIG. 63A.

Such drawback also appears on a vertical line.

Figure 64A:
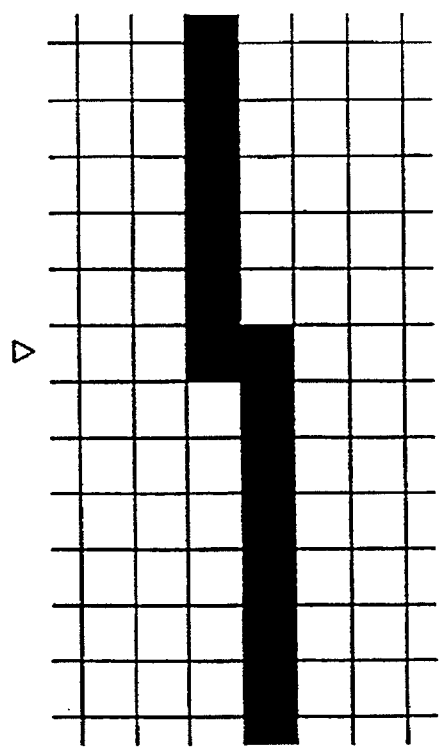
FIGS. 64A to 64D are views showing examples of conventional smoothing.
Figure 64C:
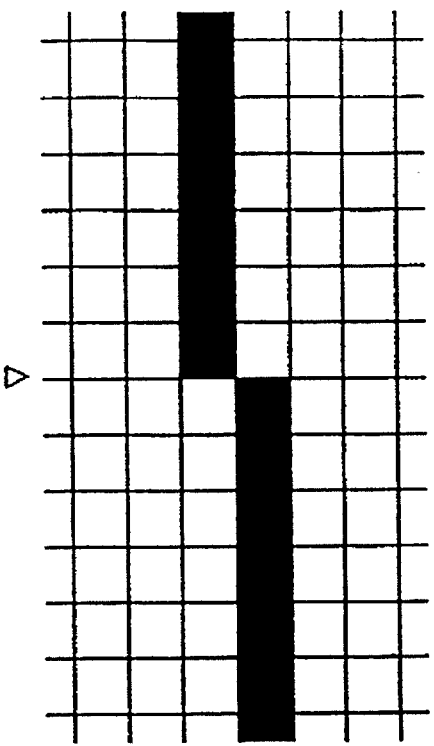

FIGS. 64A–64D illustrate the smoothing according to the first embodiment, on a vertical line of one-dot width, with an inclination exceeding 45°. FIG. 64A shows a line in which one-dot width is secured anywhere on the line, while FIG. 64C shows a line in which the one-dot width is not secured where the dot position varies in the main scanning direction.

When the smoothing process, utilizing the feature detection on pattern boundary, is applied to the one-dot lines of the above-mentioned two types, the printed image obtained from the line in FIG. 64A has a larger area, by a dot area in the processed portion, in comparison with that obtained from the line in FIG. 64C. As will be apparent from FIGS. 64D and 64B, the processed portion on the line of FIG. 64A is printed with a larger width. On the other hand, if the algorithm is so modified as to eliminate such broadening of the line shown in FIG. 64A, the process portion on the line in FIG. 64C is printed narrower. Therefore the lines shown in FIGS. 64A and 64C appear in different manner, and the image quality is deteriorated in either type.

It has therefore been difficult to print the lines of these two types without narrowing or broadening, regardless whether they are vertical or horizontal.

Also there is known a drawback in the smoothing on a one-dot white line.

Figure 65A:
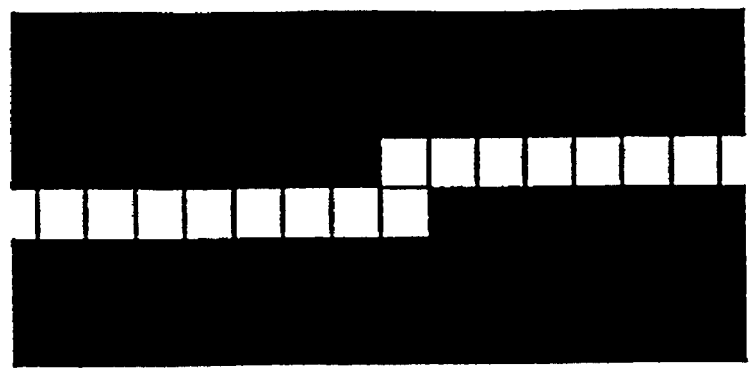
FIGS. 65A to 65C are views showing examples of smoothing on a white line.
Figure 65B:
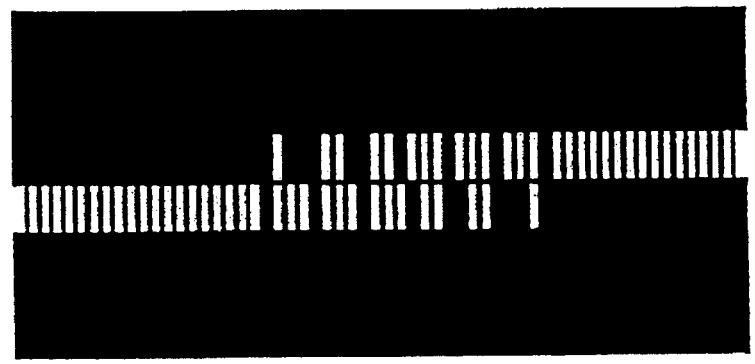
Figure 65C:
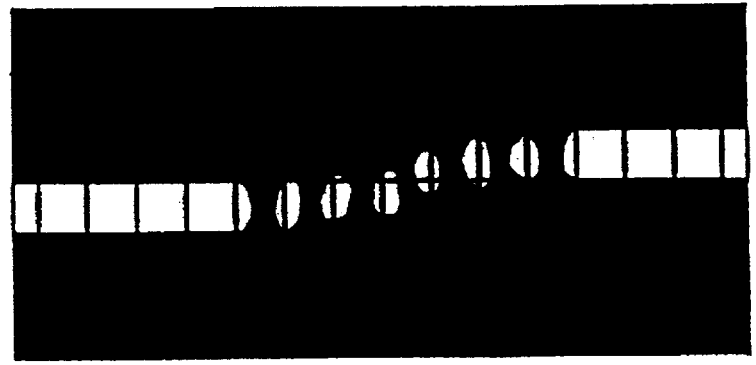

FIGS. 65B and 65C show the result of smoothing on a one-dot white horizontal line, with an inclination not exceeding 45°, shown in FIG. 65A. As will be apparent from FIG. 65C, the smoothing on such one-dot white line will result in narrowing or line breakage in the form of a dotted line, in the smoothed portion. Also such portion is apt to be affected by the conditions of the electrophotographic process or by the ambient conditions such as temperature and humidity, so that the result of smoothing appears unstably.

There is furthermore known a drawback of the smoothing process on Kanji characters.

Figure 66:
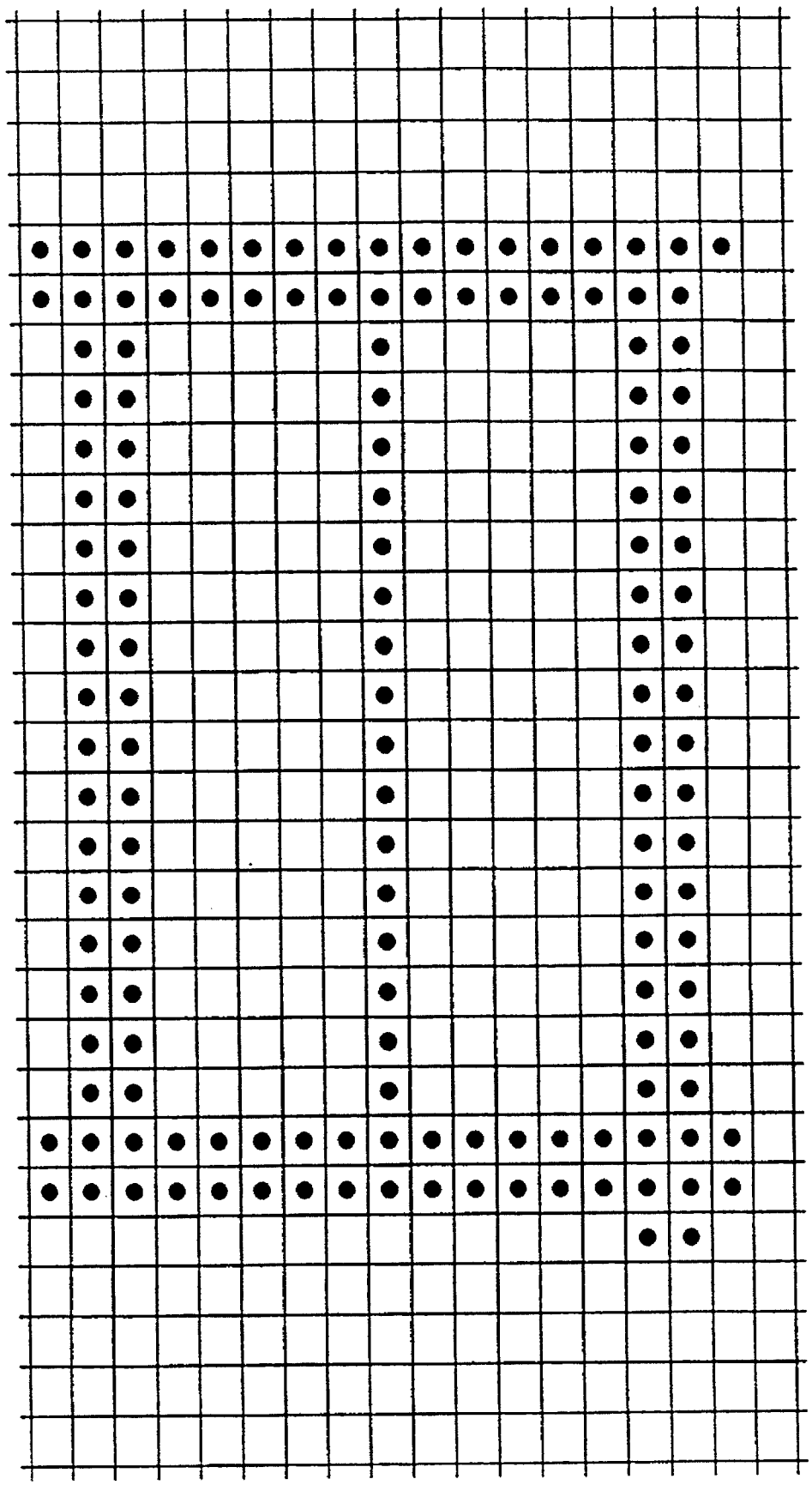
FIG. 66 is a view of the dot pattern of a Kanji character.
Figure 67:
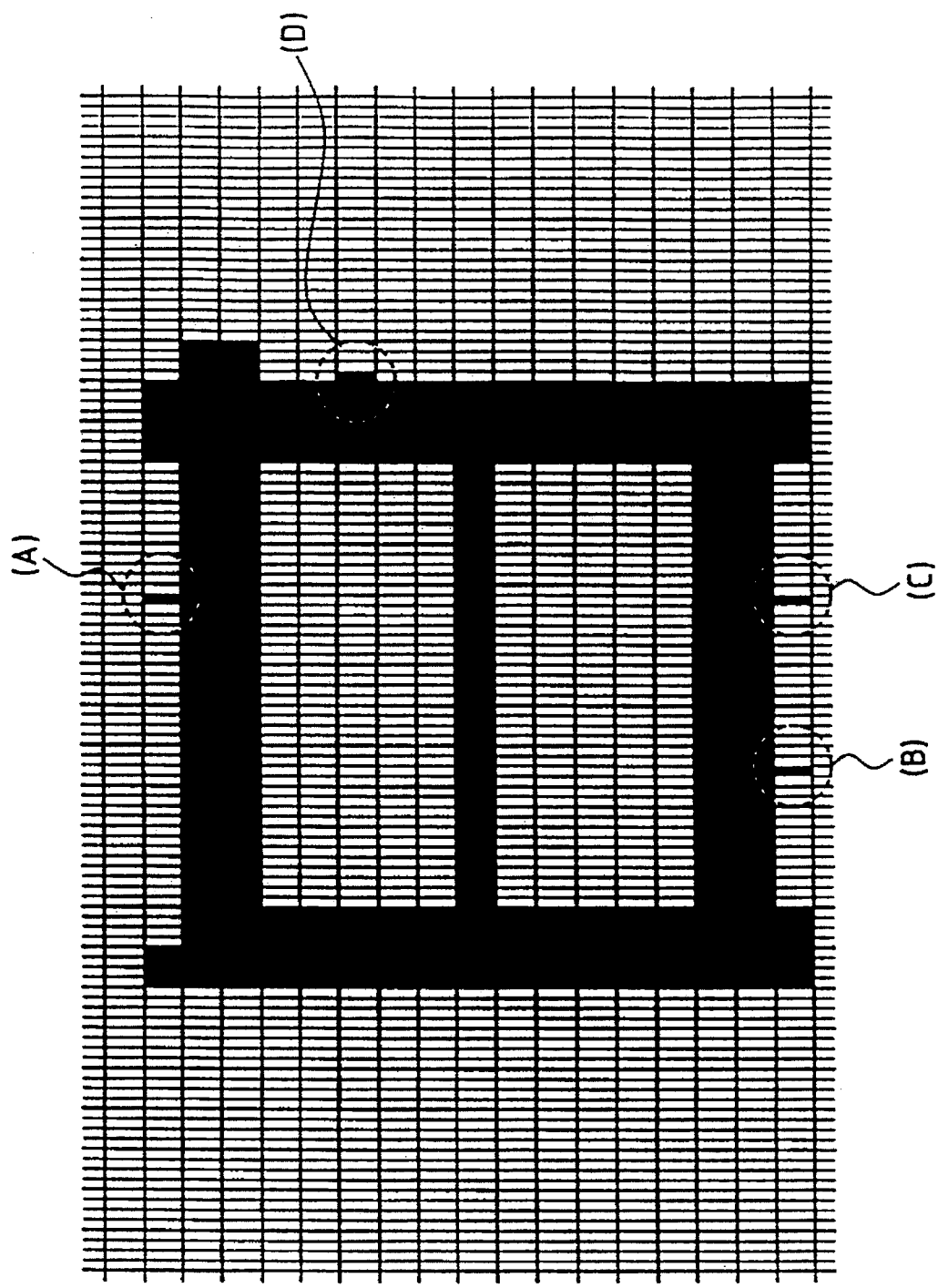
FIG. 67 is a view showing an example of smoothing on the character shown in FIG. 66.

FIG. 66 is a dot pattern of 300 dpi of a Kanji character " ". A smoothing process applied to said dot pattern results, as shown in FIG. 67, in addition of unnecessary pulses A, B, C and D in some positions of said character, thus deteriorating the image quality.

In the following there will be explained a second embodiment, improved from the foregoing first embodiment and capable of avoiding the drawbacks mentioned above.

Figure 31:
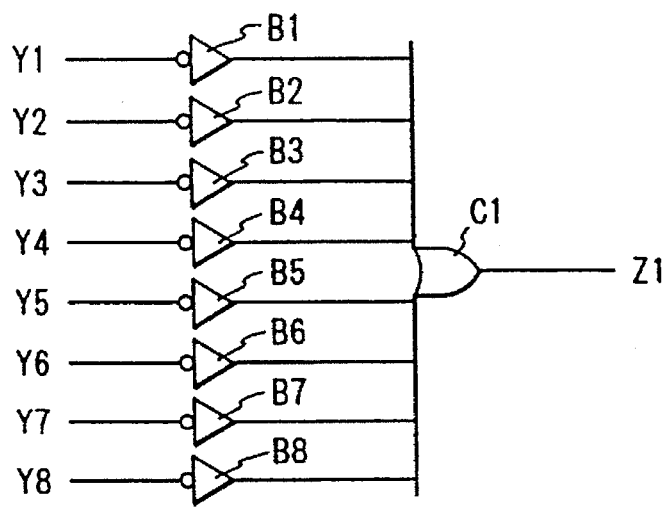
Figure 32:
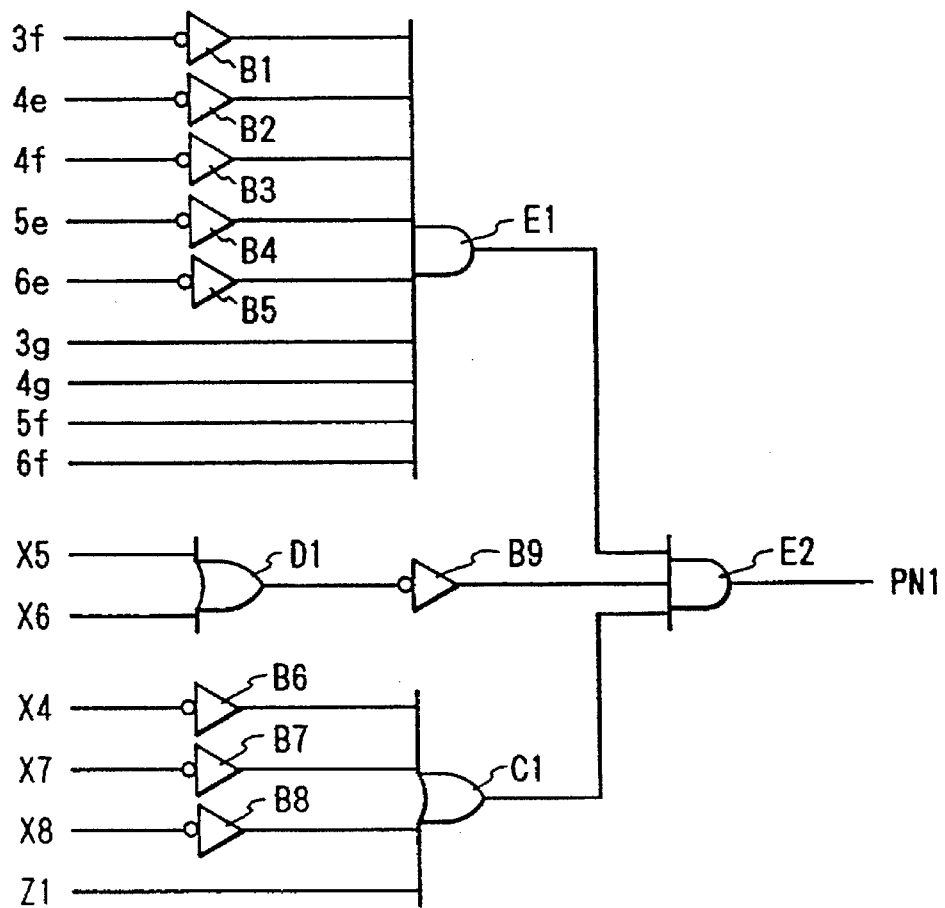

In the laser beam printer constituting said second embodiment, the engine unit is constructed in the same manner as shown in FIGS. 1 and 2; the relation between the controller and the printer is same as shown in FIG. 3; the smoothing process unit is constructed in the same manner as shown in FIG. 8; the divided reference areas for smoothing and the manner of division of the object pixel into sub pixels are same as shown in FIGS. 10 to 12; the circuit for detecting the features of the areas shown in FIG. 11 is identical with that shown in FIG. 30; and the circuit for detecting that at least one of the features of the areas Y1–Y8 is "0" is identical with that shown in FIG. 31. Consequently these parts will not be explained further.

FIGS. 68A–68D illustrate the smoothing process on a pattern, with a horizontal boundary line with an inclination not exceeding 45° In each of these drawings, when a bit pattern shown in the left-hand drawing is detected, the object pixel is modified as shown in the right-hand drawing. The details of the algorithms shown in FIGS. 68A–68D are shown in FIGS. 69A–72C.

Figure 68A:
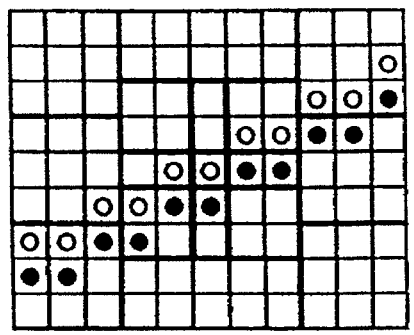
FIGS. 68A to 68D are views showing examples of smoothing on a lateral line with an inclination less than 45°.

FIGS. 69A–69C show the algorithm corresponding to FIG. 68A.

When the areas X5 and X2 are "0" in feature and at least one of the features of the areas Y1–Y8, X3 and X4 is "0" as shown in FIG. 69B, and the bit pattern shows $7a=7b=6c=6d=5e=5f=4g=4h=3i=3j=2k=0$ and $8a=8b=7c=7d=6e=6f=5g=5h=4i=4j=3k=1$ as shown in FIG. 69A the object pixel is modified to x1=0, x2=0, x3=1 and x4=1.

Figure 73:
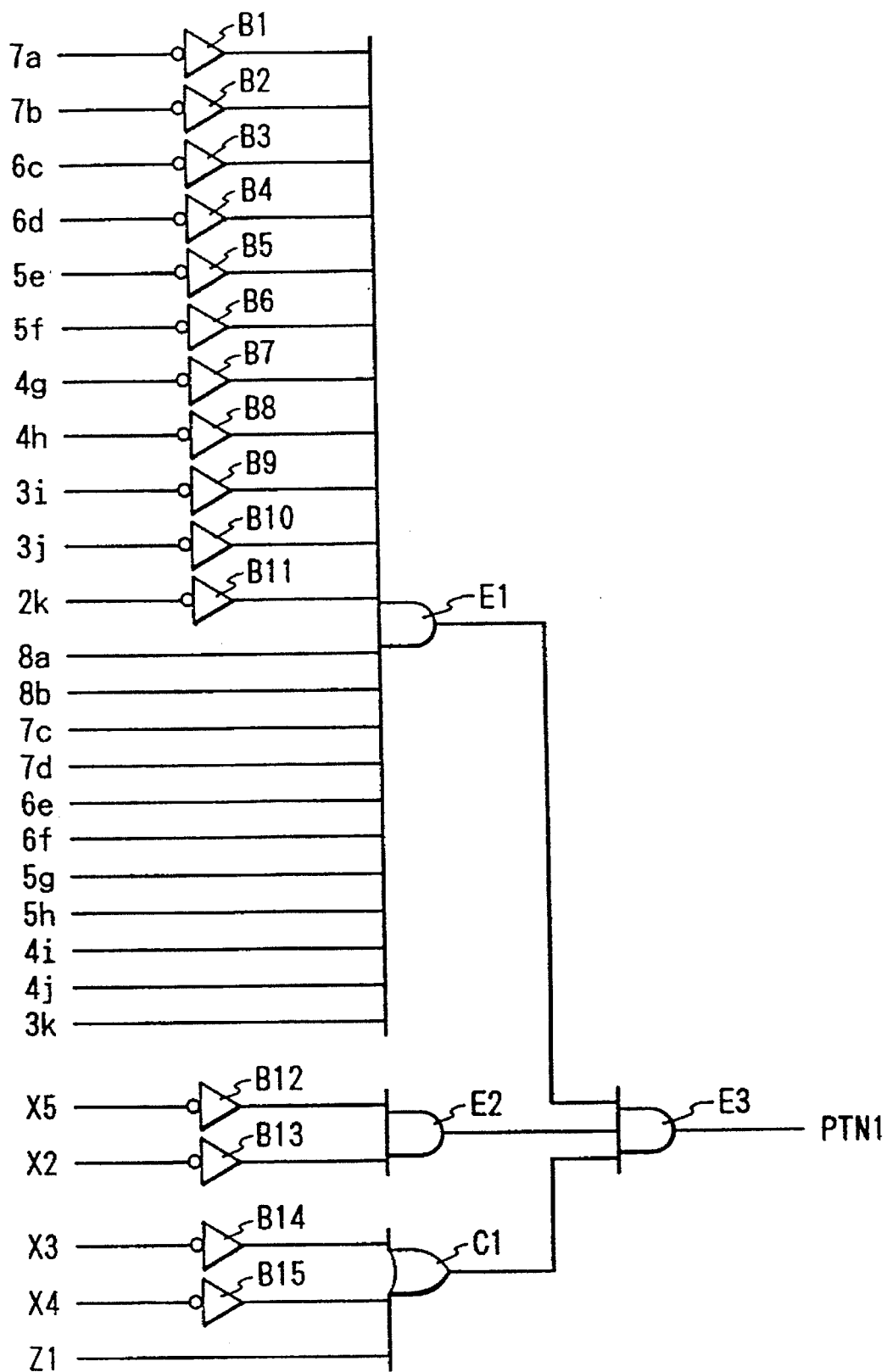
FIG. 73 is a circuit diagram of the feature extracting circuit corresponding to the algorithm shown in FIGS. 69A to 69C.

This algorithm can be realized by a circuit shown in FIG. 73, wherein provided are inverters B1–B15, AND gates E1–E3, and an OR gate C1. The AND gate E2 receives the information of the areas X2, X5, while the OR gate C1 receives the information of the areas X3, x4, Y1–Y8 (Z1), and the AND gate E1 receives the information of the bit pattern. The output signal PTN1 of the AND gate E3 assumes a level "1" or "0" respectively when the above-mentioned conditions are met or not. Said output signal PTN1 is supplied to an OR gate Q4 shown in FIG. 77.

Figure 68B:
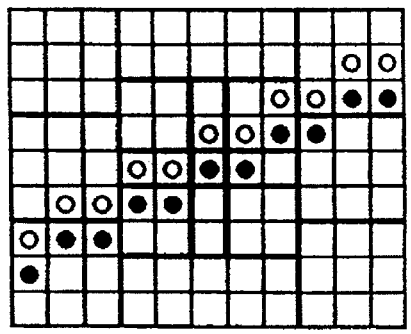

FIG. 70A–70C show the algorithm corresponding to FIG. 68B. When the area X1=0 in feature, and at least one of the features of the areas Y1–Y8, X7, X3 and X4 is "0" as shown in FIG. 70B and the bit pattern shows $7a=6b=6c=5d=5e=4f=4g=3h=3i=2j=2k=0$ and $8a=7b=7c=6d=6e=5f=5g=4h=4i=3j=3k=1$ as shown in FIG. 70A, the object pixel 5f is modified to x1=0, x2=0, x3=1 and x4=1.

Figure 74:
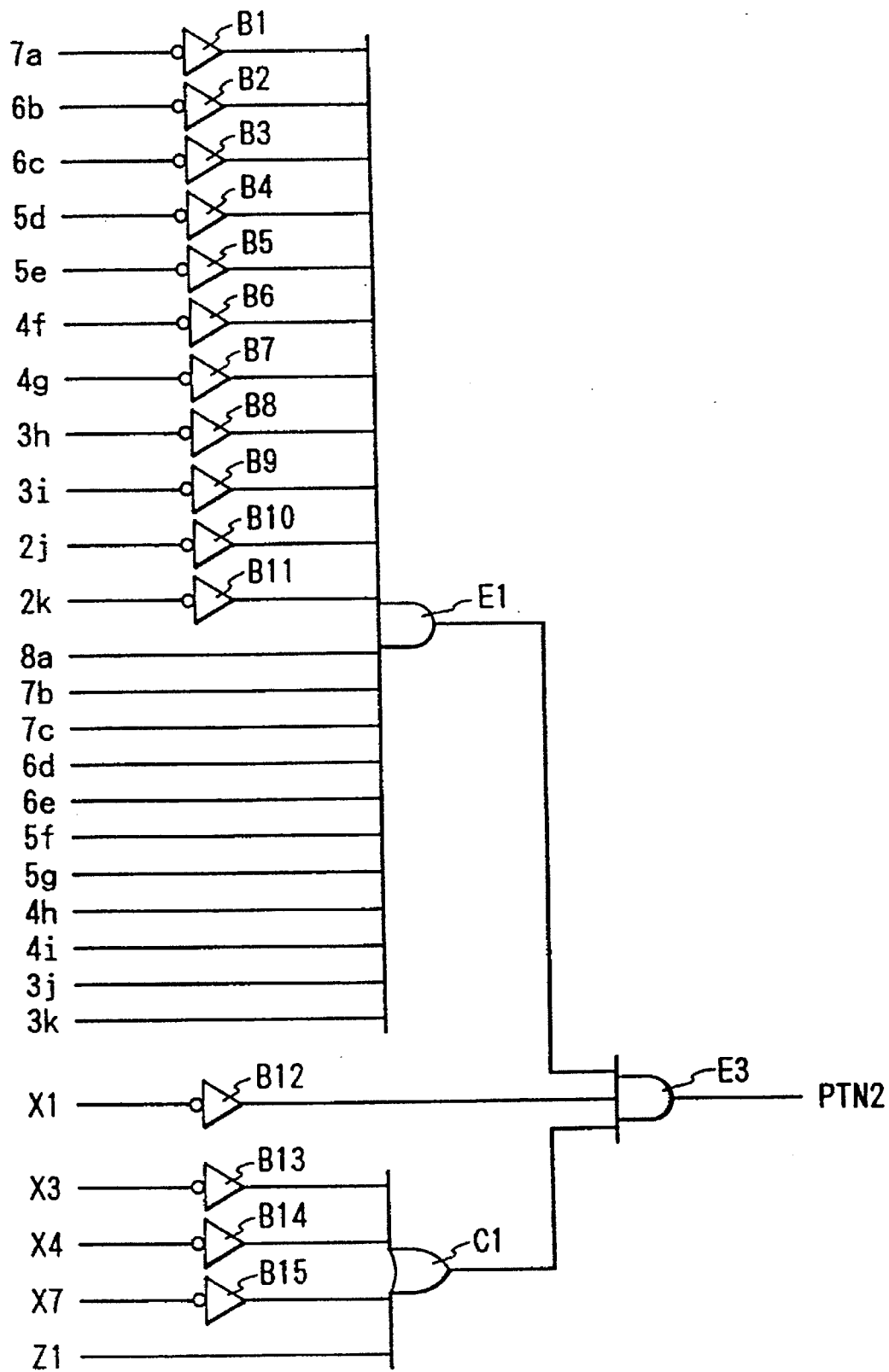
FIG. 74 is a circuit diagram of the feature extracting circuit corresponding to the algorithm shown in FIGS. 70A to 70C.

This algorithm can be realized by a circuit shown in FIG. 74, wherein provided are inverters B1–B15, AND gates E1, E3, and an OR gate C1. The inverter B12 receives the information of the area X1, while the OR gate C1 receives the information of the areas X3, X4, X7 and Y1–Y8 (Z1), and the AND gate E1 receives the information of the bit pattern. The output singal PTN2 of the AND gate E3 assumes a level "1" or "0" respectively when the above-mentioned conditions are met or not. Said output signal PTN2 is supplied to an OR gate Q13 of the circuit shown in FIG. 77.

Figure 68C:
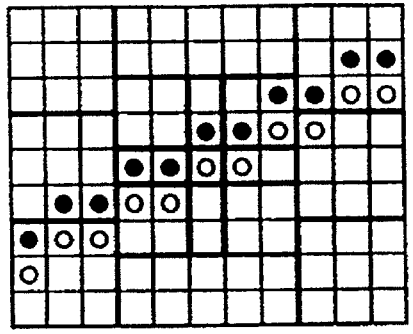

FIG. 71A–71C show the algorithm corresponding to FIG. 68C. When the areas X8=X3=0 in feature, and at least one of the features of the areas Y1–Y8, X1 and X2 is "0", as shown in FIG. 71B, and the bit pattern shows $7a=6b=6c=5d=5e=4f=4g=3h=3i=2j=2k=1$ and $8a=7b=7c=6d=6e=5f=5g=4h=4i=3j=3k=0$ as shown in FIG. 71A, the object pixel $5f$ is modified to x1=1, x2=1, x3=0 and x4=0.

Figure 75:
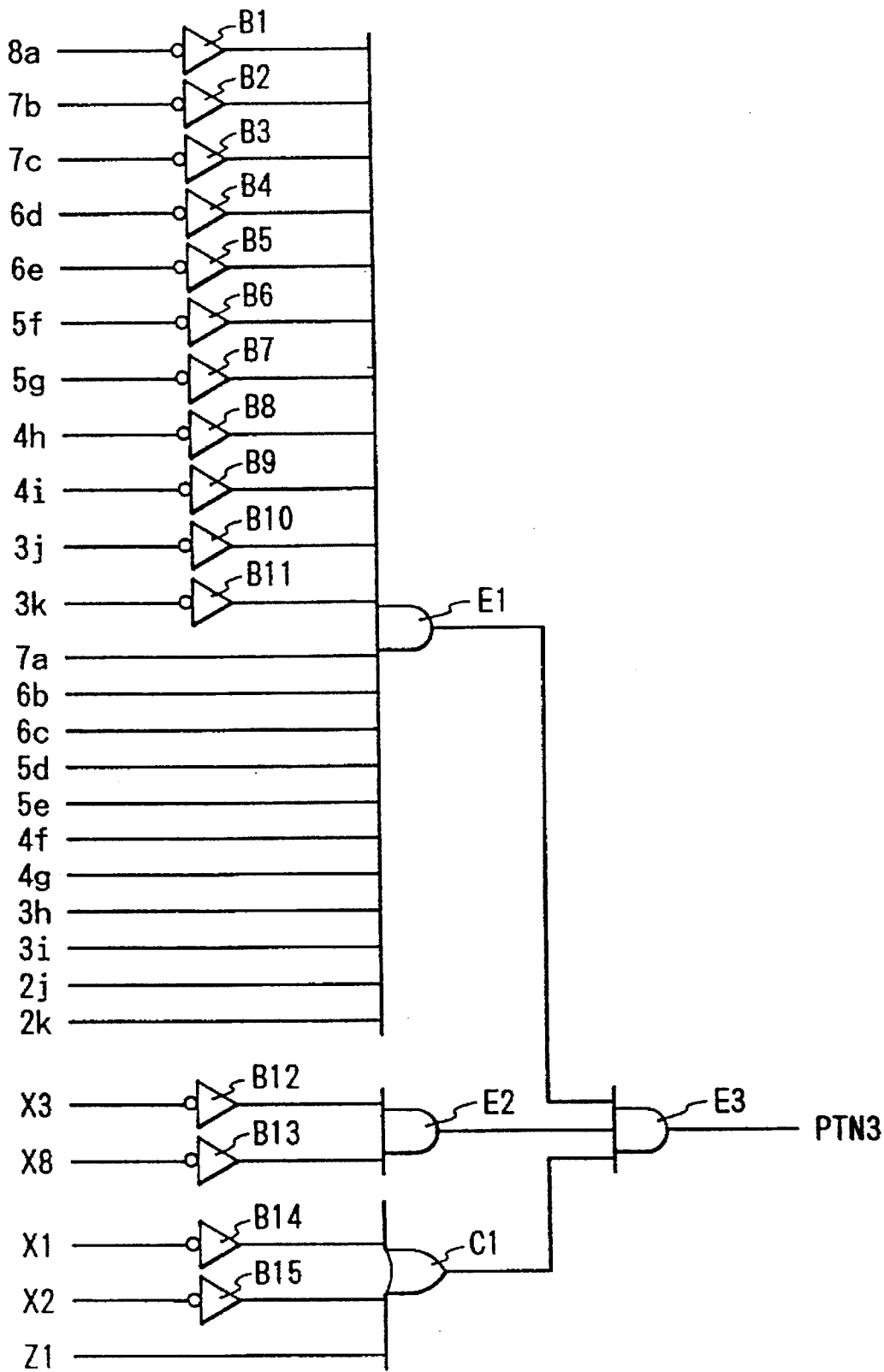
FIG. 75 is a circuit diagram of the feature extracting circuit corresponding to the algorithm shown in FIGS. 71A to 71C.

This algorithm can be realized by a circuit shown in FIG. 75, wherein provided are inverters B1–B15, AND gates E1=E3, and an OR gate C1. The AND gate E2 receives the information of the areas X3, X8, while the OR gate C1 receives the information of the areas X1, X2 and Y1–Y8 (Z1), and the AND gate E1 receives the information of the bit pattern. The output signal PTN3 of the AND gate E3 assumes a level "1" or "0" respectively if the above-mentioned conditions are met or not. Said output signal PTN3 is supplied to an OR gate Q4 of the circuit shown in FIG. 77.

Figure 68D:
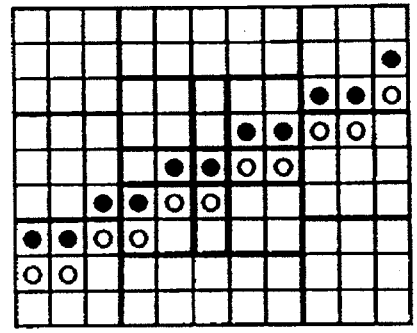

FIGS. 72A–72C show the algorithm corresponding to FIG. 68D. When the areas X4=X8=0 in feature, and at least one of the features of the areas Y1–Y8, X1, X2 and X6 is "0" as shown in FIG. 68D, and the bit pattern shows $7a=7b=6c=6d=5e=5f=4g=4h=3i=3j=2k=1$ and $8a=8b=7c=7d=6e=6f=5g=5h=4i=4j=3k=0$ as shown in FIG. 72A, the object pixel is modified to x1=1, x2=1, x3=0 and x4=0.

Figure 76:
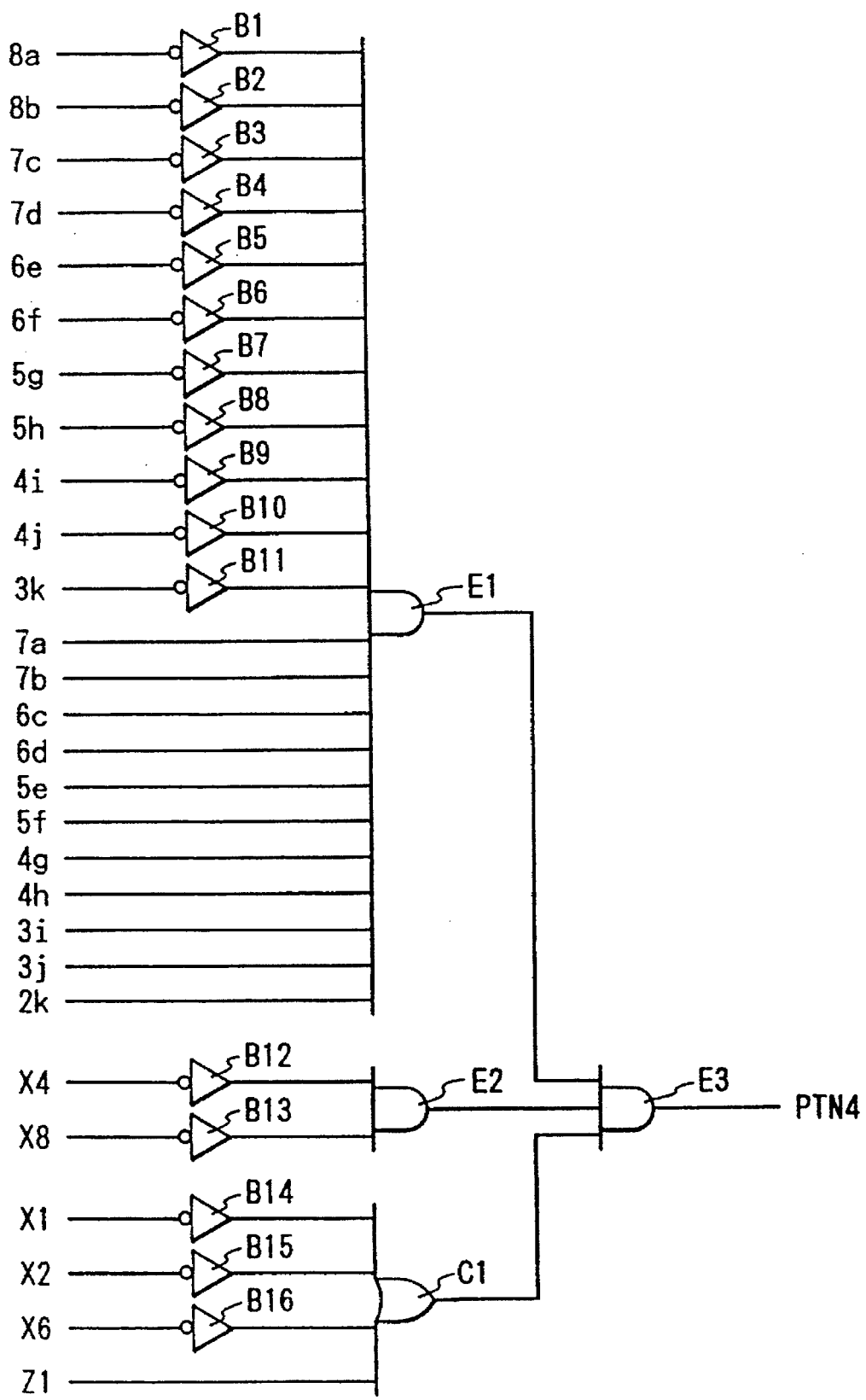
FIG. 76 is a circuit diagram of the feature extracting circuit corresponding to the algorithm shown in FIGS. 72A to 72C.

This algorithm can be realized by a circuit shown in FIG. 76, wherein provided are inverters B1–B16, AND gates E1–E3, and an OR gate C1. The AND gate E2 receives the information of the areas X4 and X8, while the OR gate C1 receives the information of the areas X1, X2, X6 and Y1–Y8 (Z1), and the AND gate E1 receives the information of the bit pattern. The output singal PTN4 of the AND gate E3 assumes a level "1" or "0" respectively if the above-mentioned conditions are met or not. Said output signal PTN4 is supplied to an OR gate Q13 of the circuit shown in FIG. 77.

FIGS. 78A–78D illustrate the smoothing process on a pattern, with a vertical boundary line with an inclination exceeding 45°. In each of these drawings, when a bit pattern shown in the left-hand drawing is detected, the object pixel is modified as shown in the right-hand drawing. The details of the algorithms shown in FIGS. 78A–78D are shown in FIGS. 79A–82C.

Figure 78A:
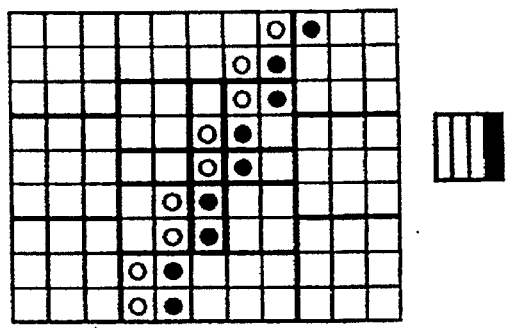
FIGS. 78A to 78D are views showing the smoothing process on a line with an inclination equal to or larger than 45°.

FIGS. 79A–79C show the algorithm corresponding to FIG. 78A. When the areas X1 and X6 are "0" in feature, and at least one of the features of the areas Y1–Y8, X4 and X7 is "0" as shown in FIG. 79B, and the bit pattern shows $1h=2g=3f=4f=5f=6e=7e=8d=9d=0$ and $1i=2h=3h=4g=5g=6f=7f=8e=9e=1$ as shown in FIG. 79A, the object pixel $5f$ is modified to x1=0, x2=0, x3=0 and x4=1.

Figure 78C:
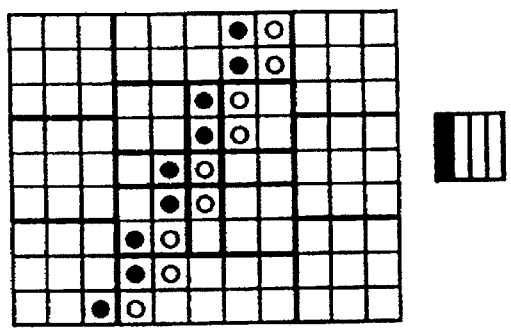
Figure 78B:
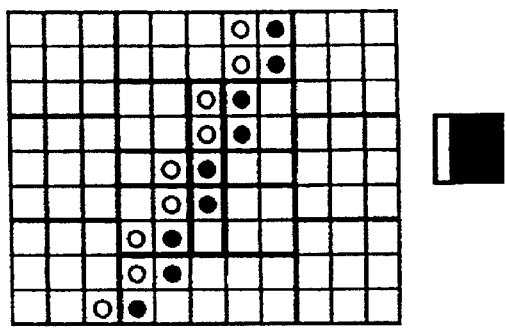

FIGS. 80A–80C show the algorithm corresponding to FIG. 78B. When the area X5=0 in feature, and at least one of the features of the areas Y1–Y8, X3, X8 and X7 is "0" as shown in FIG. 80B, and the bit pattern shows $1h=2h=3g=4g=5f=6f=7e=8e=9d=1$ and $1g=2g=3f=4f=5e=6e=7d=8d=9c=1$ as shown in FIG. 81B, the object pixel $5f$ is modified to x1=0, x2=1, x3=1 and x4=1.

FIGS. 81A–81C show the algorithm corresponding to FIG. 78C. When the areas X4 and X7 are "0" in feature and at least one of the features of the areas Y1–Y8, X1 and X6 is "0" as shown in FIG. 81B, and the bit pattern shows $1h=2h=3g=4g=5f=6f=7e=8e=9d=0$ and $1g=2g=3f=4f=5e=6e=7d=8d=9c=1$ as shown in FIG. 81A, the object pixel $5f$ is modified to x1=1, x2=0, x3=0 and x4=0.

Figure 78D:
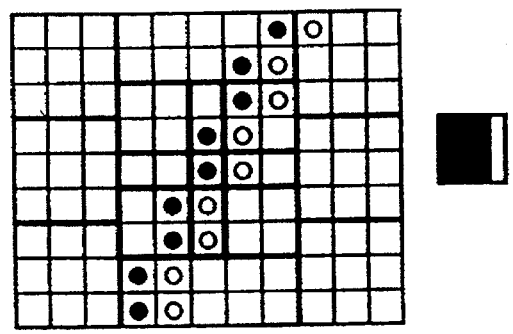

FIGS. 82A–82C show the algorithm corresponding to FIG. 78D. When the areas X4 and X8 are "0" in feature, and at least one of the features of the areas Y1–Y8, X1 and X8 is "0" as shown in FIG. 81B, and the bit pattern shows $1h=2g=3g=4f=5f=6e=7e=8d=9d=1$ and $1i=2h=3h=4g=5g=6f=7f=8e=9e=0$, as shown in FIG. 82A, the object pixel $5f$ is modified to x1=1, x2=1, x3=1 and x4=0.

In practice, each of the patterns shown in FIG. 68A–68D has a laterally symmetrical pattern with respect to the object pixel, so that there are 8 patterns in total. Also each of the patterns shown in FIGS. 78A–78D has a laterally symmetrical pattern with respect to the object pixel, so that there are 8 patterns in total.

Figure 83:
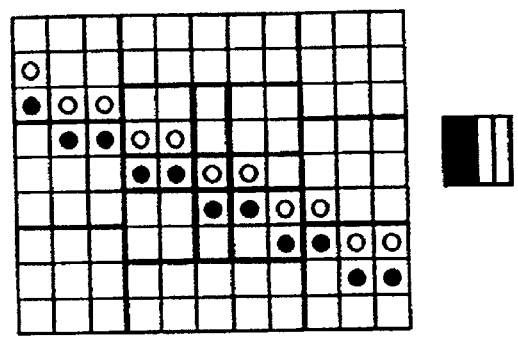
FIG. 83 is a view in which the pattern in FIG. 68A is laterally inverted.
Figure 86A:
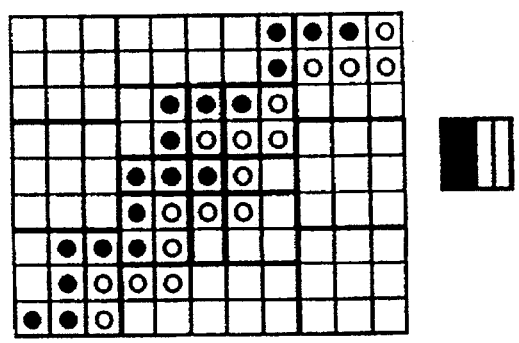
FIGS. 86A to 86D are views showing conventional smoothing algorithms.
Figure 86C:
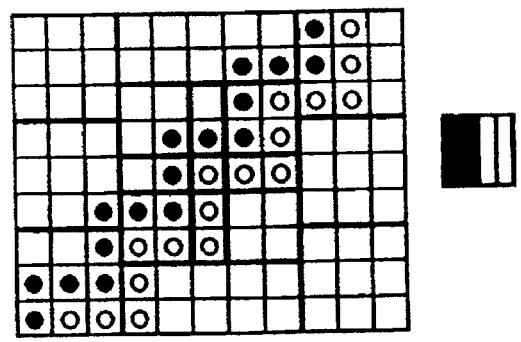
Figure 86B:
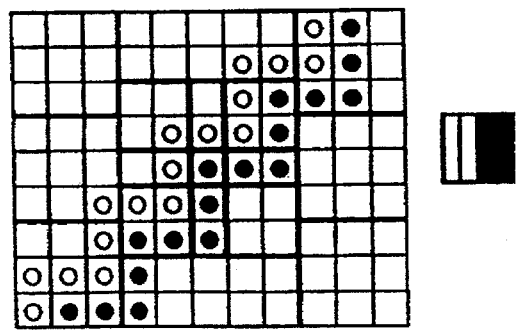
Figure 86D:
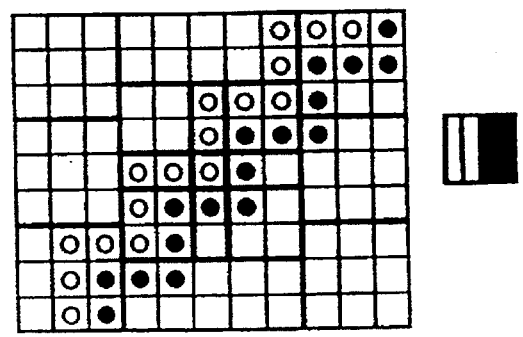

For example, FIG. 83 shows a pattern laterally symmetrical to that shown in FIG. 68A. The smoothing algorithm in this case is to modify the object pixel to x1=1, x2=1, x3=0 and x4=0 if $2a=3b=3c=4d=4e=5f=5g=6h=6i=7k=0$ (white) and $3a=4b=4c=5d=5e=6f=6g=7h=7i=8j=8k=1$ (black), X7=X1=0 in feature and at least one of the features of the areas Y1–Y8, X3 and X4 is "0".

Similarly a laterally symmetrical algorithm is set for each of the patterns shown in FIGS. 68B, 68C and 68D.

Such laterally symmetrical feature extracting algorithms realize symmetrical smoothing for example on the characters "O", "U", "V", "W" etc., whereby these characters appear in natural manner.

Figure 77:
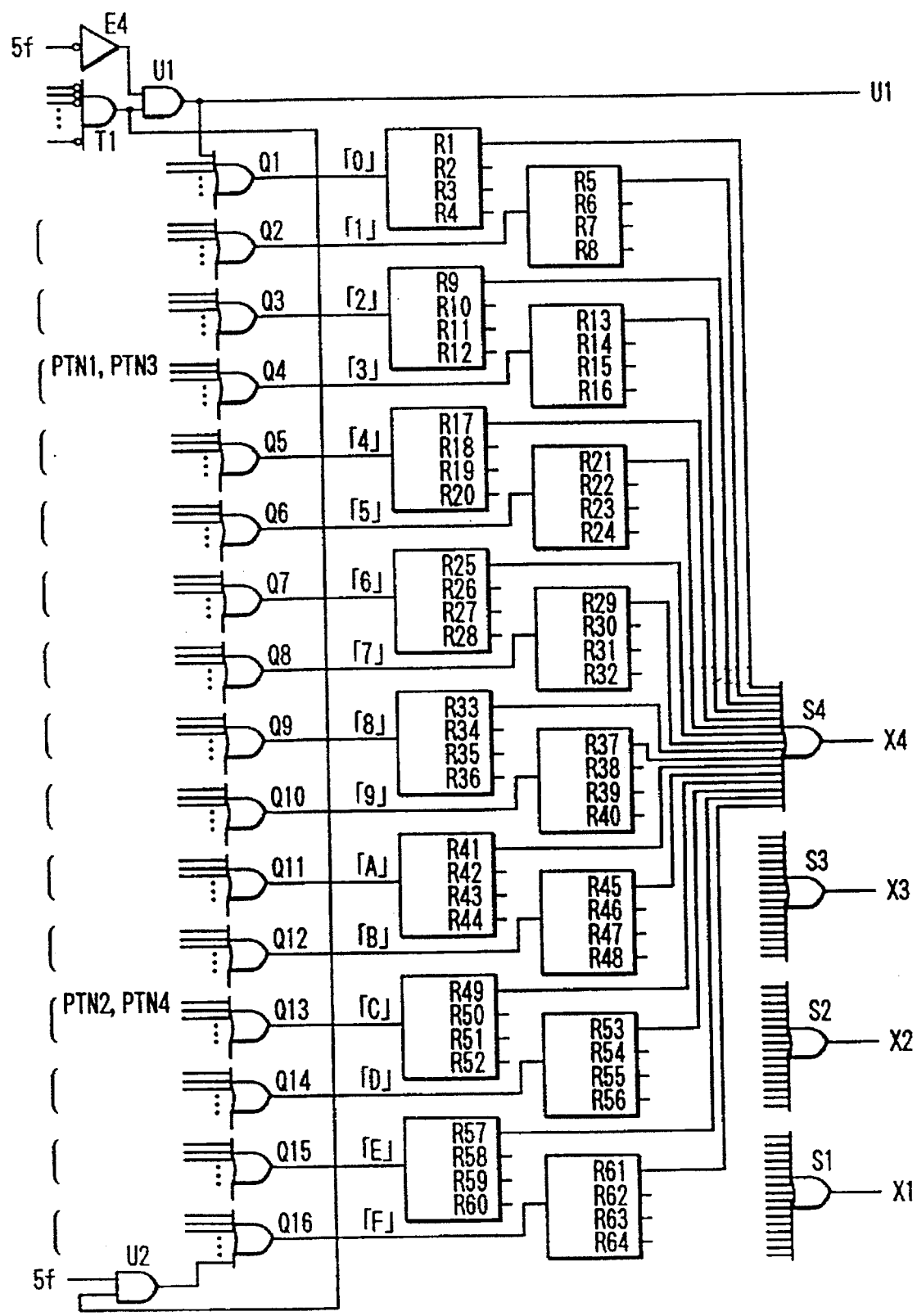
FIG. 77 is a circuit diagram showing an example of the feature extracting unit in the 2nd embodiment.

FIGS. 77 and 48 illustrate a data generation circuit for receiving the output signals of plural feature extracting circuits, including those explained above, and generating the data of the object pixel $5f$ according to thus entered signals, wherein FIG. 48 shows the details of a part of the circuit shown in FIG. 77. In these drawings there are shown OR gates Q1–Q16, 2-input AND gates R1–R64, U1 and U2, 16-input OR gates S1–S4, an inverter E4, and a NOR gate T1. Each of the output signals of said plural feature extracting circuits is supplied to one of the OR gates Q1–Q16. For example the aforementioned output signals PTN1, PTN3 are supplied to the OR gate Q4, and the output singals PTN2, PTN4 are supplied to the OR gate Q13.

Also the output signals, including PTN1–PTN4, from all the feature extracting circuits are supplied to the NOR gate T1. The AND gates R1–R64 constitute code generating circuits each of which is composed of four AND gates and which generate 4-bit codes "0"–"F" in response to the outputs "1" from the OR gates Q1–Q16, said 4-bit code being composed of digits 20 (for example from R4), 21 (from R3), 22 (from R2) and 23 (from R1). The bits 20 of said codes are supplied to the OR gate S1 which releases an output signal x1. The bits 21 of said codes are supplied to the OR gate S2 which releases an output signal x2. The bits 22 of said codes are supplied to the OR gate S3 which releases an output signal x3. Also the bits 23 of said codes are supplied to the OR gate S4 which releases an output signal x4.

Thus, in response to the output of the OR gates Q1–Q16 of which only one can be selected at a time, there is generated one of the codes "0"–"F", thus providing a set of output signals x1–x4 from the OR gate S1–S4.

For example, a code "3" provides output signals x1=1, x2=1, x3=0 and x4=0, and a code "9" provides output signals x1=1, x2=0, x3=0 and x4=1.

The NOR gate T1, receiving all the feature extraction signals, generates an output signal "1" in case none of said feature extraction signals is "1" (case of no coincidence with any of the feature patterns). In such situation, if the object pixel 5f is a white dot, the 2-input AND gate U1 provides an output signal "1" to release an output signal "1" (code "O") from the OR gate Q1, thus providing x1=0, x2=0, x3=0 and x4=0. Also if the object pixel 5f is a black dot, the 2-input AND gate U2 provides an output signal "1" to release a signal "1" (code "F") from the OR gate Q16, thus providing x1=1, x2=1, x3=1 and x4=1. In this manner the data of the object pixel 5f are conserved in case the input image does not coincide with any of the predetermined features.

The output signals x1–x4 of the above-explained data generation circuit are converted, by a known parallel-serial conversion circuit 44, into the signal VDOM consisting of serial signals x1, x2, x3, x4 released in synchronization with the clock signal VCK and used for driving the laser through the laser driver.

Figure 84A:
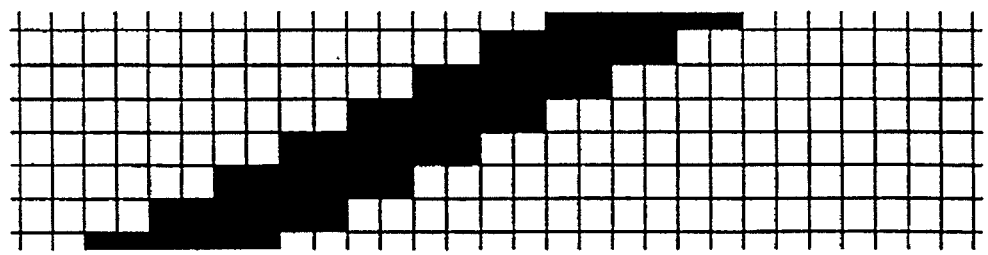
FIGS. 84A and 84B are views showing the effect of smoothing for a lateral line with an inclination less than 45°.
Figure 84B:
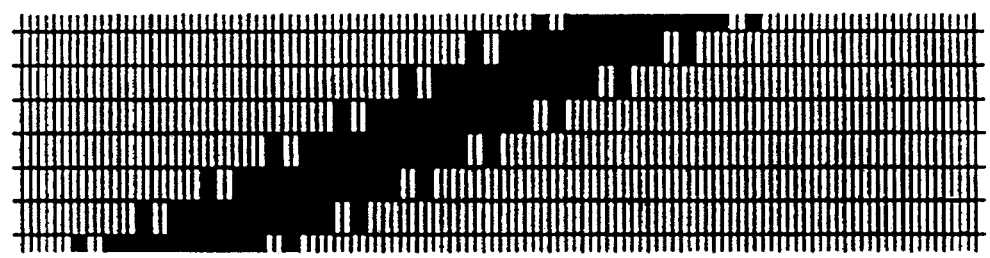

In the smoothing of a lateral line, with an inclination less than 45° shown in FIG. 84A, with the above-explained algorithm, there is obtained an output image signal shown in FIG. 84B. As will be understood from FIG. 84B, the smoothing process is conducted in such a manner that the pulse signal added to the left-hand boundary of the line image is equal in time to the signal deleted at said left-hand boundary. A similar process is conducted also at the right-hand boundary of the line. Furthermore the process is conducted in such a manner that the pulse width added at the left-hand boundary of the line is equal to that added at the right-hand boundary.

Figure 85A:
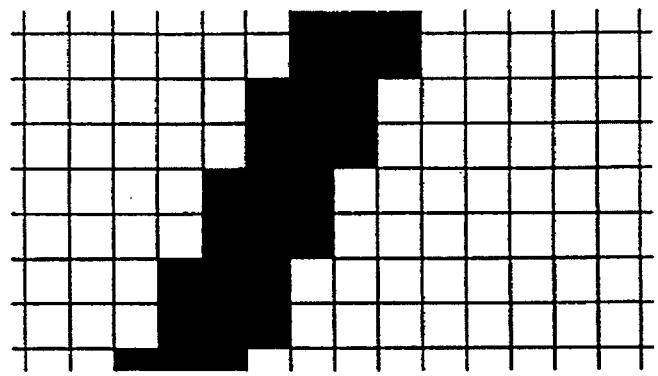
FIGS. 85A and 85B are views showing the effect of smoothing for a line with an inclination equal to or larger than 45°.
Figure 85B:
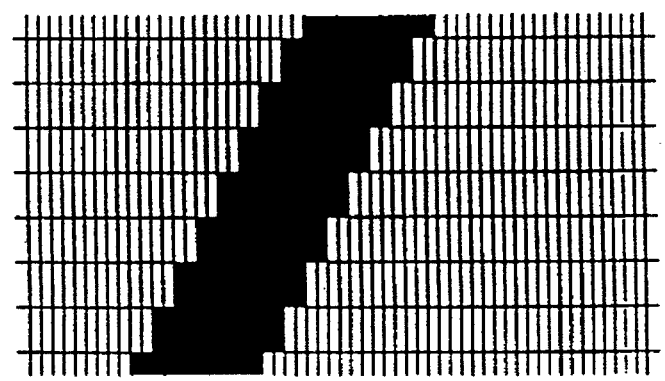
Figure 89A:
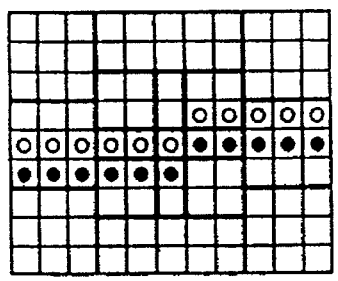
FIGS. 89A to 89H are views showing a smoothing algorithm for a lateral line with almost horizontal edges.
Figure 89E:
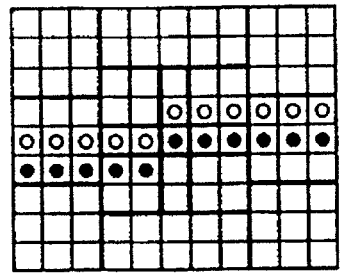
Figure 89B:
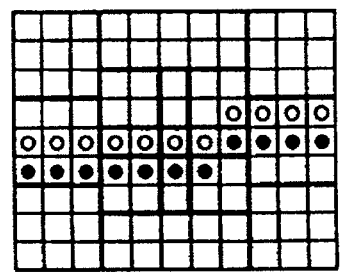
Figure 89F:
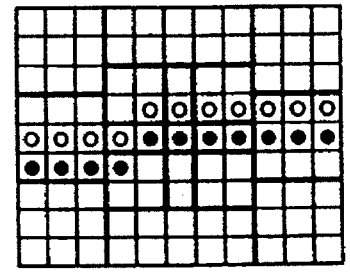
Figure 89C:
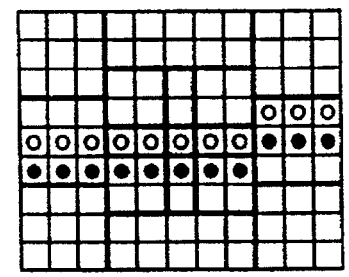
Figure 89G:
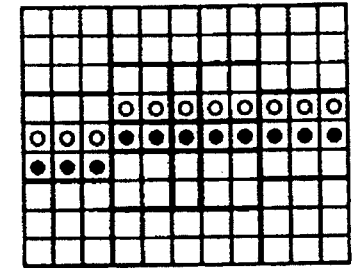
Figure 89D:
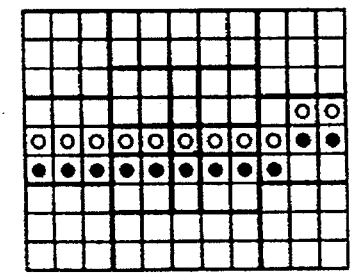
Figure 89H:
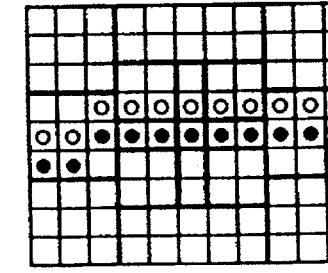
Figure 91A:
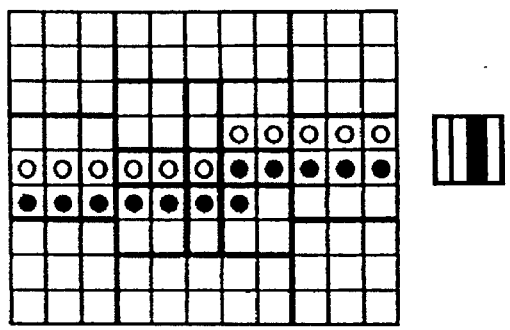
FIGS. 91A to 91D are views showing patterns modified from the pattern of FIG. 90A.
Figure 91C:
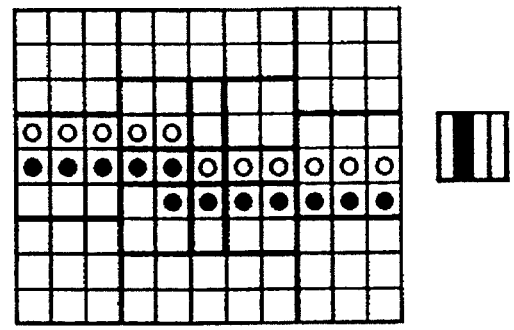
Figure 91B:
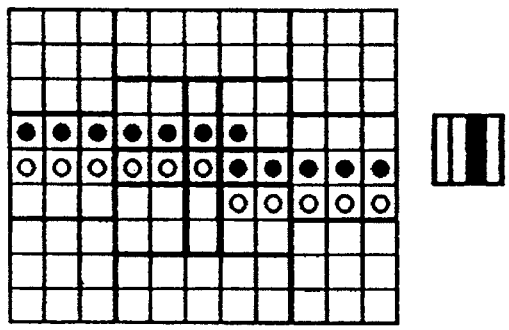
Figure 91D:
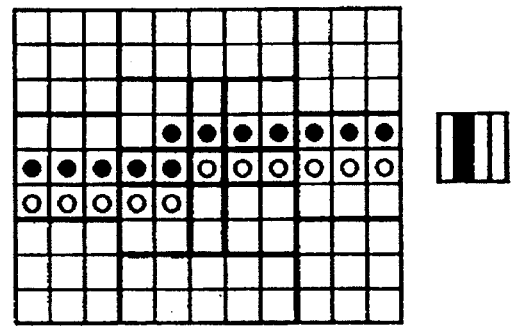
Figure 92A:
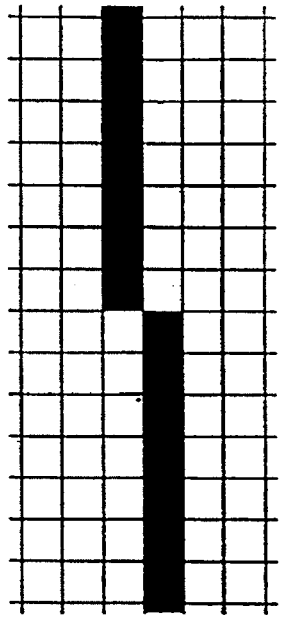
FIGS. 92A to 92F are views showing the effect of smoothing of said embodiment of an almost horizontal line.
Figure 92B:
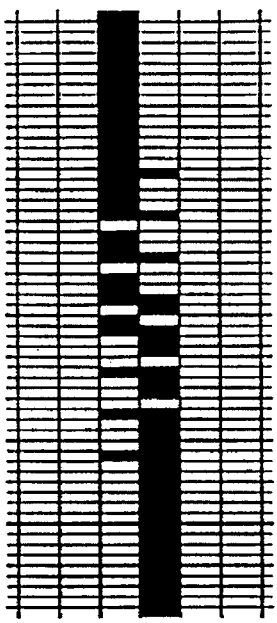
Figure 92C:
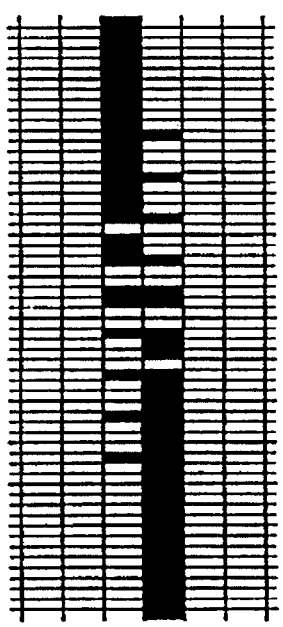
Figure 92D:
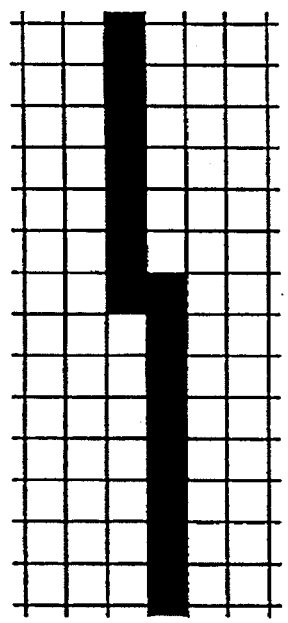
Figure 92E:
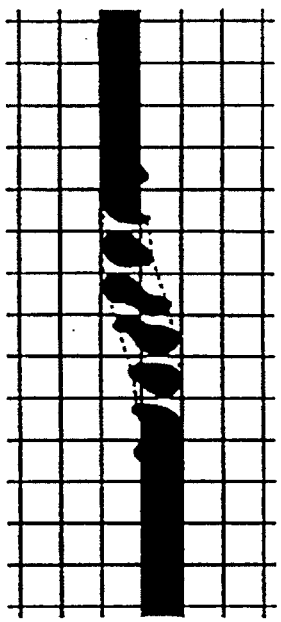
Figure 92F:
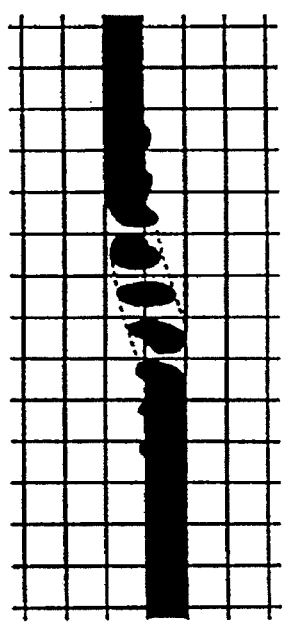
Figure 95A:
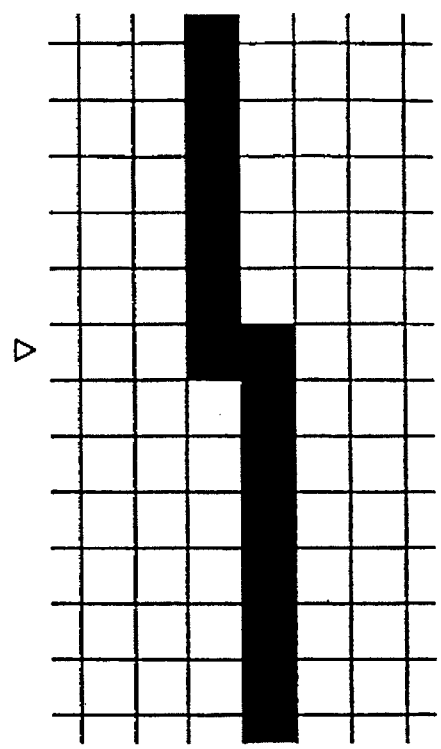
FIGS. 95A to 95D are views showing the effect of smoothing of the 2nd embodiment on an almost vertical line.
Figure 95C:
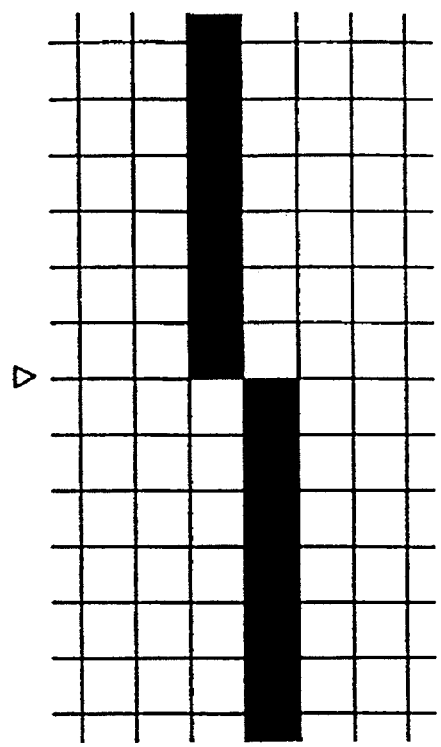
Figure 95B:
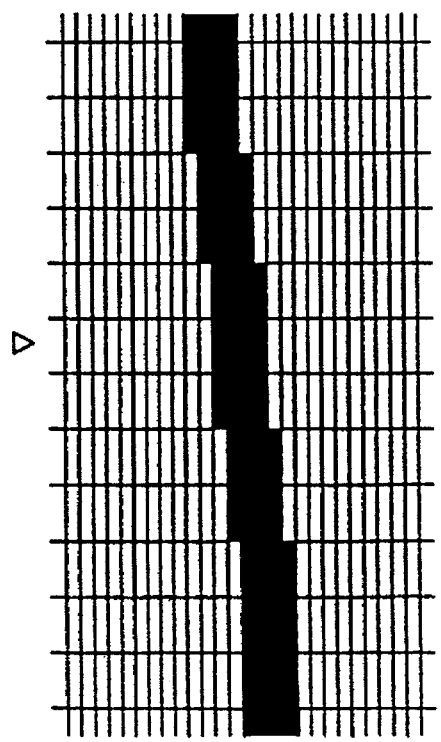
Figure 95D:
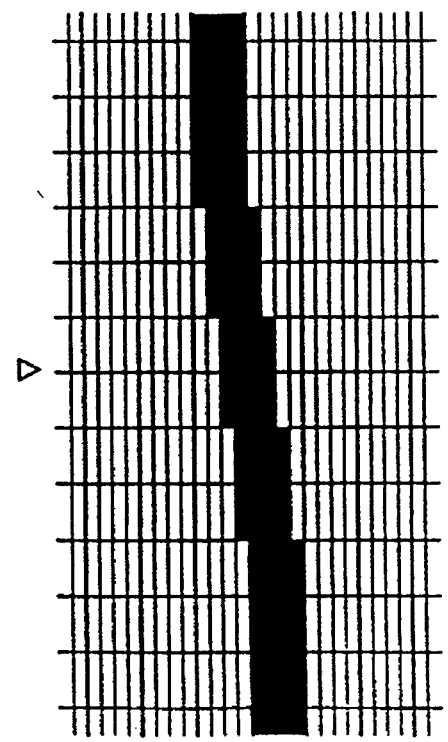
Figure 96A:
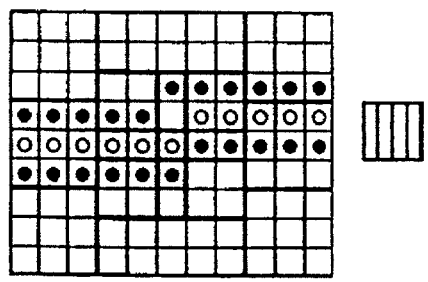
FIGS. 96A to 96H are views showing the smoothing algorithm for a white line.
Figure 96E:
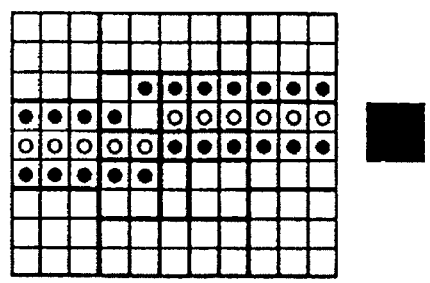
Figure 96B:
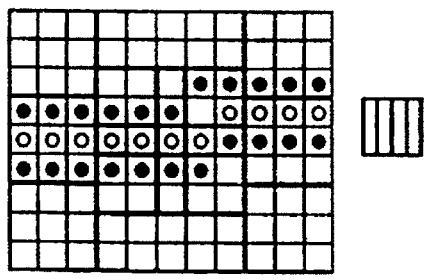
Figure 96F:
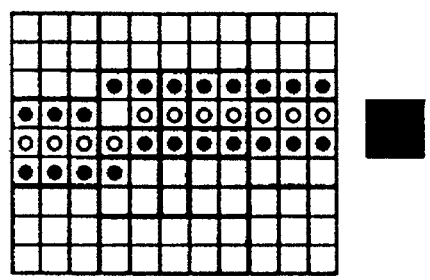
Figure 96C:
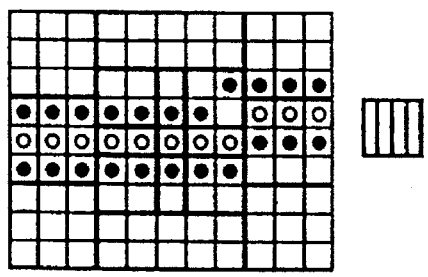
Figure 96G:
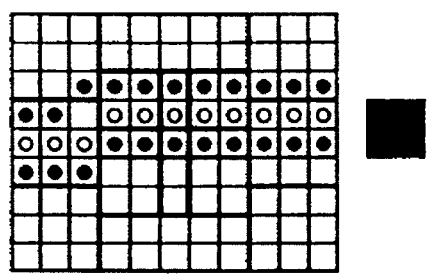
Figure 96D:
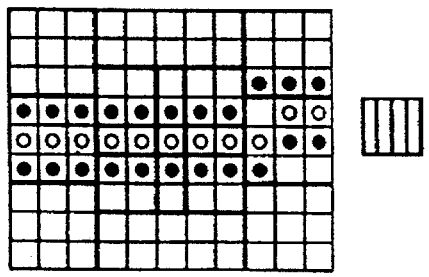
Figure 96H:
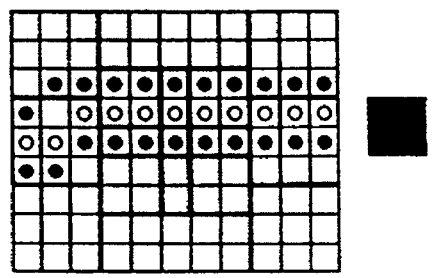

Also the smoothing process on a vertical line, with an inclination exceeding 45° as shown in FIG. 85A, provides an output image signal shown in FIG. 85B. As will be understood from this drawing, the signal width added to (or deleted from) the left-hand boundary of the line image is equal to that deleted from (or added to) the right-hand boundary. Consequently, the line width after smoothing remains same as that before smoothing.

Such smoothing process allows to prevent the narrowing or broadening of the line after the smoothing. Also the line image appears same at the left- and right-hand edges, whereby the image quality of the line can be improved.

In the conventional smoothing technology, there are employed line smoothing algorithms as shown in FIGS. 86A–86D, whereby a line shown in FIG. 87A is smoothed to a line image shown in FIG. 87B. It is to be noted, however, that the line shown in FIG. 87A has a dot configuration with two dots in the vertical direction and two dots in the horizontal direction at the line boundary, and that the smoothing should not be applied to such line, having the dot configuration of two or more pixels in the vertical direction and two or more dots in the horizontal direction at the line boundary, because such dot configuration should have been intentionally made in the computer, for the purpose of printing jagged edge, as the computer can easily develop, in a memory area controlled by said computer, dot data having a dot configuration with a dot in the vertical and horizontal directions at the boundary, if desired. Consequently, the smoothing on such boundary will basically alter the nature of the image data. In the present embodiment, the smoothing process is inhibited on the line boundary having a dot configuration with two or more dots in the vertical and horizontal directions, whereby the dots are printed without modification, as shown in FIG. 88B.

FIGS. 89A–89H illustrate the smoothing algorithm for a nearly horizontal line, explained in the foregoing first embodiment. The details of said algorithm will not be explained since they are similar to those already explained before.

Figure 63D:
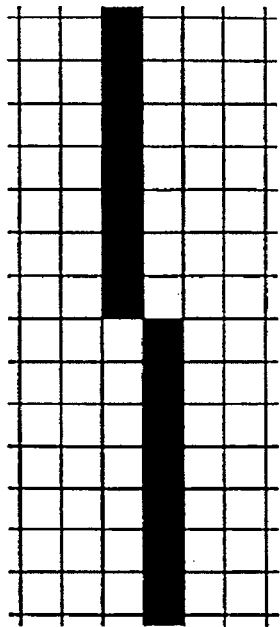
FIGS. 63A to 63F are views showing smoothing process on two different one-dot lines.
Figure 63E:
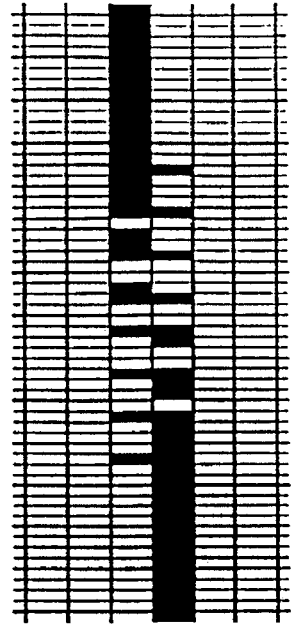
Figure 63F:
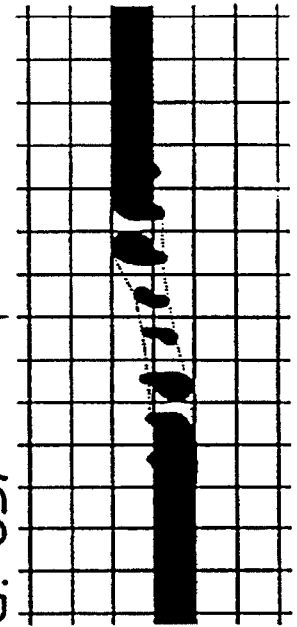
Figure 63A:
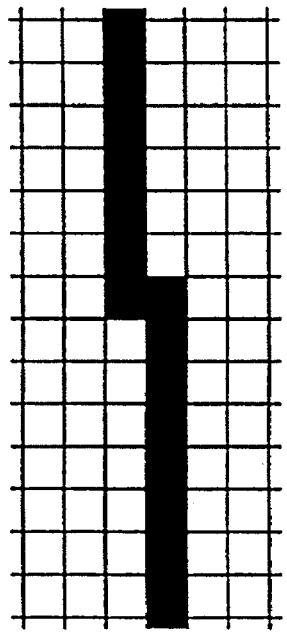
Figure 63B:
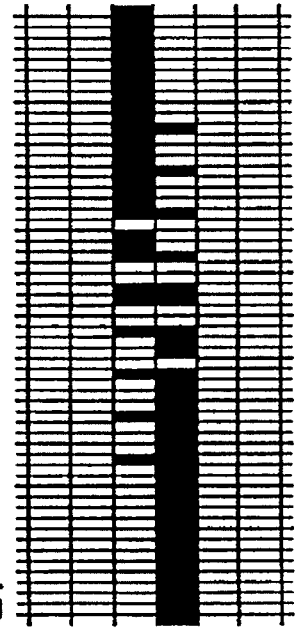
Figure 63C:
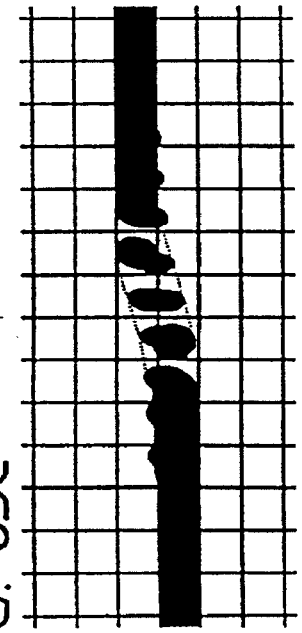

The smoothing with said algorithm on a one-dot line shown in FIG. 63A generates smoothed signals shown in FIG. 63B, and, because of the characteristics of the electrophotographic process, there is obtained a printed image shown in FIG. 63C. Also the smoothing on a one-dot line shown in FIG. 63D generates smoothed signals shown in FIG. 63E, and there is obtained a printed image shown in FIG. 63F.

The area of black dots added to the smoothed portion is smaller in the case of FIG. 63D, by a black dot, than in the case of FIG. 63A, though the original image is a one-dot line in both cases. Therefore the smoothed printed image in FIG. 63F, obtained from the line shown in FIG. 63D, becomes narrower and broken. On the other hand, if the algorithm is so modified as to increase the dot area to be added to the smoothed portion, the line narrowing by the smoothing on the line shown in FIG. 63D can be prevented but there will result a line broadening by the smoothing on the line shown in FIG. 63A.

FIGS. 90A–90P illustrate the algorithms of smoothing, according to the second embodiment, on the boundary of a nearly horizontal line. The details of said algorithm will not be explained since they are similar to those already explained before. The algorithm shown in FIG. 90A is applicable to four patterns in total, which are vertically or horizontally symmetrical with respect to the object pixel, as shown in FIGS. 91A to 91D. Also each of the algorithms shown in FIGS. 90B–90P is applicable to a set of four patterns which are vertically or horizontally symmetrical with respect to the object pixel.

The algorithms shown in FIGS. 90A–90P, being capable of distinguishing the aforementioned two types of one-dot line, can execute an optimum process for preventing the narrowing or broadening of the line, according to the type thereof.

FIGS. 92A–92F illustrate the smoothing of the one-dot lines of the above-mentioned two types, with the algorithm of the second embodiment of the present invention. As the above-mentioned algorithm for identifying the type of line is incorporated, the black pixel area in the smoothed portion is printed same for either type. As a result, the line narrowing or broadening at the smoothed portion can be prevented, so that there can be obtained a printed line of high quality.

FIGS. 93A–93F illustrate the smoothing algorithm for a nearly vertical line, explained in the foregoing first embodiment. The details of said algorithm will not be explained as they are similar to those already explained before.

Figure 64B:
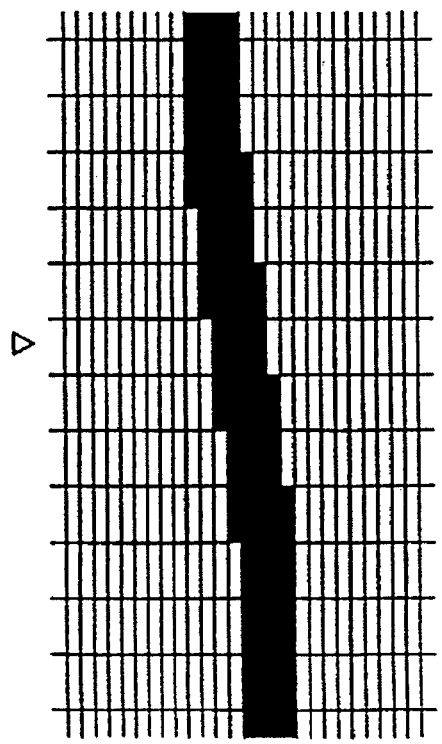

The smoothing with said algorithm on a one-dot line shown in FIG. 64A generates smoothed signals shown in FIG. 64B. Also the smoothing on a one-dot line shown in FIG. 64C generates smoothed signals shown in FIG. 64D.

Figure 64D:
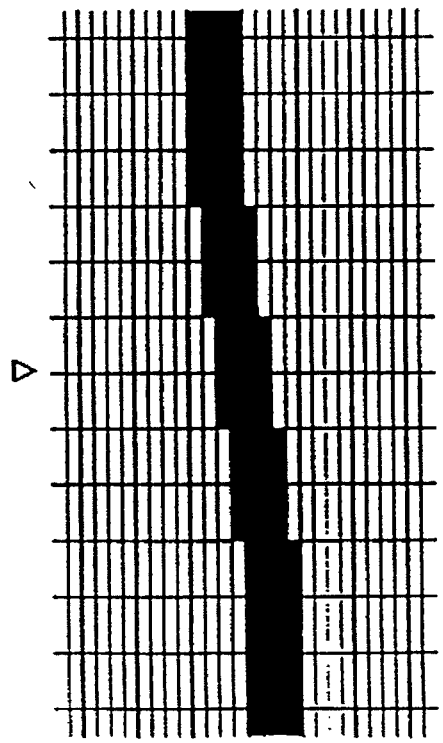

As will De apparent from FIGS. 64B and 64D, the area of black dots added to the smoothed portion is larger in the case of FIG. 64A, by one black dot, than in the case of FIG. 64C. Therefore, the smoothed line, obtained from the line shown in FIG. 64A, is broadened as shown in FIG. 64B. On the other hand, if the algorithm is so modified as to reduce the dot area to be added to the smoothed portion thereby preventing the broadening of the line shown in FIG. 64A, the smoothed line obtained from the line shown in FIG. 64C will show narrowing.

FIGS. 94A–94M illustrates the algorithms of smoothing, according to the second embodiment, on the boundary of a nearly vertical line. The details of said algorithm will be omitted as they are similar to those already explained before. The algorithm shown in FIG. 94A is applicable, in fact, to four patterns in total, which are mutually symmetrical in the vertical or horizontal direction, with respect to the object pixel.

The algorithms shown in FIGS. 94A–94M, being capable of distinguishing the aforementioned two types of one-dot line, can execute an optimum process for preventing the narrowing or broadening of the line, according to the type thereof.

FIGS. 95A–95D illustrate the smoothing of the one-dot lines of the above-mentioned two types, with the algorithm of the second embodiment of the present invention. As the above-mentioned algorithm for distinguishing the types of line is incorporated, the black pixel area in the smoothed portion is printed same for either type. As a result, the line narrowing or broadening at the smoothed portion can be prevented, and a printed line of high image quality can be obtained.

FIGS. 65A–65C illustrate the smoothing on a lateral white line of one-dot width with an inclination not exceeding 45°. The white line becomes broken by the smoothing, as shown in FIG. 65C, so that the image quality is deteriorated. Also the smoothing effect in this case is easily influenced by the conditions of electrophotographic process or by the ambient conditions such as temperature and humidity.

FIGS. 96A–96H illustrate algorithms of the second embodiment, for resolving the above-mentioned drawback. The details of said algorithms are omitted because they are similar to those already explained before. As in the foregoing cases, each of the algorithms shown in FIG. 96A–96H is applicable to a set of four patterns in total (now shown) which are mutually symmetrical in the vertical or horizontal direction with respect to the object pixel. If the input image matches one of said patterns, the data of the object pixel are released without modification.

Figure 97A:
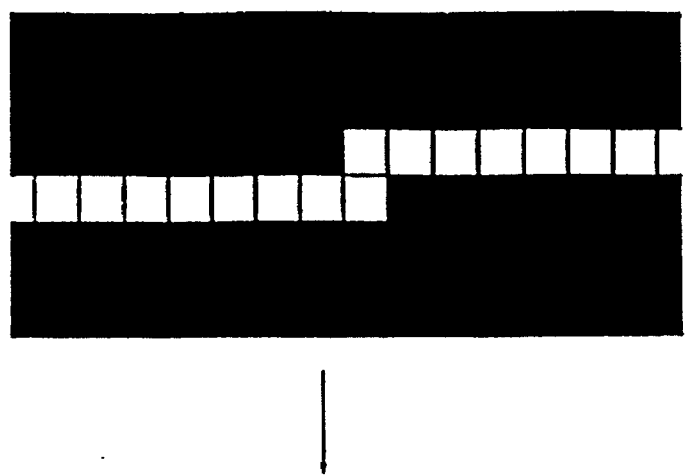
FIGS. 97A and 97B are views showing the effect of smoothing of the 2nd embodiment on a white line.
Figure 97B:
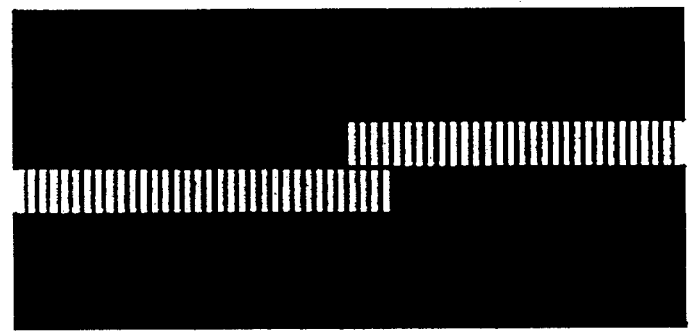

FIG. 97B shows the print obtained, in such case, from a line in FIG. 97A. The print after the processing is not smoothed but printed in the original form without narrowing.

Figure 98:
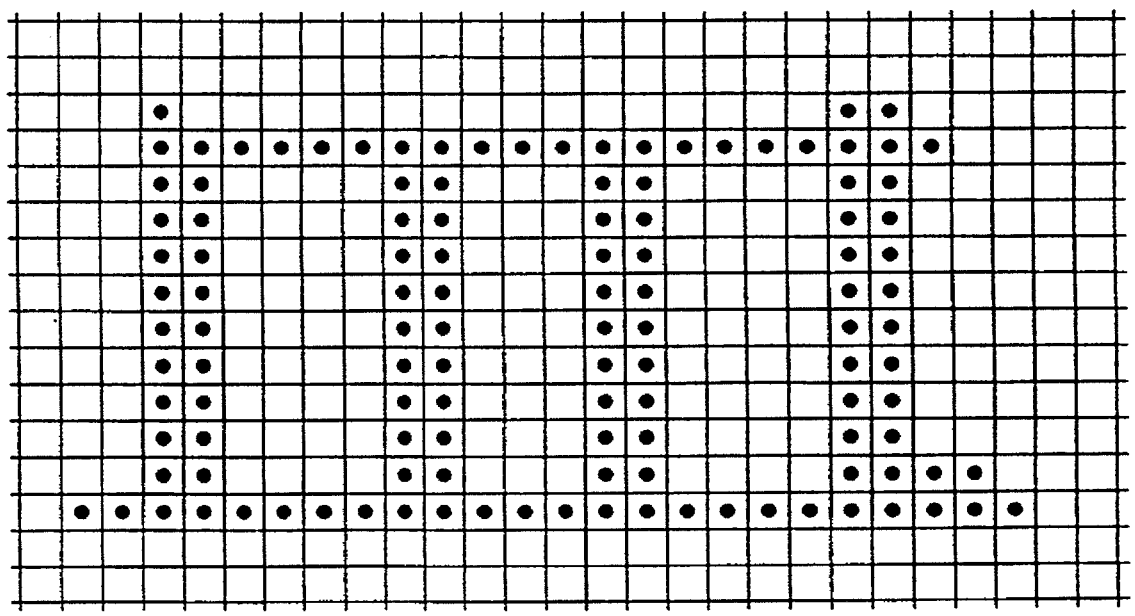
FIG. 98 is a view showing another example of dot pattern of Kanji character.

FIGS. 66 and 98 show examples of bit data pattern of a Kanji character, generated by the character generator and transmitted to the printer.

Figure 99:
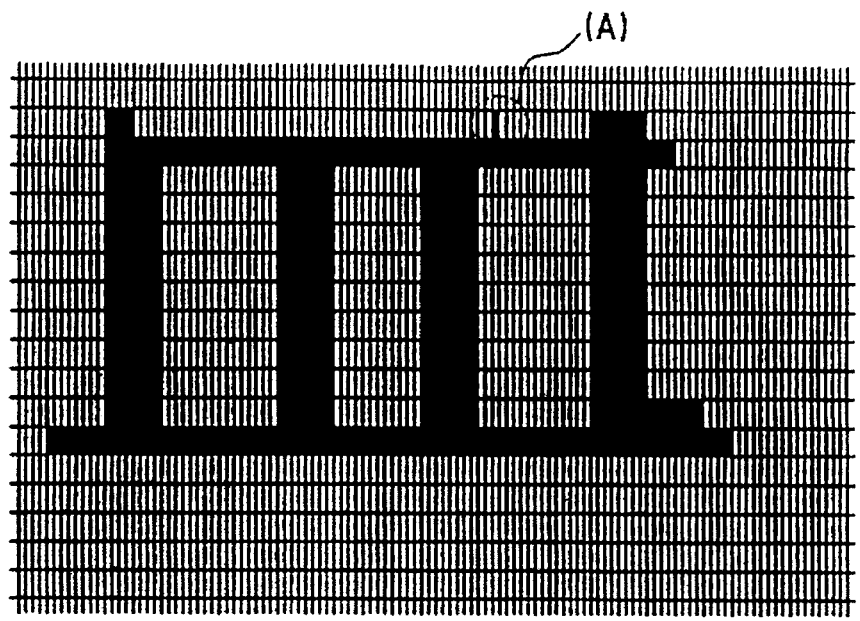
FIG. 99 is a view showing an example of smoothing on the character shown in FIG. 98.

The smoothing process with the algorithms of the first embodiment shown in FIGS. 89A–89H and 93A–93F generates, respectively from the patterns shown in FIGS. 66 and 98, those shown in FIGS. 67 and 99, which are deteriorated in image quality because of the presence of a spike pulse or a wen as shown by (A).

Such drawback often occurs in Kanji characters which are generally rich in straight or rectangular portions in the pattern, but similar deterioration of image quality can occur in certain alphabetic characters such as "E" and "F".

The above-mentioned drawback can be prevented by the algorithms of the second embodiment, shown in FIGS. 100A–105.

Figure 100A:
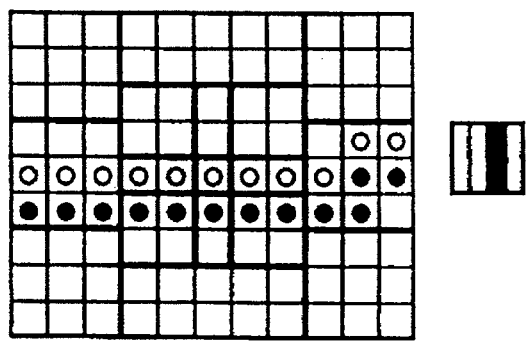
FIGS. 100A and 100B are views showing the inhibition of smoothing on a Kanji character.
Figure 100B:
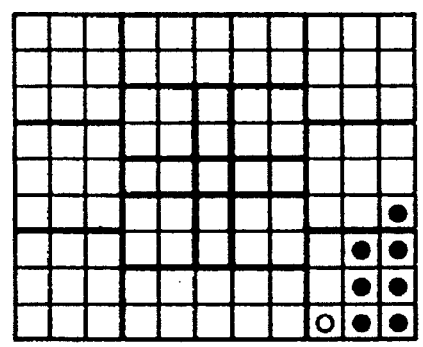

FIGS. 100A and 100B illustrate a variation to the pattern shown in FIG. 90D, and respectively represent a reference pattern and an inhibition pattern for said pattern in FIG. 100A. Even when the input image coincides with the pattern in FIG. 100A, the object pixel is not modified if it also matches the pattern in FIG. 100A'. The detailed algorithm in this case will be explained with reference to FIGS. 101A–101C and 101A'. The modification of the object pixel $5f$ to x1=0, x2=0, x3=1 and x4=0 is conducted only if the areas X1 and X2 are "0" in feature, if at least one of the features of the areas Y1–Y8, X3 and X4 is "0", if the dot pattern shows $5a=5b=5c=5d=5e=5f=5g=5h=5i=4j=4k=0$ (white) and $6a=6b=6c=6d=6e=6f=6g=6h=6i=5j=5k=1$ (black), and if the condition $9i=0$ (white) and $6k=7j=7k=8j=8k=9j=9k=1$ (black) is not met.

Figure 102:
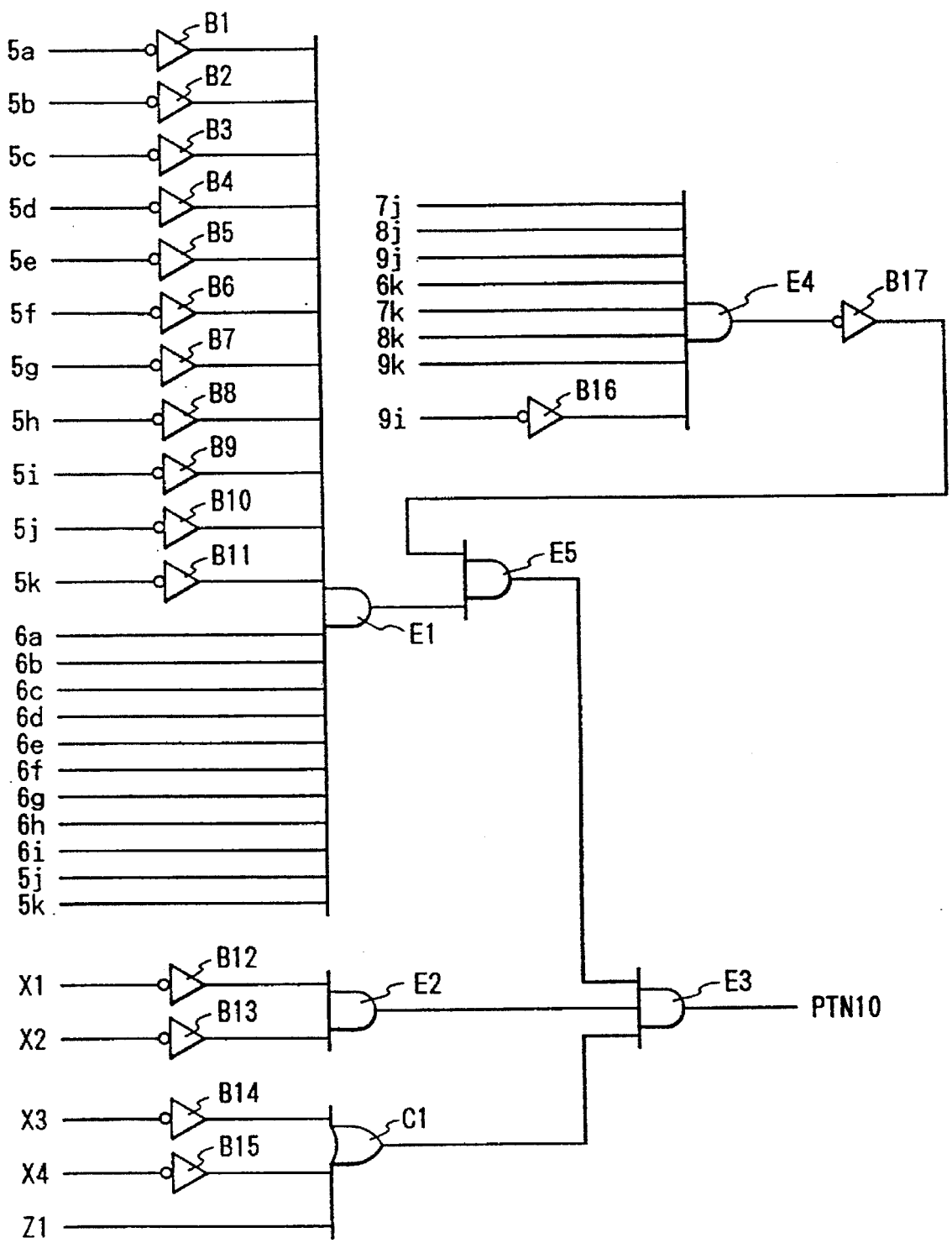
FIG. 102 is a circuit diagram of a smoothing inhibiting circuit for the Kanji character.

This algorithm can be realized by a circuit shown in FIG. 102, wherein provided are inverters B1–B17, AND gates E1–E5 and an OR gate C1. The AND gate E5 receives, at an input port thereof, the output of the AND gate E1 representing the result of matching with the pattern shown in FIG. 101A, and, at the other input port, the output of the inverter B17, representing the result of matching with the inhibiting pattern in FIG. 101A'. The reference output signal PTN10 thus obtained is supplied to the OR gate Q5 of the circuit shown in FIG. 77.

A similar inhibition pattern is provided also for each of the patterns shown in FIGS. 90A–90P.

In this algorithm, even when the input image coincides with the pattern shown in FIG. 101A, the smoothing process is inhibited and the object pixel is not modified if the input image also coincides with the pattern shown in FIG. 101A'.

Figure 103A:
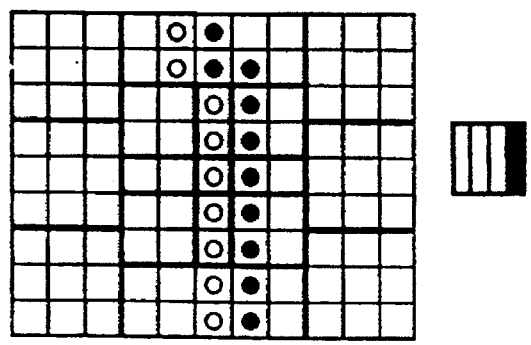
FIGS. 103A and 103B are views showing another example of the smoothing inhibiting process for the Kanji character.
Figure 103B:
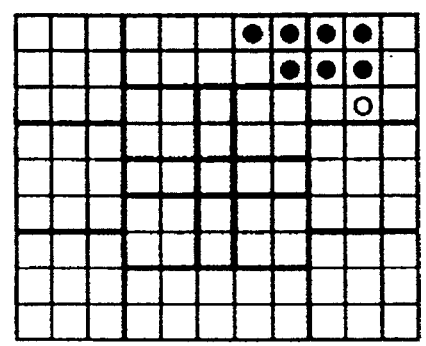

FIGS. 103A and 103B illustrate a variation to the pattern shown in FIG. 94C, and respectively represent a reference pattern and an inhibition pattern for said pattern in FIG. 103A. Even when the input image coincides with the pattern in FIG. 103A, the object pixel is not modified if it also matches the pattern in FIG. 103B. The detailed algorithm in this case will be explained with reference to FIGS. 104A–104C and 104A'. The modification of the object pixel $5f$ to x1=0, x2=0, x3=0 and x4=1 is conducted only if the areas X5 and X6 are "0" in feature, if at least one of the features of the areas Y1–Y8, X7 and X8 is "0", if the dot pattern shows $1e=2e=3f=4f=5f=6f=7f=8f=9f=0$ (white) and $1f=2f=2g=3g=4g=5g=6g=7g=8g=9g=1$ (black), and if the conditions $3j=0$ (white) and $1g=1h=1i=1j=2h=2i=2j=1$ (black) are not met.

Figures 104A, 104B, 104C:
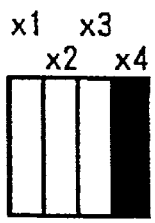
FIGS. 104A to 104C and 104A' are views showing another example of the feature extracting algorithm for Kanji character.
Figure 105:
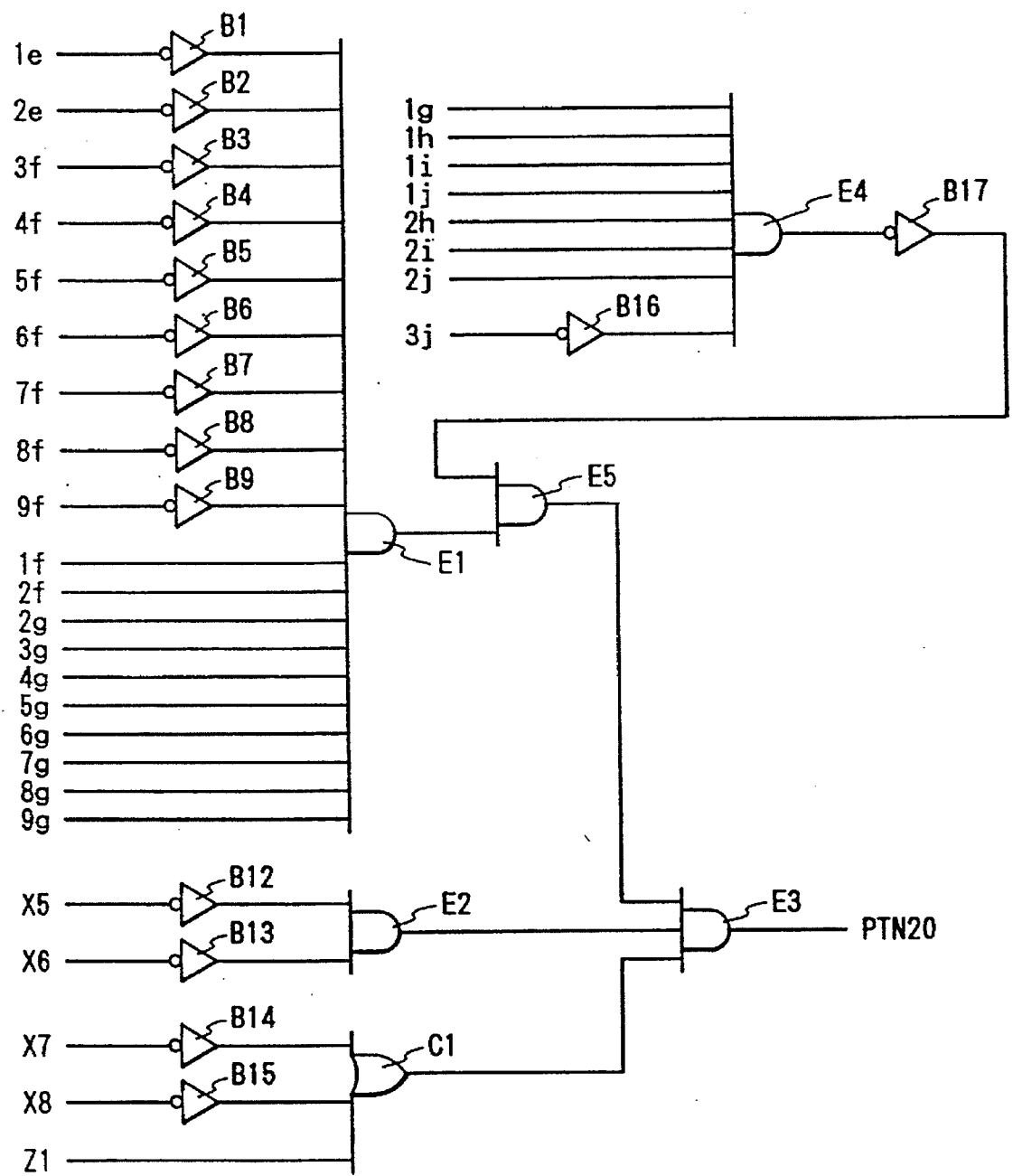
FIG. 105 is a circuit diagram showing another example of the smoothing inhibiting circuit for the Kanji character.

This algorithm can be realized by a circuit shown in FIG. 105, wherein provided are inverters B1–B17, AND gates E1–E5, and an OR gate C1. The AND gate E5 receives, at an input port thereof, the output of the AND gate E1 representing the result of matching with the pattern shown in FIG. 104A, and, at the other input port, the output of the inverter B17, representing the result of matching with the inhibiting pattern in FIG. 104A'. The reference output signal PTN 20 thus obtained is supplied to the OR gate Q9 in FIG. 77.

A similar inhibition pattern is provided also for each of the patterns shown in FIGS. 94A–94M.

In this algorithm, even when the input image coincides with the pattern shown in FIG. 104A, the smoothing process is inhibited and the object pixel is not modified if the input image also coincides with the pattern shown in FIGS. 104A'.

Figure 106:
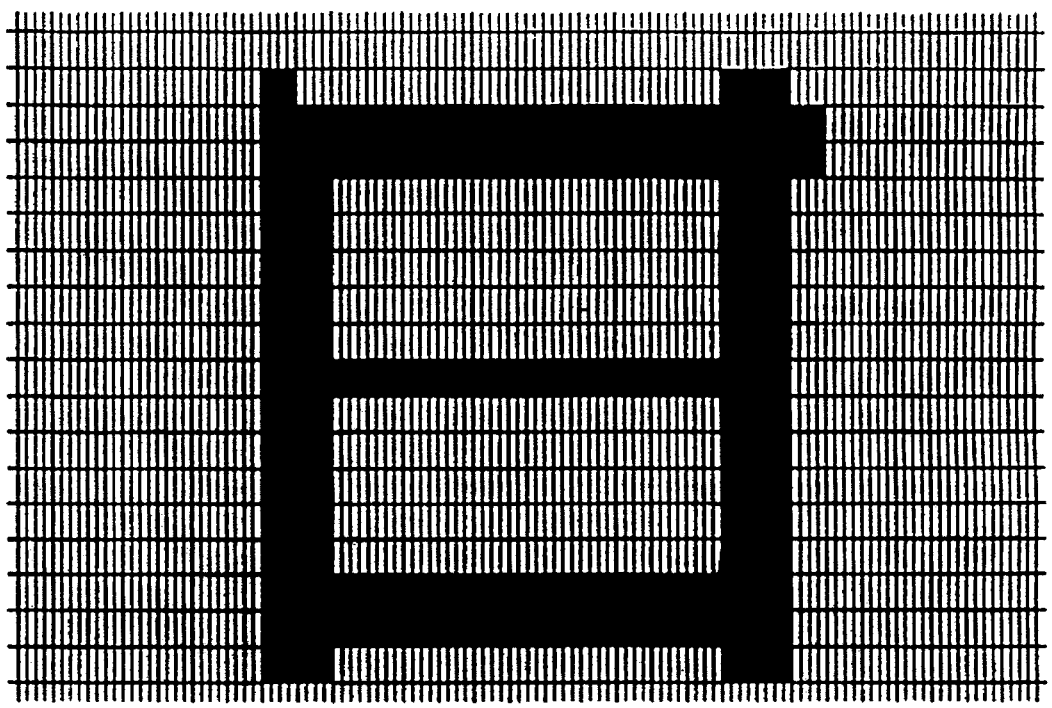
FIG. 106 is a view showing the effect of processing for the character shown in FIG. 66.
Figure 107:
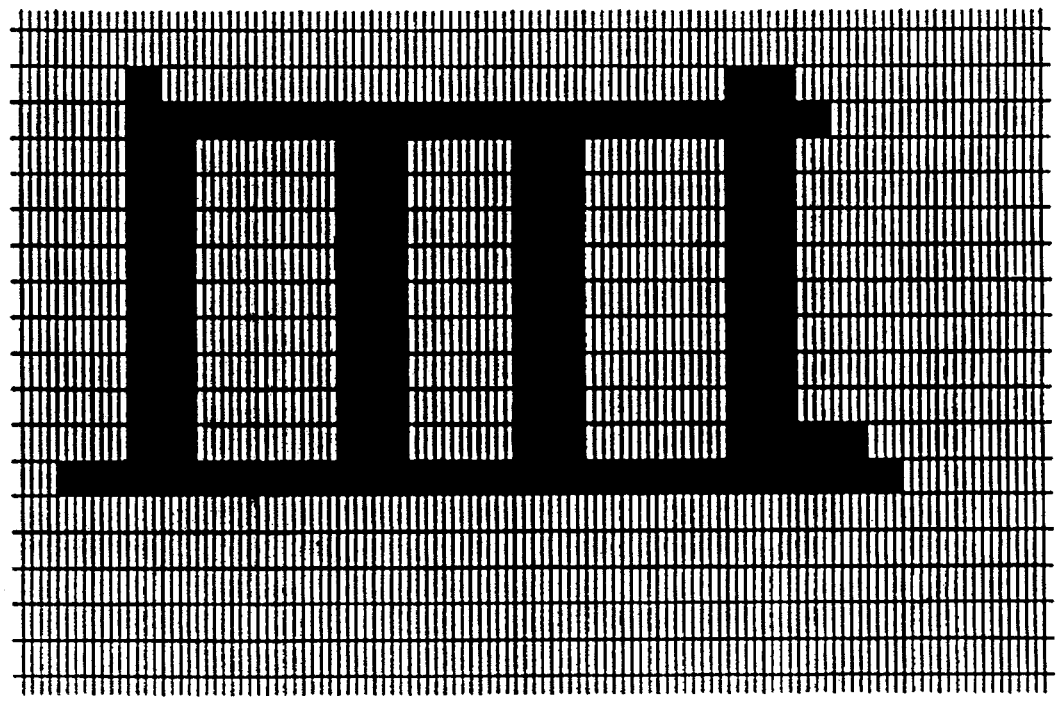
FIG. 107 is a view showing the effect of processing for the character shown in FIGS. 59a to 59C.

In this embodiment, the Kanji character shown in FIG. 66 is printed as shown in FIG. 106, and that in FIG. 98 is printed as shown in FIG. 107, both without deterioration in image quality.

In this second embodiment, the division into sub areas is conducted in the same manner as in the first embodiment, as shown in FIG. 44, and the object pixel ($5f$) at the center of a dot matrix memory, composed of 11 dots of 300 dot/inch in the main scanning direction by 9 dots in the sub scanning direction, is modified to image data which are defined by a group of sub pixels (x1, x2, x3, x4, y1, y2, y3, y4) having print densities of 4 times in the main scanning direction and 2 times in the sub scanning direction.

This embodiment is to detect the feature of the image data, transmitted from the controller, in a reference area (11 pixels in the main scanning direction and 9 pixels in the sub scanning direction) surrounding the object pixel, and to modify the object pixel according to the result of said detection.

More specifically, for example in case of printing the object pixel among the dot data in FIG. 6 constituting a charcter "a" with a resolution of 300 dot/inch, the dot data of an area (11 pixels in the main scanning direction by 9 pixels in the sub scanning direction; 99 pixels in total) surrounding said object pixel are temporarily stored in memory means, then the feature of the dot data in said area is detected and the data of the object pixel to be printed are modified according to thus detected feature. The data modification is conducted in such a manner that the contour of the pattern consisting of dots appears more smoothly. In the present embodiment, as shown in FIG. 44, the object pixel is composed of sub pixels x1, x2, x3, x4, y1, y2, y3, y4 which are arranged with four sub pixels in the main scanning direction and two sub pixels in the sub scanning direction. Consequently the equivalent print density is 1200 dot/inch in the main scanning direction and 600 dot/inch in the sub scanning direction.

The VDO signal processing unit 101, provided in the input portion of the printer engine unit of 600 dot/inch is constructed in the same manner as that of the first embodiment shown in FIG. 45, and will not, therefore, be explained further.

Within the process circuit 43 shown in FIG. 45, the feature extracting circuit is same as already shown in FIGS. 30, 31, 73, 76, 102 and 105, and the data generation circuit is same as already shown in FIGS. 46–49.

Also in this second embodiment, there has been explained a case of print density of 600 dot/inch in the sub scanning direction, but the equivalent print density in the main scanning direction is not necessarily limited to 4 times of the resolution in the sub scanning direction and may be arbitrarily selected as 2, 3, 5, 6, 7, 8 times etc.

As explained in the foregoing, the second embodiment of the present invention allows to maintain a constant line width, in case of a vertical line with an inclination exceeding 45°, by deleting (or adding) a signal width at the right-hand edge of the line, equal to the signal width added (or deleted) at the left-hand edge, and, in case of a lateral line with an inclination not exceeding 45°, by deleting the signal of a width, equal to the pulse width to be added to the line edge, from the original signal.

Also this second embodiment allows to avoid unnecessary or detrimental smoothing by discriminating whether or not to effect smoothing, based on the dot configuration at the boundary of a line, regardless of the inclination thereof.

Furthermore, this second embodiment enables smoothing on a one-dot line, without narrowing, broadening or local breakage, by distinguishing two types of one-dot line and modifying the smoothing process for the identified type of line.

Furthermore, this second embodiment is capable of identifying a one-dot white line and inhibiting the smoothing process for such one-dot white line, thereby preventing the narrowing of such white line and stabilizing the image quality under various ambient conditions.

Furthermore, the second embodiment is capable of preventing detrimental influence of smoothing or Kanji characters, by incorporating inhibition part specific to such Kanji characters, thereby inhibiting the smoothing operation therefor.

As explained in the foregoing, the second embodiment of the present invention, for extracting the feature of dot pattern in a wide reference area around the object pixel and modifying the object pixel according to thus extracted feature, allows to detect a nearly horizontal or vertical contour with a simplified logic circuit and enables optimum smoothing process according to the curvature of said contour. It also allows to prevent undesirable influence of smoothing on the image, by inhibiting the smoothing process for the images of predetermined patterns.

The present invention has been explained by preferred embodiments. It is however not limited by such embodiments and is subject to various modifications within the scope and spirit of the appended claims.

What is claimed is:

1. An information processing method comprising:

an input step of inputting bit information;

a storage step of temporarily storing a part of bit information from the bit information input in said input step;

a feature detecting step of detecting whether the part of bit information stored in said storage step coincides with one predetermined feature of plural predetermined features; and an information modifying step of modifying print information of an object pixel which corresponds to a bit in the part of bit information stored in said storage step, in a case where said feature detecting step detects coincidence with the one predetermined feature of the plural predetermined features;

wherein said information modifying step inhibits modification of the object pixel on bit information for a line image, in a case where an arrangement of bit information on a right-or left-hand contour constitutes a rectangular portion with two or more bits in a main scanning direction and two or more bits in a sub scanning direction.

2. An information processing method comprising:

an input step of inputting bit information;

a storage step of temporarily storing a part of bit information from the bit information input in said input step;

a feature detecting step of detecting whether the part of bit information stored in said storage step coincides with one predetermined feature of plural predetermined features; and an information modifying step of modifying print information of an object pixel which corresponds to a bit in the part of bit information stored in said storage step, in a case where said feature detecting step detects coincidence with the one predetermined feature of the plural predetermined features, wherein said information modifying step discriminates, on bit information for a line of one bit width, whether line width in a flexed portion of the line is at least one bit wide or less than one bit wide, and also varies how print information is modified according to the discrimination.

3. An information processing method comprising:

an input step of inputting bit information;

a storage step of temporarily storing a part of bit information from the bit information input in said input step;

a feature detecting step of detecting whether the part of bit information stored in said storage step coincides with one predetermined feature of plural predetermined features; and an information modifying step of modifying print information of an object pixel which corresponds to a bit in the part of bit information stored in said storage step, in a case where said feature detecting step detects coincidence with the one predetermined feature of the plural predetermined features, wherein said information modifying step inhibits modification of the print information on a white line with one bit line width.

4. A method according to claim 3 wherein the white line is a lateral line with an inclination not exceeding 45° to a horizontal direction.

5. An information processing method comprising:

an input storage step of inputting bit information;

a storage step of temporarily storing a part of bit information from the bit information input in said input step;

a first feature detecting step of detecting whether the part of bit information stored in said storage step coincides with one feature of plural features each representative on an edge;

a second feature detecting step of detecting whether the part of bit information stored in said storage step has a right-angle portion; and an information modifying step of modifying print information of an object pixel which corresponds to a bit in the part of bit information stored in said storage step, in a case where both said first feature detecting step detects coincidence with one feature of the plural features each representative of an edge and said second feature detecting step does not detect a right-angle portion.

\* \* \* \* \*